United States Patent
Yi et al.

(10) Patent No.: US 11,696,204 B2
(45) Date of Patent: Jul. 4, 2023

(54) OPERATING METHOD OF NODE IN WIRELESS COMMUNICATION SYSTEM, AND DEVICE USING METHOD

(71) Applicant: LG ELECTRONICS INC., Seoul (KR)

(72) Inventors: Yunjung Yi, Seoul (KR); Soonki Jo, Seoul (KR); Duckhyun Bae, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 17/266,560

(22) PCT Filed: Aug. 6, 2019

(86) PCT No.: PCT/KR2019/009776
§ 371 (c)(1),
(2) Date: Feb. 5, 2021

(87) PCT Pub. No.: WO2020/032528
PCT Pub. Date: Feb. 13, 2020

(65) Prior Publication Data
US 2021/0321315 A1      Oct. 14, 2021

Related U.S. Application Data

(60) Provisional application No. 62/717,071, filed on Aug. 10, 2018.

(30) Foreign Application Priority Data

Aug. 7, 2018   (KR) .................. 10-2018-0091943
Sep. 28, 2018  (KR) .................. 10-2018-0115444

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0072* (2013.01); *H04W 36/38* (2013.01);
(Continued)

(58) Field of Classification Search
CPC ... H04W 76/19; H04W 88/085; H04W 40/22; H04W 76/18; H04W 76/27;
(Continued)

(56) References Cited

U.S. PATENT DOCUMENTS

2012/0063298 A1*  3/2012  Yi ................... H04W 56/00
                                                   370/216
2013/0044590 A1*  2/2013  Lee ................. H04W 76/38
                                                   370/328
(Continued)

FOREIGN PATENT DOCUMENTS

KR    100678179        2/2007
KR    20080072485      8/2008
(Continued)

OTHER PUBLICATIONS

PCT International Application No. PCT/KR2019/009776, International Search Report dated Nov. 13, 2019, 4 pages.

*Primary Examiner* — Nam T Huynh
(74) *Attorney, Agent, or Firm* — Lee Hong Degerman Kang Waimey

(57) ABSTRACT

An operating method of a node in a wireless communication system, and a device using the method are provided. The method transmits a link instability signal notifying a child node of the instability of a link if the link with a parent node is unstable, monitors, during a connection recovery time, whether a link recovery signal is received from the parent node, and transmits, to the child node, a handover trigger signal if the link recovery signal has not been received within the connection recovery time.

8 Claims, 31 Drawing Sheets

(51) Int. Cl.
  *H04W 36/38*   (2009.01)
  *H04W 76/18*   (2018.01)
  *H04W 76/27*   (2018.01)
  *H04W 84/04*   (2009.01)
  *H04W 88/04*   (2009.01)

(52) U.S. Cl.
  CPC ........... *H04W 76/18* (2018.02); *H04W 76/27* (2018.02); *H04W 84/047* (2013.01); *H04W 36/0009* (2018.08); *H04W 88/04* (2013.01)

(58) Field of Classification Search
  CPC . H04W 84/047; H04W 76/30; H04W 36/305; H04W 36/0055; H04W 36/30; H04W 88/04
  See application file for complete search history.

(56) References Cited

U.S. PATENT DOCUMENTS

| | | | |
|---|---|---|---|
| 2020/0021372 A1* | 1/2020 | Zhang | H04B 17/327 |
| 2020/0221463 A1* | 7/2020 | Wang | H04L 1/1614 |
| 2021/0259051 A1* | 8/2021 | Latheef | H04W 76/12 |

FOREIGN PATENT DOCUMENTS

| | | |
|---|---|---|
| KR | 20130007551 | 1/2013 |
| KR | 20140088375 | 7/2014 |
| WO | 2016010394 | 1/2016 |

\* cited by examiner

OPERATING METHOD OF NODE IN WIRELESS COMMUNICATION SYSTEM, AND DEVICE USING METHOD

CROSS-REFERENCE TO RELATED APPLICATIONS

This application is the National Stage filing under 35 U.S.C. 371 of International Application No. PCT/KR2019/009776, filed on Aug. 6, 2019, which claims the benefit of earlier filing date and right of priority to Korean Application Nos. 10-2018-0091943, filed on Aug. 7, 2018, 10-2018-0115444, filed on Sep. 28, 2018, and also claims the benefit of U.S. Provisional Application No. 62/717,071, filed on Aug. 10, 2018, the contents of which are all incorporated by reference herein in their entirety.

BACKGROUND OF THE DISCLOSURE

Field of the Disclosure

The present disclosure relates to wireless communication, and more particularly, to a method of operating a node in a wireless communication system and a device using the method.

Related Art

As more communication devices require a larger communication capacity, a need for improved mobile broadband communication compared to the legacy radio access technology (RAT) has emerged. In addition, massive machine type communications (MTC), which provides various services anytime and anywhere by connecting multiple devices and objects, is one of the major issues to be considered in next-generation communications.

A communication system that considers services or terminals (or user equipments (UEs) sensitive to reliability and latency has also been discussed, and a next-generation radio access technology (RAT) may be referred to as a new RAT or new radio (NR).

A future wireless communication system such as NR may adopt a bandwidth part (BWP). In a wireless communication system using a broadband, the BWP may be used to allocate some bands for terminals which are difficult to support the broadband.

Meanwhile, in NR, a bandwidth wider than long term evolution (LTE) may be used, and a massive multi-input multi-output (MIMO) and multi-beam may also be used.

In addition, NR may adopt integrated access and backhaul (IAB). Here, access may refer to, for example, a base station-terminal, and backhaul may refer to, for example, a base station-base station or a base station-core network. In NR, different radio resources/radio channels may be used in the access and backhaul, but the use of the same radio resources and/or radio channels is also considered. For example, a radio resource and a radio channel used by a first base station to serve terminals connected through an access link may also be used in a backhaul link between the first base station and a second base station.

Here, terms such as a base station and a terminal are used for convenience, and may be replaced with other terms of, for example, node. For example, it is assumed that the second base station controls/schedules a terminal connected to the first base station through an access link via a backhaul link with the first base station. In this case, from the viewpoint of the first base station, the second base station may be referred to as a parent node or a donor node, and the terminal may be referred to as a child node. In addition, the first base station may be referred to as a relay node or an IAB node.

In an IAB environment, if a link status between the parent node and the IAB node is unstable, that is, if there is no radio link failure (RLF) but link quality is below a certain level, it may be inefficient to continuously perform communication with the child node connected to the IAB node. In consideration of this, it is necessary to define an operation method when the link status between the parent node and the IAB node is unstable.

SUMMARY

The present disclosure provides an operation method of a node in a wireless communication system and a device using the same.

In one aspect, provided is an operation method of a node in a wireless communication system. The operation method comprises transmitting a link unstableness signal informing unstableness of the link to a child node, based on a link with a parent node being unstable; monitoring whether a link restoration signal is received from the parent node within a connection recovery time; and transmitting a handover trigger signal to the child node based on the link restoration signal being not received within the connection recovery time.

The link may be determined to be unstable based on beam failure occurring in the link 1 to M times (M is an integer of 2 or greater).

The link may be determined to be unstable based on reference signal received power (RSRP) or reference signal received quality (RSRQ) measured in the link being equal to or smaller than a threshold.

The link may be determined to be unstable based on out-of-sync occurring N (N is an integer of 1 or greater) times in a relationship with the parent node.

N may be previously determined or set by the parent node.

Information informing a reason why the link with the parent node is unstable may be transmitted together with the link unstableness signal.

The information informing the reason why the link is unstable may represent at least one of the number of beam failures, a low RSRP/RSRQ, a low channel quality indicator (CQI), and low throughput.

The connection recovery time may be previously determined or may be set by the parent node.

The link restoration signal may be transmitted to the child node based on the link restoration signal being received within the connection recovery time.

A downlink signal including at least one of a lowest block error rate (BLER) in a higher path of the node, the number of hops of the higher path, a data load of a path including the parent node, and the number of nodes supported by the parent node may be further received from the parent node.

In another aspect, provided is a node comprising a transceiver configured to transmit or receive a wireless signal, and a processor operatively coupled with the transceiver, wherein the processor is configured to transmit a link unstableness signal informing unstableness of the link to a child node based on a link with a parent node being unstable, monitor whether a link restoration signal is received from the parent node within a connection recovery time, and transmit a handover trigger signal to the child node based on the link restoration signal being not received within the connection recovery time.

The link may be determined to be unstable based on beam failure occurring in the link 1 to M times (M is an integer of 2 or greater).

The link may be determined to be unstable based on reference signal received power (RSRP) or reference signal received quality (RSRQ) measured in the link being equal to or smaller than a threshold.

The link restoration signal may be transmitted to the child node based on the link restoration signal being received within the connection recovery time.

In another aspect, provided is a processor for a wireless communication device in a wireless communication system, wherein the processor is configured to control the wireless communication device to transmit a link unstableness signal informing unstableness of the link to a child node based on a link with a parent node being unstable, monitor whether a link restoration signal is received from the parent node within a connection recovery time, and transmit a handover trigger signal to the child node based on the link restoration signal being not received within the connection recovery time.

According to the present disclosure, if a link status between a parent node and an IAB node is unstable, a child node is informed in advance of radio link failure (RLF) before RLF occurs, so that the child node may perform a necessary operation. In addition, even if the link status is unstable, the link status may be recovered in some cases. In the present disclosure, in consideration of this, recovery of the link status is monitored during a connection recovery time, and a handover trigger signal is transmitted to the child node only when the link status is not recovered, thereby preventing an occurrence of an unnecessary handover operation.

DESCRIPTION OF EXEMPLARY EMBODIMENTS

Figure 1:
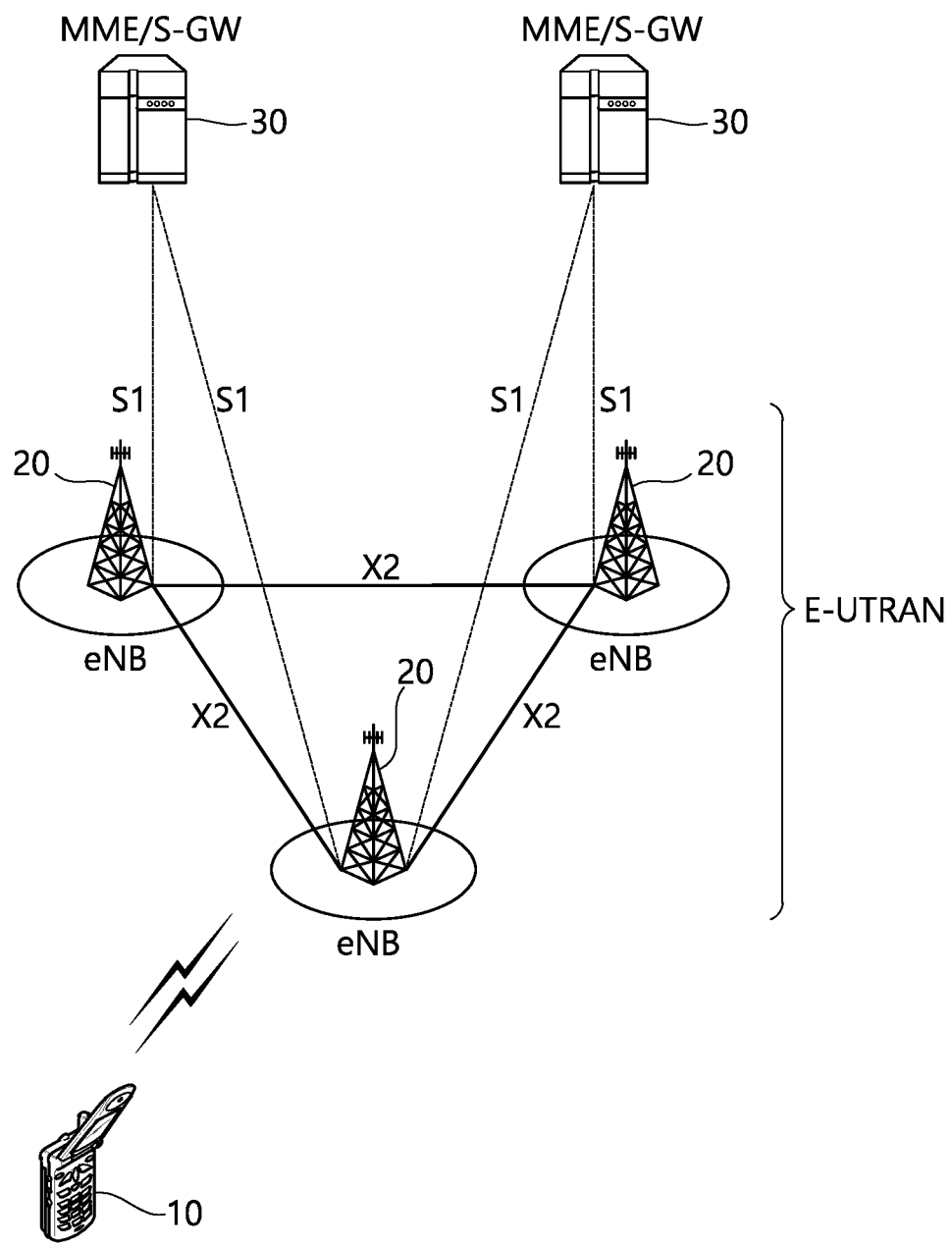
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
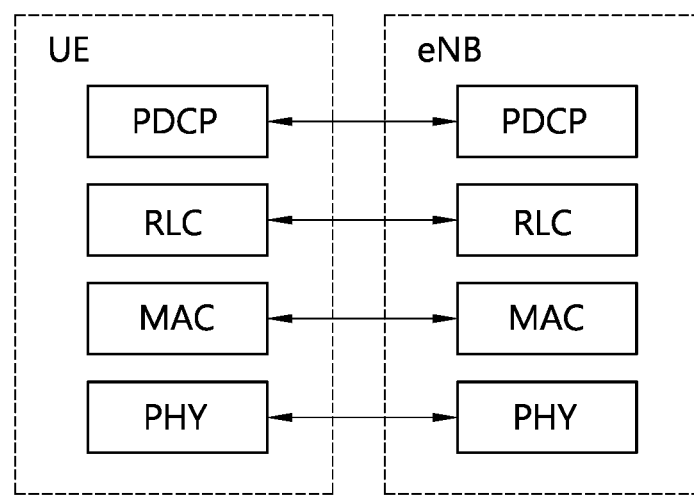
FIG. 2 is a diagram showing a radio protocol architecture for a user plane.
Figure 3:
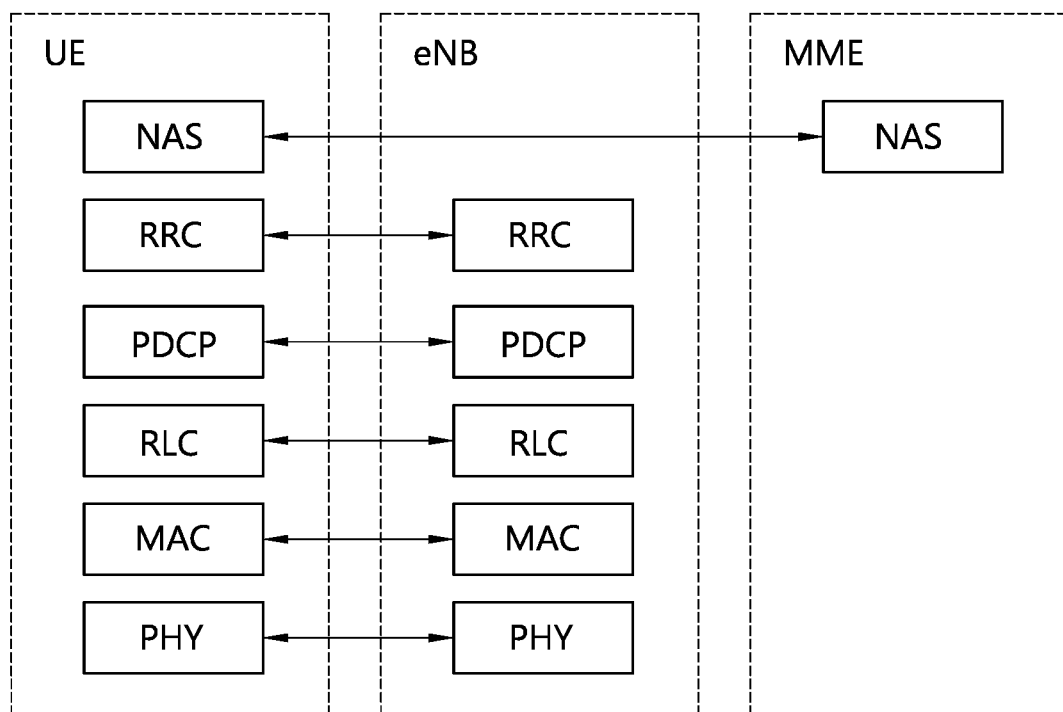
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
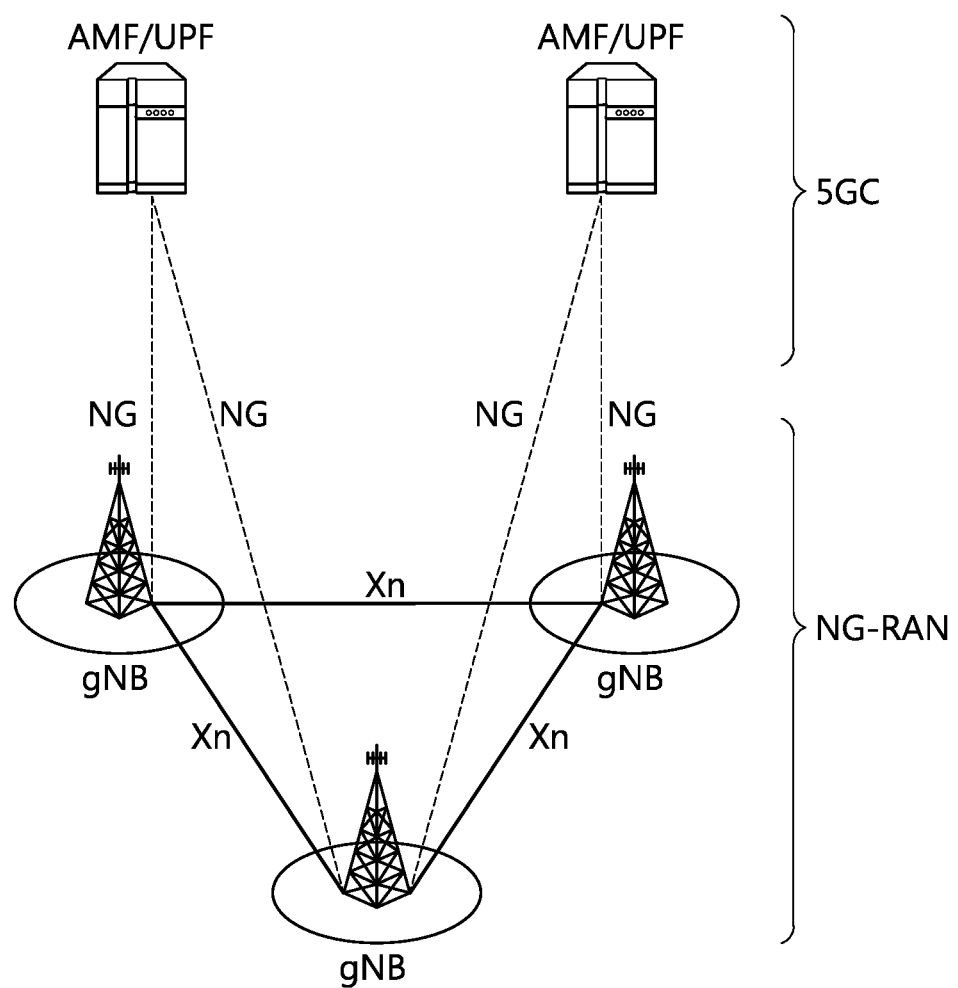
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
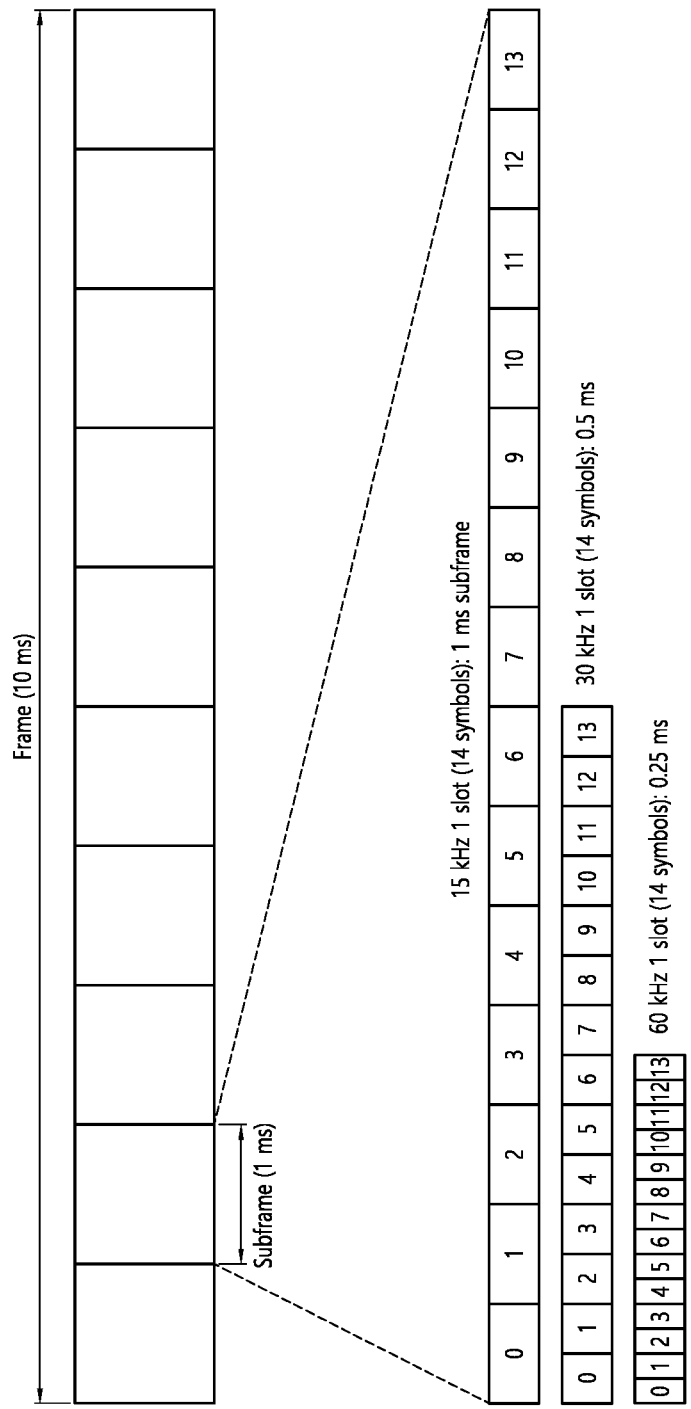
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms. Various fields in the time domain may be represented by the time unit $T_c=1/(\Delta f_{max} \cdot N_f)$, where $\Delta f_{max}=480 \times 10^3$ Hz, and $N_f=4096$.

A carrier component may have one set of frames in the uplink and another set of frames in the downlink. Transmission of an uplink frame i may be started before the start of the corresponding downlink frame i by $T_{TA}=(N_{TA}+N_{TA,offset})T_c$.

One or a plurality of slots may be included in a subframe according to subcarrier spacings.

The following table illustrates a subcarrier spacing configuration μ.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Extended |
| 4 | 240 | normal |

The table 2-1 below shows the number of slots within a frame slot $N_{slot}^{frame,\mu}$, number of slots within a subframe slot $N_{slot}^{subframe,\mu}$, and number of symbols within a slot $N_{symb}^{slot}$ according to the subcarrier spacing configuration R in the case of normal Cyclic Prefix (CP). The table 2-2 below shows the number of slots within a frame $N_{slot}^{frame,\mu}$, number of slots within a subframe $N_{slot}^{subframe,\mu}$, and number of symbols within a slot $N_{symb}^{slot}$ according to the subcarrier spacing configuration R in the case of extended CP.

TABLE 2-1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2-2

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 5 illustrates cases for μ=0, 1, 2.

A slot may include a plurality of Orthogonal Frequency Division Multiplexing (OFDM) symbols. A plurality of OFDM symbols within a slot may be divided into downlink (denoted by D), flexible (denoted by X), and uplink (denoted by U) symbols. The format of the slot may be determined according to which of the D, X, and U OFDM symbols constitute the slot.

The table below illustrates one example of the slot format.

TABLE 31

| | Symbol number in a slot | | | | | | | | | | | | | |
|---|---|---|---|---|---|---|---|---|---|---|---|---|---|---|
| format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | U | D | X | U | U | U | U | U |
| 49 | D | D | D | X | X | U | D | D | D | D | X | X | U | U |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | X | U | U |
| 53 | D | D | X | X | X | U | D | D | X | X | X | X | U | U |
| 54 | X | X | X | X | X | X | D | D | D | D | D | D | D | D |
| 55 | D | D | X | X | X | U | U | U | D | D | D | D | D | D |
| 56-255 | | | | | | Reserved | | | | | | | | |

A UE may be configured with the format of a slot through an upper layer signal, DCI, or a combination of the upper layer signal and DCI.

An antenna port is defined so that a channel transmitting a symbol on the antenna port may be inferred from a channel transmitting other symbol on the same antenna port. If large part of characteristics of a channel to which a symbol on one antenna port is transmitted may be inferred from a channel to which a symbol on another antenna port is transmitted, the two antenna ports are said to be quasi co-located. The large part of characteristics may include at least one or more of delay spread, Doppler spread, Doppler shift, average gain, average delay, and spatial Rx parameters.

A resource grid may be defined to include a specific number of subcarriers and OFDM symbols with respect to each numerology and subcarrier, which may start from a common resource block indicated by upper layer signaling.

Each element of the resource grid with respect to configuration of an antenna port and subcarrier spacing is called a resource element (RE), which may support complex values.

A resource block (RB) may be defined as contiguous subcarriers (for example, 12) in the frequency domain. A reference resource block may be numbered from zero to higher numbers in the frequency domain. The subcarrier 0 of the reference resource block 0 may be denoted by 'reference point A' and may be applied commonly to all of the subcarrier spacing configurations. Also, the reference point A may be used as a reference point for other resource block grids, where the reference point A may be obtained from an upper layer parameter.

A common resource block may be numbered from 0 to higher numbers in the frequency domain for subcarrier spacing configuration. The subcarrier 0 of the common resource block 0 for subcarrier spacing configuration may coincide with the 'reference point A'.

A physical resource block and virtual resource block may be defined within the part of subcarrier bandwidth and may be numbered from 0 to higher numbers.

According to carrier aggregation, up to 15 secondary cells may be aggregated in addition to a primary cell. In other words, up to 16 serving cells may be aggregated for a UE.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

An antenna port is defined so that a channel transmitting a symbol on the antenna port may be inferred from a channel transmitting other symbol on the same antenna port. If large part of characteristics of a channel to which a symbol on one antenna port is transmitted may be inferred from a channel to which a symbol on another antenna port is transmitted, the two antenna ports are said to be quasi co-located. The large part of characteristics may include at least one or more of delay spread, Doppler spread, Doppler shift, average gain, average delay, and spatial Rx parameters.

A resource grid may be defined to include a specific number of subcarriers and OFDM symbols with respect to each numerology and subcarrier, which may start from a common resource block indicated by upper layer signaling.

Each element of the resource grid with respect to configuration of an antenna port and subcarrier spacing is called a resource element (RE), which may support complex values.

A resource block (RB) may be defined as contiguous subcarriers (for example, 12) in the frequency domain. A reference resource block may be numbered from zero to higher numbers in the frequency domain. The subcarrier 0 of the reference resource block 0 may be denoted by 'reference point A' and may be applied commonly to all of the subcarrier spacing configurations. Also, the reference point A may be used as a reference point for other resource block grids, where the reference point A may be obtained from an upper layer parameter.

A common resource block may be numbered from 0 to higher numbers in the frequency domain for subcarrier spacing configuration. The subcarrier 0 of the common resource block 0 for subcarrier spacing configuration may coincide with the 'reference point A'.

A physical resource block and virtual resource block may be defined within the part of subcarrier bandwidth and may be numbered from 0 to higher numbers.

According to carrier aggregation, up to 15 secondary cells may be aggregated in addition to a primary cell. In other words, up to 16 serving cells may be aggregated for a UE.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
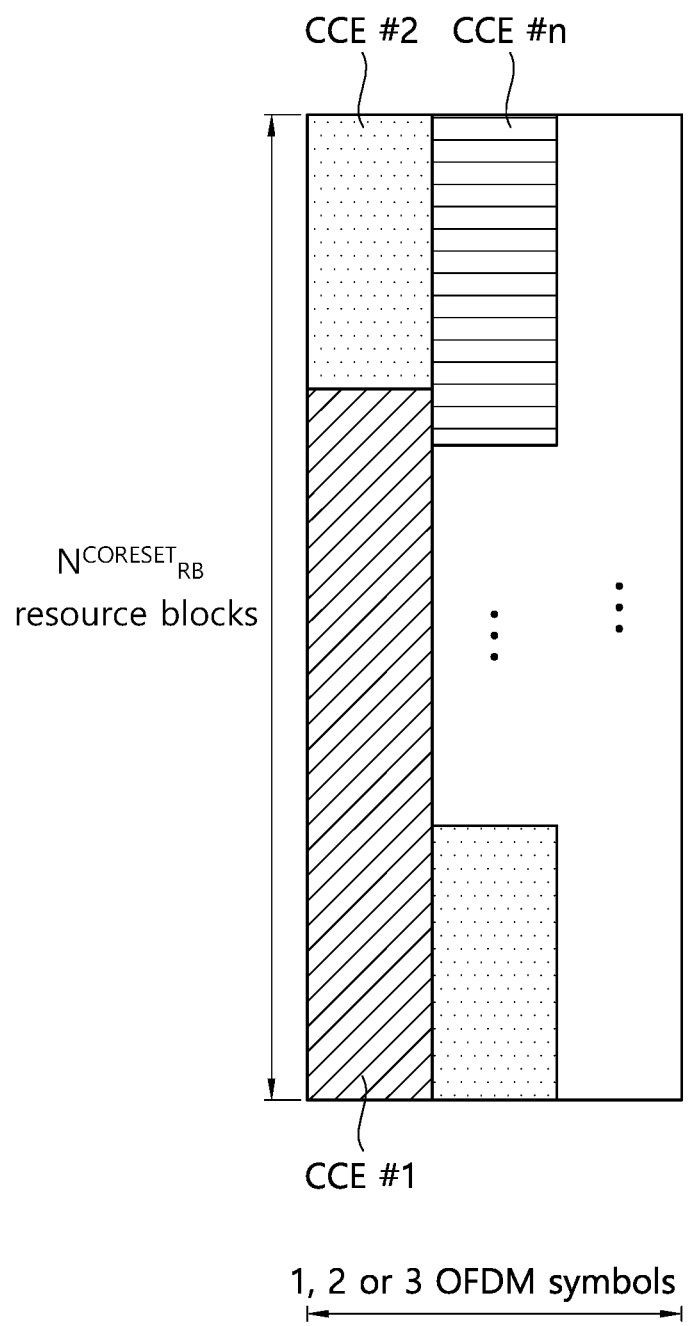
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
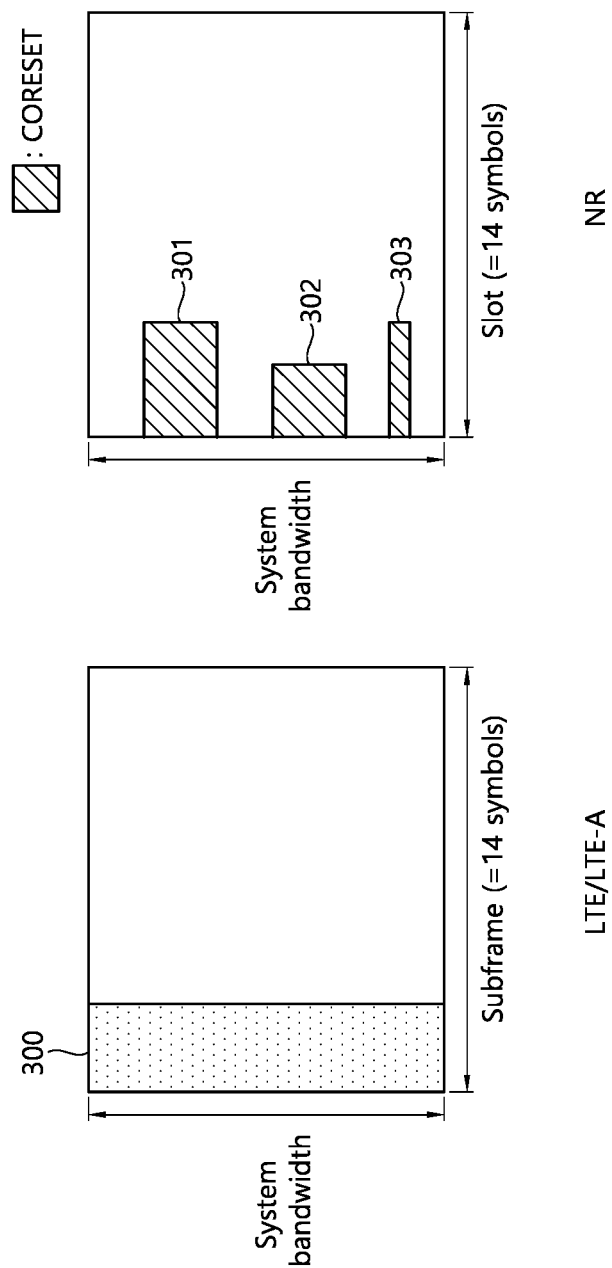
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
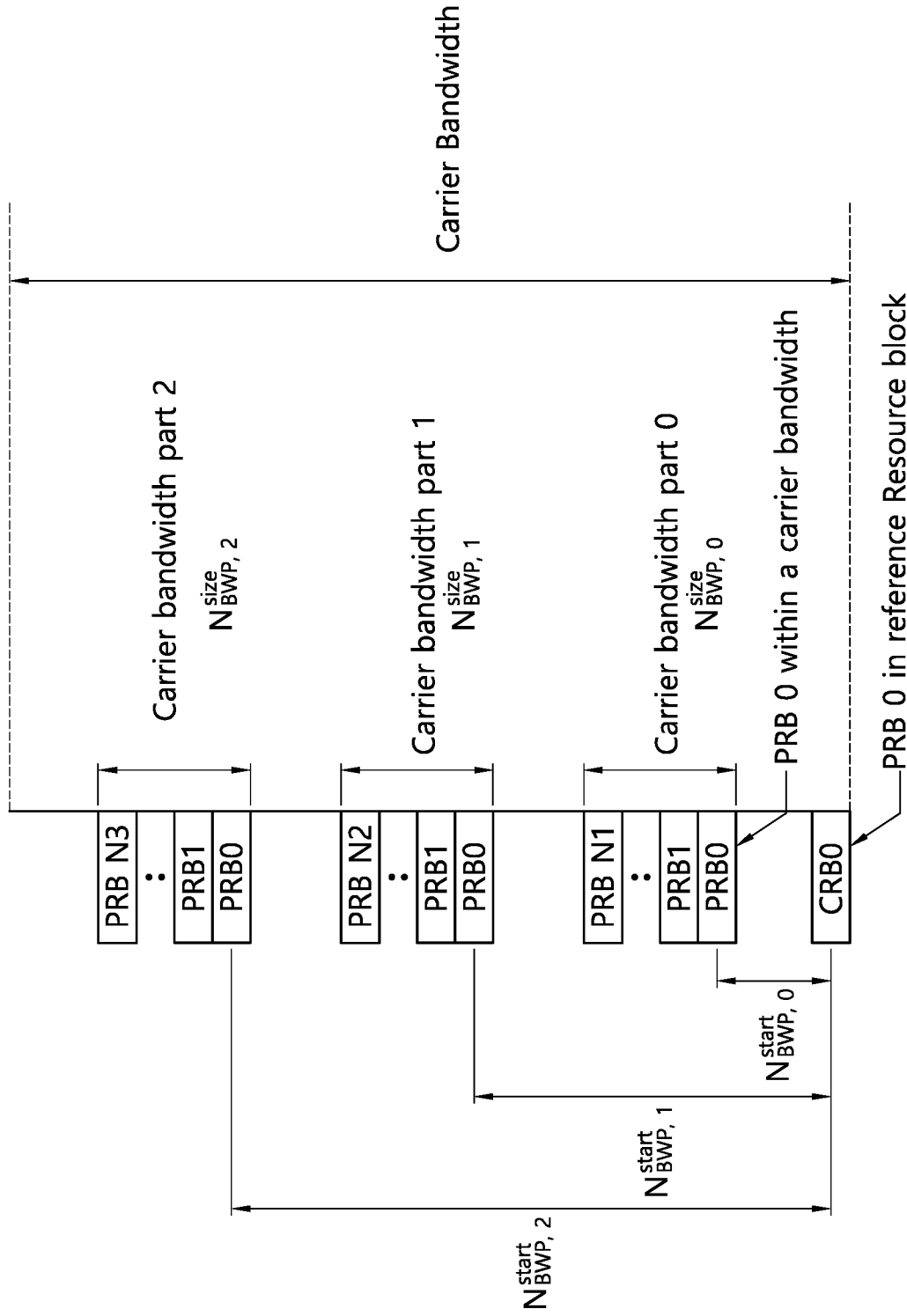
FIG. 8 illustrates carrier bandwidth part newly introduced to NR.

FIG. 8 illustrates carrier bandwidth part newly introduced to NR.

Referring to FIG. 8, the carrier bandwidth part may be simply called bandwidth part (BWP). As described above, in a future wireless communication system, various numerologies (for example, various subcarrier spacings) may be supported for the same subcarrier. NR may define a Common Resource Block (CRB) for a given numerology at a particular subcarrier.

The bandwidth part is a set of contiguous physical resource blocks (PRBs) selected among contiguous sub-sets of common resource blocks (CRBs) for a given numerology at a given subcarrier.

As shown in FIG. 8, a common resource block may be determined according to a numerology for particular subcarrier bandwidth, namely according to which subcarrier spacing is used. A common resource block may be indexed (from 0) from the lowest frequency of the subcarrier bandwidth, and a resource grid (which may be referred to as a common resource block resource grid) that uses the common resource block as its constituting unit may be defined.

The bandwidth part may be indicated with reference to a CRB that has the lowest index (let this be CRB 0). CRB 0 having the lowest index may also be called point A.

For example, for a given numerology at a particular subcarrier, the i-th bandwidth part may be indicated by $N_{BWP,i}^{start}$ and $N_{BWP,i}^{size}$. $N_{BWP,i}^{start}$ may indicate a start CRB of the i-th BWP with reference to CRB 0, and $N_{BWP,i}^{size}$ may indicate the size of the i-th BWP in the frequency domain (for example, in PRB units). PRBs within each BWP may be indexed from 0. The index of a CRB within each BWP may be mapped to the index of a PRB. For example, the CRB index may be mapped so that $n_{CRB}=n_{PRB}+N_{BWP,i}^{start}$.

Although a UE may be configured with up to 4 downlink bandwidth parts for downlink transmission, only one downlink bandwidth part may be activated at a given time point. A UE does not expect to receive PDSCH, PDCCH, or CSI-RS except for the activated downlink bandwidth part among the downlink bandwidth parts. Each downlink bandwidth part may include at least one CORESET.

Although a UE may be configured with up to 4 uplink bandwidth parts for uplink transmission, only one uplink bandwidth part may be activated at a given time point. A UE does not transmit PUSCH or PUCCH except for the activated uplink bandwidth part among the uplink bandwidth parts.

Compared with conventional systems, NR operates on broadband; however, not all of UEs may be able to support the broadband communication. BWP may be regarded as a feature that enables a UE incapable of supporting the broadband communication to operate on the broadband.

A UE configured to operate in the BWP of a serving cell may be configured with up to 4 bandwidth part (BWP) sets by an upper layer for the serving cell.

An initial activation DL BWP may be defined by the positions and the number of PRBs adjacent to a control resource set for type 0-PDCCH common search space, subcarrier spacing, and CP. For the operation in the primary cell, a UE may receive upper layer parameters for a random access procedure.

In the case of unpaired spectrum operation, a UE may expect that the center frequency of DL BWP is the same as the center frequency of UL BWP.

In what follows, resource allocation type will be described. Resource allocation type specifies a method for a scheduler (for example, gNB) to allocate resource blocks for each transmission. For example, when a gNB allocates a band composed of a plurality of resource blocks to a UE, the gNB may inform of resource blocks allocated to the UE through a bitmap consisting of bits corresponding to the respective resource blocks of the band. In this case, a disadvantage is obtained that although flexibility of resource allocation is improved, the amount of information required for the resource allocation is increased.

Taking into account the advantage and disadvantage, the following 3 resource allocation types may be defined/used.

1) Resource allocation type 0 refers to a method that allocates resources by using a bitmap, where each bit of the bitmap indicates a resource block group (RBG) rather than a resource block. In other words, in the resource allocation type 0, resource allocation is performed in resource block group units rather than at the resource block level. The table below shows the size of an employed RBG when the system bandwidth comprises $N_{RB}^{DL}$ resource blocks.

TABLE 5

| System Bandwidth $N_{RB}^{DL}$ | RBG Size (P) |
| --- | --- |
| ≤10 | 1 |
| 11-24 | 2 |
| 25-63 | 6 |
| 64-110 | 12 |

2) Resource allocation type 1 refers to a method that allocates resources in RBG subset units. One RBG subset may be composed of a plurality of RBGs. For example, RBG subset #0 may consist of RBG #0, 3, 6, 9, . . . ; RGB subset #1 may consist of RBG #1, 4, 7, 10, . . . ; and RGB subset #2 may consist of RBG #2, 5, 8, 11, . . . . The number of RBGs belonging to one RBG subset is set to be the same as the number of resource blocks (RBs) belonging to one RBG. The resource allocation type 1 informs of which RBG subset is used among RBG subsets and which RB is used within an employed RBG subset.

3) Resource allocation type 2 refers to a method that allocates resources by informing of the start position (RB number) of an allocated band and the number of contiguous resource blocks. The contiguous resource blocks may be started from the start position. However, contiguous resource blocks are not necessarily limited to physical contiguity; rather, it may also indicate contiguity of a logical or virtual resource block index.

In a future wireless communication system, the number of resource blocks comprising an RBG (or a group of RBs) may be changed flexibly. At this time, information about the corresponding RBG, for example, information that indicates the number of resource blocks comprising an RBG may be transmitted through an upper layer signal such as scheduling DCI or a third physical layer (L1) signaling or an RRC message.

Also, in a future wireless communication system, resource allocation information (for example, the information about RBG) may include information about the time domain in addition to the frequency domain; and which information is included or in which way the information is included in the resource allocation information may also be changed flexibly.

In what follows, a physical channel and signal transmission process will be described.

Figure 9:
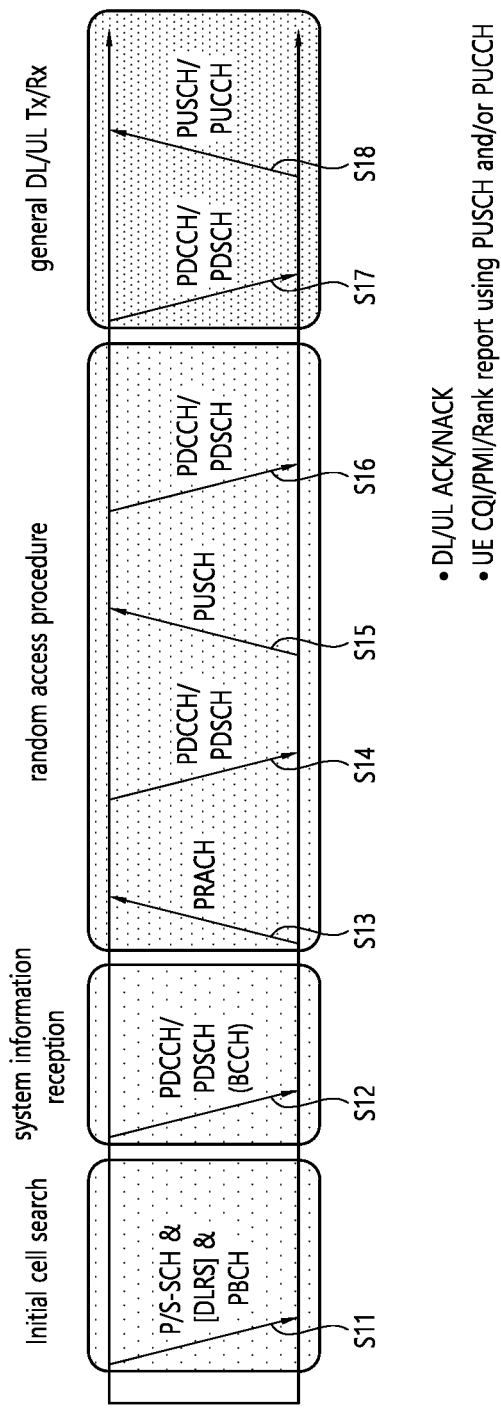
FIG. 9 illustrates physical channels and a normal signal transmission process in the 3GPP system.

FIG. 9 illustrates physical channels and a normal signal transmission process in the 3GPP system.

In a wireless communication system, a UE receives information through a downlink (DL) from a gNB, and the UE transmits information to the gNB via an uplink (UL). Information transmitted and received between the gNB and UE includes data and various pieces of control information; and various physical channels are employed according to the type/intended use of the information transmitted and received between them.

When a UE wakes up from the power-off state or newly enters a cell, the UE performs an initial cell search operation such as synchronization to a gNB S11. To this purpose, the UE may synchronize to the gNB by receiving Primary Synchronization Channel (PSCH) and Secondary Synchronization Channel (SSCH) from the gNB and obtain information such as cell identity (ID). Also, the UE may obtain information broadcast within the cell by receiving a Physical Broadcast Channel (PBCH) from the gNB. Also, the UE may check the downlink channel state by receiving a Downlink Reference Signal (DL RS) at the initial cell search phase.

A UE that has complete the initial cell search may obtain more specific system information by receiving a Physical Downlink Control Channel (PDCCH) and a Physical Downlink Shared Channel (PDSCH) corresponding to the PDCCH.

Afterwards, the UE may perform a random access procedure to complete access to the gNB S13-S16. More specifically, the UE may transmit a preamble through a Physical Random Access Channel (PRACH) S13 and receive a Random Access Response (RAR) with respect to the preamble through the PDCCH and the PDSCH corresponding to the PDCCH S14. Afterwards, the UE may transmit a Physical Uplink Shared Channel (PUSCH) by using scheduling information within the RAR S15 and perform a contention resolution procedure by using the PDCCH and the PDSCH corresponding to the PDCCH S16.

The UE that has performed the procedure above may subsequently perform PDCCH/PDSCH reception S17 and PUSCH/Physical Uplink Control Channel (PUCCH) transmission S18 as a normal uplink/downlink signal transmission procedure. The control information transmitted to the gNB by the UE is called Uplink Control Information (UCI). UCI includes Hybrid Automatic Repeat and reQuest Acknowledgement/Negative-ACK (HARQ ACK/NACK), scheduling request (SR), channel state information (CSI), and so on. CSI includes Channel Quality Indicator (CQI), Precoding Matrix Indicator (PMI), Rank Indication (RI), and so on. UCI is usually transmitted via a PUCCH but may also be transmitted through a PUSCH when both of control information and data needs to be transmitted simultaneously. Also, according to a request/indication of the network, the UE may transmit the UCI non-periodically through the PUSCH.

In what follows, cell search will be described.

Cell search is a procedure in which a UE obtains time and frequency synchronization with respect to a cell and detects a physical layer cell ID of the cell. To perform the cell search, the UE receives a Primary Synchronization Signal (PSS) and a Secondary Synchronization Signal (SSS).

The UE may assume that reception occasions of a PBCH, PSS, and SSS are distributed over contiguous symbols and form an SS/PBCH block. The UE may assume that SSS, PBCH DM-RS, and PBCH data have the same EPRE. The UE may assume that the ratio of SSS EPRE to PSS EPRE is 0 dB or 3 dB in an SS/PBCH block of the corresponding cell.

The cell search procedure of the UE may be summarized as shown in Table A.

TABLE A

| Signal Type | | Operation |
|---|---|---|
| Step 1 | PSS | * Acquisition of SS/PBCH block (SSB) symbol timing<br>* Search cell ID group for cell ID (3 hypothesis) |
| Step 2 | SSS | * Detect cell ID group (336 hypothesis) |
| Step 3 | PBCH DMRS | * SSB index and half-frame index (Detect slot and frame boundary) |
| Step 4 | PBCH | * Time information (80 ms, SFN, SSB index, HF)<br>* Configure RMSI CORESET/search space |
| Step 5 | PDCCH and PDSCH | * Cell access information<br>* RACH configuration |

Figure 10:
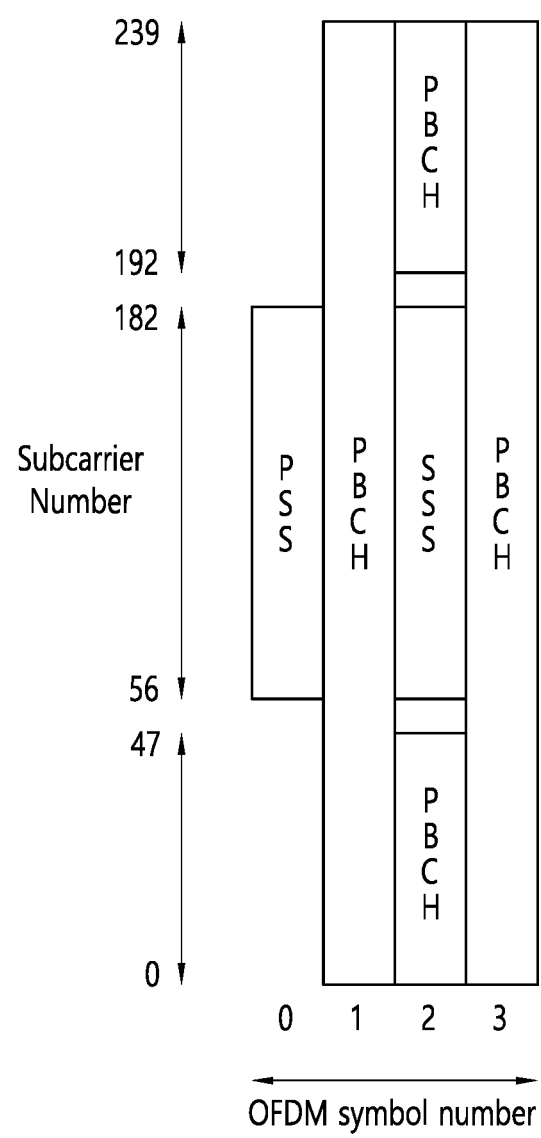
FIG. 10 illustrates a synchronization signal and PBCH (SS/PBCH) block.

FIG. 10 illustrates a synchronization signal and PBCH (SS/PBCH) block.

According to FIG. 10, an SS/PBCH block spans a PSS and SSS, which occupies one symbol and 127 subcarriers respectively, 3 OFDM symbols, and 240 subcarriers; however, on one symbol, the remaining PBCH may occupy the unused part of the SSS. Periodicity of an SS/PBCH block may be configured by the network, and the time point at which an SS/PBCH block may be transmitted is determined by subcarrier spacing.

Polar coding may be applied to the PBCH. Unless the network configures a UE to assume that a different subcarrier spacing is used, the UE may assume that a band-specific subcarrier spacing is used for the SS/PBCH block.

PBCH symbols may carry their own frequency-multiplexed DMRS. QPSK modulation may be used for the PBCH.

1008 unique physical layer cell IDs may be given by the equation 1 below.

$$N_{ID}^{cell}=3N_{ID}^{(1)}+N_{ID}^{(2)}, \text{ where } N_{ID}^{(1)} \in \{0,1 \ldots ,335\} \text{ and } N_{ID}^{(2)} \in \{0,1,2\} \quad [\text{Eq. 1}]$$

Meanwhile, a PSS sequence $d_{PSS}(n)$ for the PSS may be defined by the equation 2 below.

$$d_{PSS}(n)=1-2x(m)$$

$$m=(n+43N_{ID}^{(2)}) \bmod 127, 0 \leq n < 127, \quad [\text{Eq. 2}]$$

where $x(i+7)=(x(i+4)+x(0)) \bmod 2$ and $[x(6)\ x(5)\ x(4)\ x(3)\ x(2)\ x(1)\ x(0)]=[1\ 1\ 1\ 0\ 1\ 1\ 0]$.

The sequence may be mapped to the physical resource shown in FIG. 10.

Meanwhile, an SSS sequence $d_{SSS}(n)$ for the SSS may be defined by the equation 3 below.

$$d_{SSS}(n) = [1 - 2x_0((n + m_0) \bmod 127)][1 - 2x_1((n + m_1) \bmod 127)] \quad [\text{Eq. 3}]$$

$$m_0 = 15\left\lfloor \frac{N_{ID}^{(1)}}{112} \right\rfloor + 5N_{ID}^{(2)}$$

-continued $m_1 = N_{ID}^{(1)} \bmod 112 \ 0 \le n < 127$ $x_0(i+7) = (x_0(i+4) + x_0(i)) \bmod 2$ (Here, $x_1(i+7) = (x_1(i+1) + x_1(i)) \bmod 2$ and $[x_0(6) \ x_0(5) \ x_0(4) \ x_0(3) \ x_0(2) \ x_0(1) \ x_0(0)] =$ $[0 \ 0 \ 0 \ 0 \ 0 \ 0 \ 1]$ $[x_1(6) \ x_1(5) \ x_1(4) \ x_1(3) \ x_1(2) \ x_1(1) \ x_1(0)] =$ $[0 \ 0 \ 0 \ 0 \ 0 \ 0 \ 1].)$ The sequence may be mapped to the physical resource shown in FIG. 10.

For a half frame having an SS/PBCH block, the first symbol indexes for candidate SS/PBCH blocks may be determined according to the subcarrier spacing of the SS/PBCH blocks described later.

Case A—subcarrier spacing 15 kHz: First symbols of candidate SS/PBCH blocks have an index of {2, 8}+14*n. For a subcarrier frequency below 3 GHz, n=0, 1. For a subcarrier frequency above 3 GHz and below 6 GHz, n=0, 1, 2, 3.

Case B—subcarrier spacing 30 kHz: First symbols of candidate SS/PBCH blocks have an index of {4, 8, 16, 20}+28*n. For a subcarrier frequency below 3 GHz, n=0. For a subcarrier frequency above 3 GHz and below 6 GHz, n=0, 1.

Case C—subcarrier spacing 30 kHz: First symbols of candidate SS/PBCH blocks have an index of {2, 8}+14*n. For a subcarrier frequency below 3 GHz, n=0, 1. For a subcarrier frequency above 3 GHz and below 6 GHz, n=0, 1, 2, 3.

Case D—subcarrier spacing 120 kHz: First symbols of candidate SS/PBCH blocks have an index of {4, 8, 16, 20}+28*n. For a subcarrier frequency above 6 GHz, n=0, 1, 2, 3, 5, 6, 7, 8, 10, 11, 12, 13, 15, 16, 17, 18.

Case E—subcarrier spacing 240 kHz: First symbols of candidate SS/PBCH blocks have an index of {8, 12, 16, 20, 32, 36, 40, 44}+56*n. For a subcarrier frequency above 6 GHz, n=0, 1, 2, 3, 5, 6, 7, 8.

Candidate SS/PBCH blocks within a half frame may be indexed from 0 to L−1 in the ascending order along the time axis. A UE has to determine 2 LSB bits of the SS/PBCH block index when L=4 and 3 LSB bits when L>4 for each half frame from one-to-one mapping to the index of the DM-RS sequence transmitted within the PBCH. When L=64, the UE has to determine 3 MSB bits of the SS/PBCH block index for each half frame according to the PBCH payload bit $\bar{a}_{\bar{A}+5}, \bar{a}_{\bar{A}+6}, \bar{a}_{\bar{A}+7}$.

The UE may be configured by an upper layer parameter SSB-transmitted-SIB1 with indexes of SS/PBCH blocks in which the UE is unable to receive other signals or channels within REs overlapped with the REs corresponding to the SS/PBCH blocks. Also, the UE may be configured by an upper layer parameter SSB-transmitted with indexes of SS/PBCH blocks for each serving cell in which the UE is unable to receive other signals or channels within REs overlapped with the REs corresponding to the SS/PBCH blocks. Configuration by the SSB-transmitted may precede the configuration by the SSB-transmitted-SIB1. The UE may be configured with periodicity of a half frame with respect to reception of SS/PBCH blocks for each serving cell by an upper layer parameter SSB-periodicityServingCell. If the periodicity of a half frame with respect to reception of SS/PBCH blocks is not configured for the UE, the UE may assume periodicity of the half frame. The UE may assume that the periodicity is the same for all of SS/PBCH blocks within a serving cell.

Figure 11:
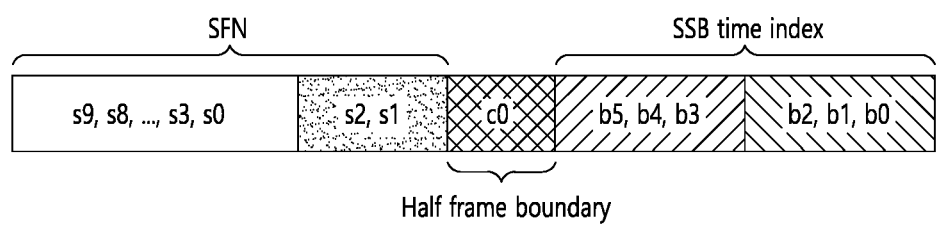
FIG. 11 illustrates a method for a UE to obtain timing information.

FIG. 11 illustrates a method for a UE to obtain timing information.

First, the UE may obtain 6-bit SFN information through a Master Information Block (MIB) received within the PBCH. Also, the UE may obtain 4-bit SFN within the PBCH transmission block.

Second, the UE may obtain a 1-bit half frame indicator as part of the PBCH payload. Below 3 GHz, the half frame indicator may be implicitly signaled as part of a PDBH DMRS with respect to $L_{max}=4$.

Lastly, the UE may obtain an SS/PBCH block index from a DMRS sequence and PBCH payload. In other words, the UE may obtain 3 LSB bits of the SS block index from the DMRS sequence during the period of 5 ms. Also, (above 6 GHz) 3 MSB bits of timing information may be carried explicitly within the PBCH payload.

In the initial cell selection process, the UE may assume that a half frame having SS/PBCH blocks are generated with periodicity of 2 frames. If an SS/PBCH block is detected, and $k_{SSB} \le 23$ for FR1 and $k_{SSB} \le 11$ for FR2, the UE determines that there exists a control resource set for Type0-PDCCH common search space. If $k_{SSB} > 23$ for FR1 and $k_{SSB} > 11$ for FR2, the UE determines that there does not exist a control resource set for Type0-PDCCH common search space.

For a serving cell that does not transmit SS/PBCH blocks, the UE obtains time and frequency synchronization to the serving cell based on reception of SS/PBCH blocks on a Pcell or PSCell of a cell group to which the serving cell belongs In what follows, random access (RA) will be described.

Before starting a physical random access procedure, layer 1 has to receive a set of SS/PBCH block indexes and provide a set of RSRP measurements to the upper layer.

Before starting the physical random access procedure, the layer 1 has to receive the following information from the upper layer:

Configuration of PRACH transmission parameter (PRACH preamble format, time resource, and frequency resource for PRACH transmission) and Parameter for determination of a root sequence and cyclic shift within a PRACH preamble sequence set with respect to the parameter (index of a logical root sequence table, cyclic shift (NCS), and set type (unrestricted set, restricted set A, or restricted set B).

In view of the physical layer, the L1 random access procedure includes a random access preamble (Msg1) within a PRACH, random access response (RAR) at the PDCCH/PDSCH (Msg2), and transmission of the PDSCH for transmission of the PUSCH and resolution of contention if applicable (Msg3).

If the random access procedure is started by a PDCCH order from the UE, transmission of a random access preamble may have the same subcarrier spacing with that for transmission of a random access preamble initiated by the upper layer.

If the UE is configured with two uplink carriers with respect to a serving cell and the UE detects the PDCCH order, the UE may use an UL/SUL indicator field value from the PDCCH order detected for determining an uplink subcarrier for transmission of the corresponding random access preamble.

The random access procedure of the UE may be summarized as shown in Table 6.

TABLE 6

| Signal type | Operation/Obtained information |
|---|---|
| Step 1 PRACH preamble of uplink | Initial acquisition of beam Random election of RA-preamble ID |
| Step 2 Random access response on DL-SCH | Timing array information RA-preamble ID Initial uplink grant, temporary C-RNTI |
| Step 3 Uplink transmission on UL-SCH | RRC connection request UE identifier |
| Step 4 Contention resolution of downlink | C-RNTI on the PDCCH with respect to the initial access C-RNTI on the PDCCH with respect to the UE in RRC_CONNECTED state |

Figure 12:
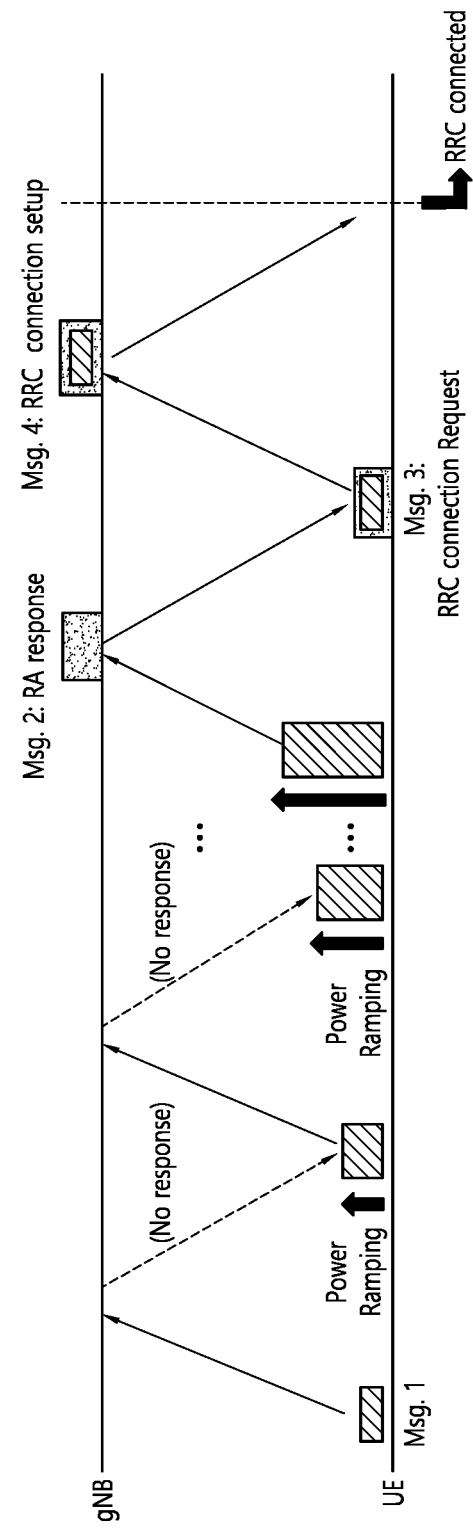
FIG. 12 illustrates a random access procedure.

FIG. 12 illustrates a random access procedure.

Referring to FIG. 12, first, a UE may transmit a PRACH preamble as Msg 1 (message 1) of the random access procedure in uplink.

Two random access preamble sequences having different lengths may be supported. A longer sequence having a length 839 is applied to subcarrier spacing of 1.25 kHz and 5 kHz, and a shorter sequence having a length 139 is applied to subcarrier spacing of 15, 30, 60, and 120 kHz. The longer sequence may support an inrestricted set and a limited set of types A and B, whereas the shorter sequence may only support the unrestricted set.

A plurality of RACH preamble formats are defined by one or more RACH OFDM symbols, different cyclic prefixes (CP), and guard times. The PRACH preamble setting to be used is provided as system information to the UE.

If there is no response for Msg1, the UE may retransmit a power-ramped PRACH preamble within a prescribed number of times. The UE calculates a PRACH transmission power for retransmission of the preamble based on the most recently estimated path loss and power ramping counter. If the UE performs beam switching, the power ramping counter does not change.

Figure 13:
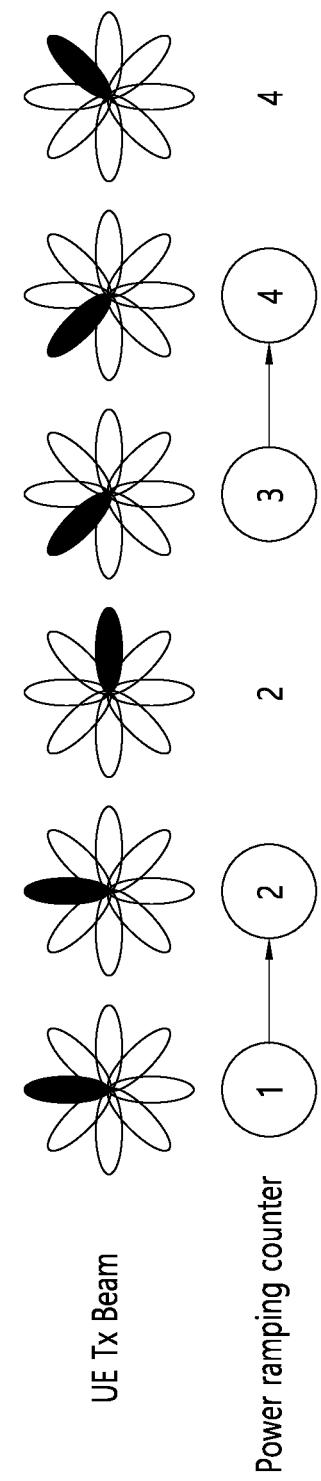
FIG. 13 illustrates a power ramping counter.

FIG. 13 illustrates a power ramping counter.

The UE may perform power ramping for retransmission of a random access preamble based on the power ramping counter. Here, as described above, the power ramping counter does not change when the UE performs beam switching during PRACH retransmission.

According to FIG. 13, when the UE retransmits the random access preamble for the same beam, such as in a case where the power ramping counter increases from 1 to 2 and from 3 to 4, the UE increases the power ramping counter by 1 each time. However, when the beam is changed, the power ramping counter may not be changed during PRACH retransmission.

Figure 14:
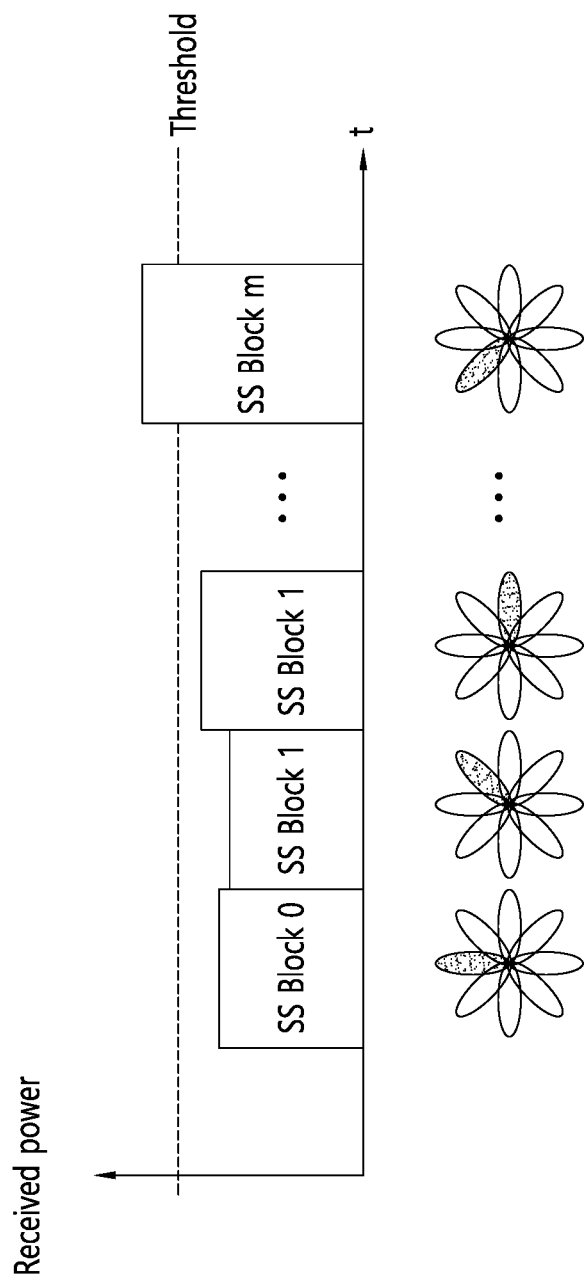
FIG. 14 illustrates a concept of a threshold of an SS block for RACH resource relationship.

FIG. 14 illustrates a concept of a threshold of an SS block for RACH resource relationship.

The system information may inform the UE of a relationship between SS blocks and RACH resources. A threshold of the SS block for the RACH resource relationship may be based on RSRP and network configuration. Transmission or retransmission of a RACH preamble may be based on an SS block that satisfies the threshold. Accordingly, in the example of FIG. 14, since SS block m exceeds the threshold of received power, the RACH preamble is transmitted or retransmitted based on the SS block m.

Thereafter, when the UE receives a random access response on a DL-SCH, the DL-SCH may provide timing arrangement information, an RA-preamble ID, initial uplink grant, and a temporary C-RNTI.

Based on the above information, the UE may perform uplink transmission on a UL-SCH as Msg3 (message 3) of the random access procedure. Msg3 may include an RRC connection request and a UE identifier.

In response to this, the network may transmit Msg4, which may be treated as a contention resolution message, in downlink. Upon receiving Msg4, the UE may enter an RRC connected state.

In what follows, the random access preamble will be described in more detail.

In the random access preamble transmission step, the physical random access procedure may be triggered by an upper layer, PDCCH order, or request for PRACH transmission. Configuration of PRACH transmission by the upper layer may include the following:

FIG. 12 illustrates a random access procedure.

Referring to FIG. 12, first, the UE may transmit a PRACH preamble to the uplink as message 1 (Msg 1) of the random access procedure.

A random access preamble sequence having two different lengths may be supported. A long sequence having a length of 839 is applied to the subcarrier spacing of 1.25 kHz and 5 kHz; and a short sequence having a length of 139 is applied to the subcarrier spacing of 15, 30, 60, and 120 kHz. The long sequence may support an unrestricted set and restricted sets of type A and B while the short sequence may support only the unrestricted set.

A plurality of PACH preamble formats are defined by one or more RACH OFDM symbols, different cyclic prefix (CP), and guard time. Configuration of a PRACH preamble to be used is transmitted to the UE as system information.

If there is no response for Msg 1, the UE may retransmit a power-wrapped PRACH preamble within a specified number of trials. The UE calculates PRACH transmission power for retransmission of a preamble based on the most recent estimated path loss and power wrapping counter. If the UE performs beam switching, the power wrapping counter does not change.

FIG. 13 illustrates a power wrapping counter.

The UE may perform power wrapping for retransmission of a random access preamble based on the power wrapping counter. Here, as described above, the power wrapping counter does not change when the UE performs beam switching at the time of retransmission of a PRACH.

According to FIG. 13, if the UE retransmits a random access preamble for the same beam as when the power wrapping counter is increased from 1 to 2 and 3 to 4, the UE increases the power wrapping counter by 1. However, if the beam is changed, the power wrapping counter may not change at the time of retransmission of the PRACH.

FIG. 14 illustrates a threshold for an SS block with respect to an RACH resource relationship.

System information about a relationship between SS blocks and RACH resources may be informed to the UE. A threshold for an SS block with respect to an RACH resource relationship may be based on the RSRP and network configuration. Transmission or retransmission of an RACH preamble may be based on an SS block satisfying the threshold. Therefore, in the example of FIG. 14, since SS block m exceeds a threshold for reception power, the RACH preamble may be transmitted or retransmitted based on the SS block m.

Afterwards, if the UE receives a random access response on the DL-SCH, the DL-SCH may provide timing arrangement information, RA-preamble ID, initial uplink grant, and temporary C-RNTI.

Based on the information, the UE may perform uplink transmission of message 3 (Msg3) of the random access procedure on the UL-SCH. Msg3 may include an RRC connection request and UE identifier.

In response to the transmission, the network may transmit Msg4, which may be treated as a contention resolution message, to the downlink. By receiving the message, the UE may enter the RRC connection state.

In what follows, the random access preamble will be described in more detail.

In the random access preamble transmission step, the physical random access procedure may be triggered by an upper layer, PDCCH order, or request for PRACH transmission. Configuration of PRACH transmission by the upper layer may include the following:

Configuration about PRACH transmission; and
Preamble index, preamble subcarrier spacing, $P_{PRACH,target}$, corresponding RA-RNTI, and PRACH resource.

The preamble may be transmitted according to a selected PRACH format having transmission power of $P_{PRACH,b,f,c}(i)$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions 1/SSB-perRACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:

First, ascending order of a preamble index within a single PRACH occasion,
Second, ascending order of frequency resource index with respect to frequency multiplexed PRACH occasions,
Third, ascending order of time resource index with respect to time multiplexed PRACH occasions within the PRACH slot, and
Fourth, ascending order of index with respect to PRACH slots.

The period that starts from frame 0, at which SS/PBCH blocks are mapped to PRACH occasions, is the minimum value of the PRACH configuration periods {1, 2, 4}, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}+\Delta_{BWPSwitching}+\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay} > 0$.

In what follows, the random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type1-PDCCH common search space comprising at least cell $[(\Delta \cdot N_{slot}^{subframe} \cdot N_{symb}^{slot}/T_{sf}]$ symbols after the last symbol of preamble sequence transmission. The length of the windows as expressed in terms of the number of slots may be provided by the upper layer parameter rar-WindowLength based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the random access preamble identity (RAPID) related to the PRACH transmission. If the upper layer identifies RAPID within an RAR message(s) of the DL-SCH transmission block, the upper layer may indicate an uplink grant to the physical layer. This may be referred to as a random access response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 7. Table 7 shows the size of a random access response grant configuration field.

TABLE 7

| RAR grant field | Number of bits |
|---|---|
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits.

MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 8 below.

TABLE 8

| TPC Command | Value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved.

As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 9. Table 9 illustrates a frequency offset of the second hop with respect to the Msg3 PUSCH transmission employing frequency hopping.

TABLE 9

| Number of PRBs in initial active UL BWP | Value of $N_{UL,hop}$ Hopping Bits | Frequency offset for 2nd hop |
|---|---|---|
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $N_{BWP}^{size}/4$ |
|  | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1.

When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2} N_{TA,max}+0.5$ msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_{T,1}+0.5$ msec. $N_{T,1}$ represents the duration of $N_1$ symbols corresponding to the PDSCH reception with respect to the PDSCH processing capability 1 when an additional PDSCH DM-RS is configured.

In what follows, power saving will be described.

The battery life of a UE is an important factor of user experience that affects selection of a particular 5G handset and/or service. Since the NR system is capable of high speed data transfer, user data is expected to increase explosively and be provided in a very short time period.

Meanwhile, energy efficiency of a device is related to support for two aspects of efficient data transmission in the presence of a load and low energy consumption in the absence of data. Here, efficient data transmission in the presence of a load may be checked by average spectrum efficiency while low energy consumption in the absence of data may be estimated by a sleep ratio.

As power saving techniques for a UE, UE adaptation to traffic and power consumption pattern, adaption to the change of frequency/time, adaptation to antenna, adaptation to DRX configuration, adaptation to UE processing capability, adaptation for reduction of PDCCH monitoring/decoding, power saving signal/channel/procedure for triggering adaptation to UE power consumption, power consumption reduction in the RRM measurement, and so on may be taken into account.

Here, with respect to the adaptation to DRX configuration, a downlink-shared channel (DL-SCH) characterized by support for UE DRX that enables power saving and paging channel (PCH) (where a DRX period may be indicated by the network to the UE) characterized by support for UE DRX that enables power saving may be taken into account.

Also, with respect to the adaption to UE processing capability, the UE may report static UE wireless access capability at least when requested by the network. An gNB may inform the UE of which UE capability has to be reported based on band information. If allowed by the network, the UE may transmit, to the gNB, a temporary capability limit request for signaling possibility of a limited use of part of the capability (for example, due to hardware sharing, interference, or overheating). Afterwards, the gNB may confirm or reject the request. The temporary capability limit has to be transparent to 5GC. Static capabilities are mainly stored in the 5GC.

Also, with respect to the adaptation for reduction of PDCCH monitoring/decoding, the UE monitors a set of PDCCH candidates in the monitoring occasions configured within one or more CORESETs according to the corresponding search space configuration. A CORESET is composed of a set of PRBs having duration spanning 1 to 3 OFDM symbols. Resource Element Groups (REGs) and Control Channel Elements (CCEs), which are composed of resource units, are defined within a CORESET where each CCE is composed of one set of REGs. Control channels are formed by aggregation of CCEs. Different code rates for the control channels are implemented by aggregation of using a different number of CCEs. Mapping between interleaved and non-interleaved CCEs and REGs is supported within the CORESET.

Also, with respect to the power saving signal/channel/procedure for triggering adaptation to UE power consumption, when carrier aggregation (CA) is configured, to realize reasonable UE battery consumption, an activation/deactivation mechanism of cells is supported. If a cell is deactivated, the UE does not have to receive the corresponding PDCCH or PDSCH, and the UE is made incapable of transmitting the corresponding uplink transmission and does not have to perform CQI measurement, either. On the contrary, if a cell is activated, the UE has to receive the PDCCH and PDSCH (when the UE is configured to monitor the PDCCH from the SCell) and is expected to perform CQI measurement. NG-RAN ensures that SCells mapped to the PUCCH SCell are deactivated before the PUCCH SCell is modified or removed.

Also, with respect to the power consumption reduction in the RRM measurement, if two types of measurement are available, RRM configuration may include SSB about a reported cell(s) and beam measurement information related to CSI-RS (about layer 3 mobility).

Also, if carrier aggregation is configured, RRM configuration may include a list of best cells at the respective frequencies available with measurement information. Also, RRM measurement information may include beam measurement about listed cells belonging to a target gNB.

In what follows, Discontinuous Reception (DRX), which is one of techniques that may be used to implemented UE power saving, will be described.

A DRX-related UE procedure may be summarized as shown in Table 10.

TABLE 10

| | Signal type | UE procedure |
|---|---|---|
| Step 1 | RRC signaling (MAC-CellGroupConfig) | Reception of DRX configuration information |
| Step 2 | MAC CE ((Long) DRX command MAC CE) | Reception of DRX command |
| Step 3 | — | PDCCH monitoring during on-duration of DRX period |

Figure 15:
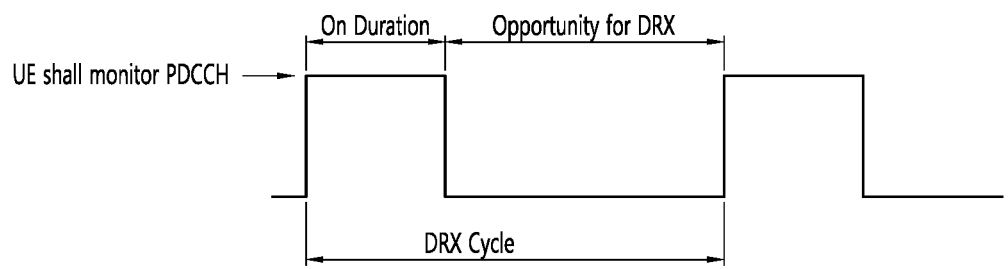
FIG. 15 illustrates a DRX period.

FIG. 15 illustrates a DRX period.

According to FIG. 15, the UE uses DRX in the RRC_IDLE and RRC_INACTIVE states to reduce power consumption. If DRX is set, the UE performs a DRX operation according to the DRX configuration information. The UE operating under the DRX scheme repeatedly turns on and off the reception operation.

For example, if DRX is set, the UE attempts reception of a downlink channel PDCCH only within a preconfigured time period but does not attempt reception of the PDCCH in the remaining time period. The time period during which the UE has to attempt PDCCH reception is defined as an on-duration period, where the on-duration period is defined once per DRX period.

The UE may receive DRX configuration information from the gNB through RRC signaling and may perform a DRX operation through reception of a (long) DRX command MAC CE.

The DRX configuration information may be included in the MAC-CellGroupConfig. The MAC-CellGroupConfig, an IE, may be used for configuration of MAC parameters with respect to a cell group, which includes DRX.

The DRX command MAC CE or long DRX command MAC CE may be identified by the MAC PDU sub-header having the LCID, which may have a fixed size.

The Table 11 below illustrates LCID values with respect to the DL-SCH.

TABLE 11

| Index | LCID values |
|---|---|
| 111011 | Long DRX Command |
| 111100 | DRX Command |

The PDCCH monitoring operation of the UE is controlled by DRX and bandwidth adaptation (BA). Meanwhile, if DRX is set, the UE doesn't have to continuously perform PDCCH monitoring. Meanwhile, DRX has the following characteristics:

On-duration: This is the period during which the UE waits to receive the next PDCCH after the UE wakes up. If the UE successfully decodes the PDCCH, the UE maintains the wake-up state and starts inactivity timer, Inactivity timer: This is the period during which the UE waits for successful PDCCH decoding since the last successful PDCCH decoding and also the period during which the UE sleeps again when the UE fails the PDCCH decoding. The UE has to restart the inactivity timer after single successful decoding of the PDCCH with respect to the single, first transmission (in other words, it is not intended for retransmission), Retransmission timer: This is the period during which retransmission is expected, and Period: Period specifies periodic repetition of the on-duration and succeeding, available inactivity periods.

In what follows, DRX within the MAC layer will be described. The MAC entity below may represent a UE or a MAC entity of the UE.

The MAC entity may be configured by RRC having a DRX function that controls the PDCCH monitoring activity of a UE with respect to C-RNTI, CS-RNTI, TPC-PUCCH-RNTI, TPC-PUSCH-RNTI, and TPC-SRS-RNTI of the MAC entity. When the DRX operation is employed, the MAC entity has to monitor the PDCCH. In the RRC_CONNECTED state, if DRX is set, the MAC entity may monitor the PDCCH discontinuously by using the DRX operation. Otherwise, the MAC entity has to monitor the PDCCH continuously.

RRC controls the DRX operation by configuring parameters of the DRX configuration information.

If the DRX period is set, activity time includes the following time periods.

Time period during which drx-onDurationTimer or drx-InactivityTimer or drx-RetransmissionTimerDL or drx-RetransmissionTimerUL or ra-ContentionResolutionTimer is in operation; or Time period during which a scheduling request is transmitted on the PUCCH and pending; or Time period during which a PDCCH that indicates new transmission to the C-RNTI of the MAC entity after a random access response with respect to a random access preamble not selected by the MAC entity among contention-based random access preambles has been successfully received.

If DRX is set, the UE may follow the procedure described below.

"1> If a MAC PDU is transmitted from a configured uplink grant,

2> drx-HARQ-RTT-TimerUL with respect to the corresponding HARQ process is started immediately after the first reception of the corresponding PUSCH transmission;
2> drx-RetransmissionTimerUL with respect to the corresponding HARQ procedure is stopped.
1> If drx-HARQ-RTT-TimerDL expires:
2> If data of the corresponding HARQ procedure has not been successfully decoded:
3> drx-RetransmissionTimerDL with respect to the corresponding HARQ procedure is started.
1> If drx-HARQ-RTT-TimerUL expires:
2> drx-RetransmissionTimerUL with respect to the corresponding HARQ procedure is started.
1> If a DRX command MAC CE or (long) DRX command MAC CE is received:
2> drx-onDurationTimer is stopped;
2> drx-InactivityTimer is stopped.
1> If drx-InactivityTimer expires or DRX command MAC CE is received:
2> If a short DRX period is set:
3> drx-ShortCycleTimer is started or restarted;
3> A short DRX period is used.
2> Otherwise:
3> A long DRX period is used.
1> If drx-ShortCycleTimer expires:
2> A long DRX period is used.
1> If a long DRX command MAC CE is received:
2> drx-ShortCycleTimer is stopped;
2> A long DRX period is used.
1> If a short DRX period is used and [(SFN*10)+subframe number] modulo (drx-ShortCycle)=(drx-StartOffset) modulo (drx-ShortCycle); or
1> If a long DRX period is used and [(SFN*10)+subframe number] modulo (drx-LongCycle)=drx-StartOffset:
2> If drx-SlotOffset is set:
3> drx-onDurationTimer is started after drx-SlotOffset.
2> Otherwise:
3> drx-onDurationTimer is started.
1> If an MAC entity is within the activity time:
2> PDCCH is monitored;
2> If the PDCCH indicates DL transmission or DL allocation is configured:
3> drx-HARQ-RTT-TimerDL with respect to the corresponding HARQ procedure is started immediately after transmission of the corresponding PUCCH.
3> drx-RetransmissionTimerDL with respect to the corresponding HARQ procedure is stopped.
2> If PDCCH indicates UL transmission:
3> drx-HARQ-RTT-TimerUL with respect to the corresponding HARQ process is started immediately after the first reception of the corresponding PUSCH transmission;
3> drx-RetransmissionTimerUL with respect to the corresponding HARQ procedure is stopped.
2> If PDCCH indicates new transmission (UL or DL):
3> drx-InactivityTimer is started or restarted.
1> Otherwise (in other words, if it is not part of the activity time):
2> type-O-triggered SRS is not transmitted.
1> If CQI masking (cqi-Mask) is configured by the upper layer:
2> If drx-onDurationTimer does not operate:
3> CSI report is not performed on the PUCCH.
1> Otherwise:
2> If the MAC entity is not within the activity time:
3> CSI report is not performed on the PUCCH".

Irrespective of whether the MAC entity monitors the PDCCH or not, the MAC entity may transmit HARQ feedback and type-1-triggered SRS if the MAC entity is expected.

If the activity time is not a complete PDCCH occasion (namely, a case where activity time starts in the middle of the PUCCH occasion or expires), In what follows, DRX for paging will be described.

The UE may use DRX in the RRC_IDLE and RRC_INACTIVE states to reduce power consumption. The UE may monitor one paging occasion (PO) for each DRX cycle, where one PO may comprise a plurality of time slots (for example, subframes or OFDM symbols) to which paging DCI may be transmitted. In a multi-beam operation, the UE may assume that the length of one PO corresponds to one period of beam sweeping, and the same paging message is repeated within all of the beams having a sweeping pattern. The paging message for paging initiated by the RAN is the same as that initiated by the CN.

One paging frame (PF) is one radio frame and may include one or a plurality of POs.

When receiving RAN paging, the UE initiates an RRC connection resume procedure. If the UE receives paging initiated by the CN while being in the RRC_INACTIVE state, the UE may transition to the RRC_IDLE state and inform of the transition.

Meanwhile, a new RAT system such as NR may use the OFDM transmission scheme or a similar transmission scheme. The new RAT system may follow OFDM parameters different from the OFDM parameters of the LTE. Or the new RAT system may adopt the numerology of the conventional LTE/LTE-A system but may employ larger system bandwidth (for example, 100 MHz). Or in the new RAT system, one cell may support a plurality of numerologies. In other words, UEs operating under different numerologies may coexist in one cell.

In the NR system, OFDM(A) numerology (for example, SCS, CP length, and so on) may be configured differently among a plurality of cells aggregated into one UE. Accordingly, the (absolute time) period of a time resource (for example, subframe, slot, or TTI) (for the sake of convenience, it is called a Time Unit (TU)) composed of the same number of symbols may be configured differently among aggregated cells.

Figure 16:
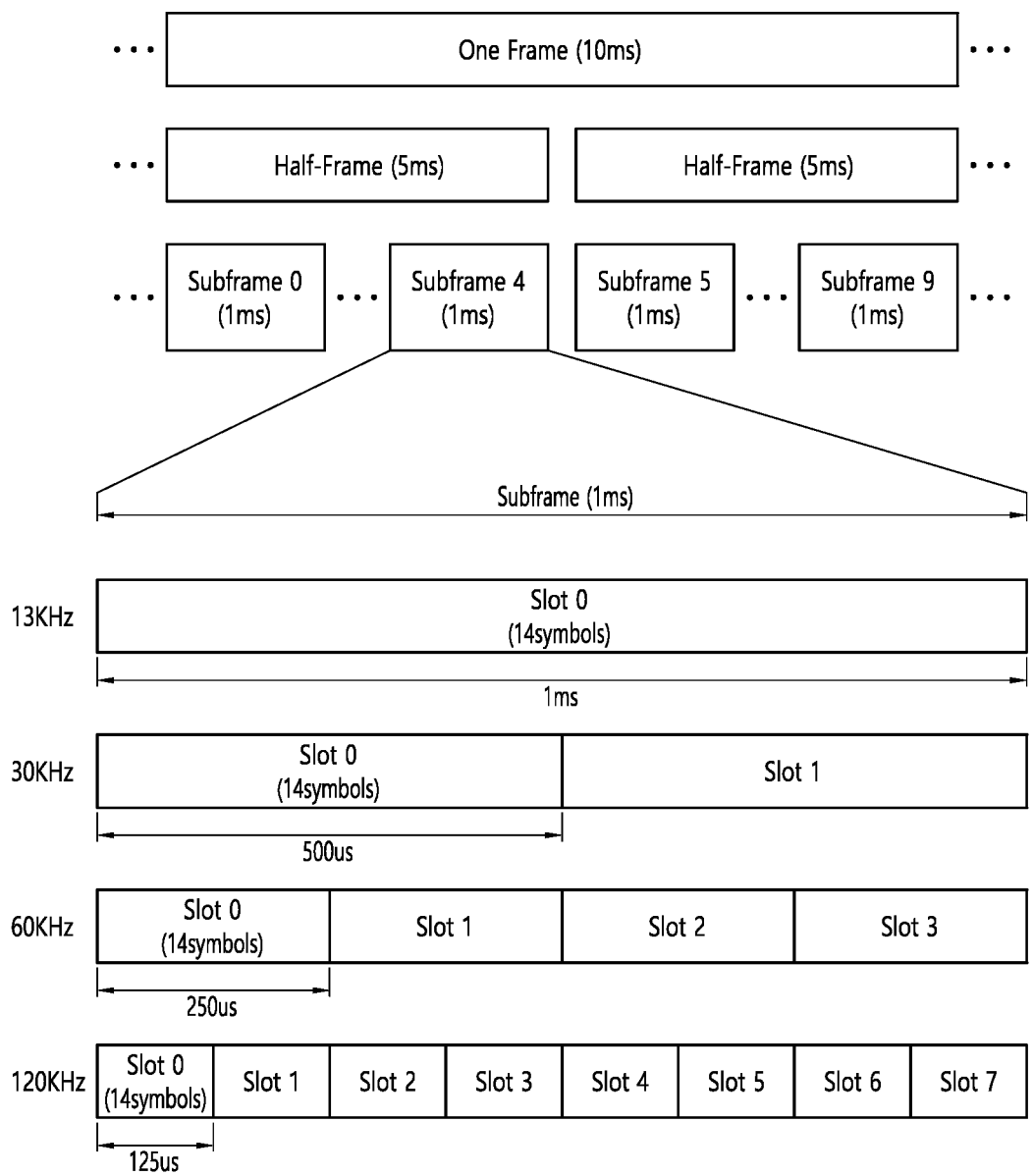
FIG. 16 illustrates a structure of a radio frame that may be used in the next-generation communication.

FIG. 16 illustrates a structure of a radio frame that may be used in the next-generation communication.

A radio frame has a length of 10 ms and may be defined by two half frames (HFs) of 5 ms. A half frame may include five subframes (SFs) of 1 ms. A subframe may be divided into one or more slots, and the number of slots within a subframe may be determined by subcarrier spacing (SCS). Each slot may include 12 or 14 OFDM(A) symbols according to the Cyclic Prefix (CP) employed.

When the normal CP is used, each slot may include 14 symbols. When the extended CP is used, each slot may include 12 symbols. Here, a symbol may include OFDM symbols (or CP-OFDM symbols) and SC-FDMA symbols (or DFT-s-OFDM symbols).

Figure 17:
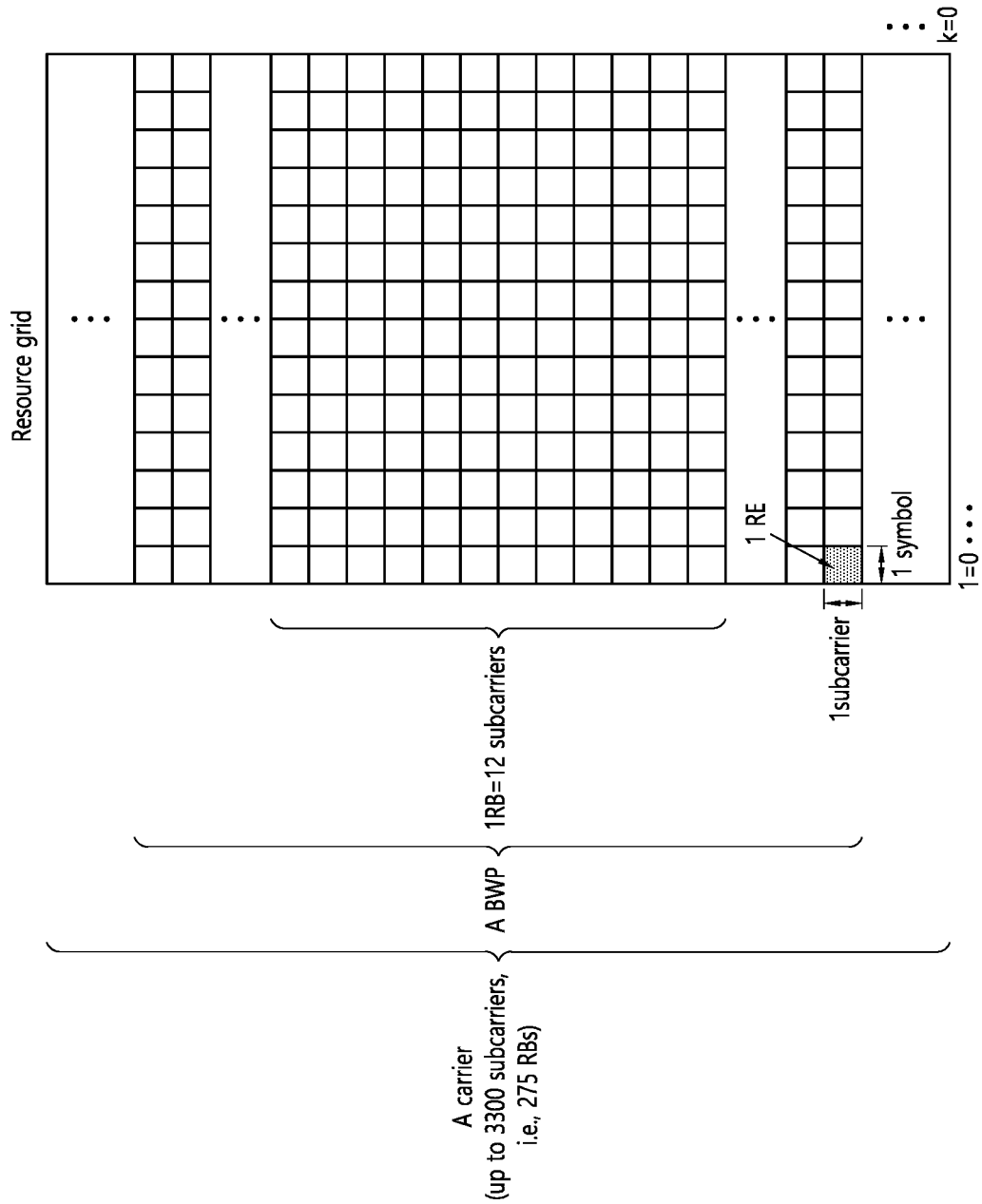
FIG. 17 illustrates a slot structure of a frame used in the next-generation communication.

FIG. 17 illustrates a slot structure of a frame used in the next-generation communication.

A slot includes a plurality of symbols in the time domain. For example, in the case of normal CP, one slot includes 14 symbols; in the case of extended CP, one slot may include 12 symbols. Or in the case of normal CP, one slot may include 7 symbols; in the case of extended CP, one slot may include 6 symbols. Configuration of a slot may be set differently according to the standard specification.

A carrier component includes a plurality of subcarriers in the frequency domain. A resource block (RB) may be defined by a plurality of contiguous subcarriers in the frequency domain. Bandwidth part (BWP) may be defined by a plurality of contiguous (P)RBs in the frequency domain and may correspond to one numerology (for example, SCS and CP length). A carrier component may include up to N (for example, 5) BWPs. Data communication is performed through an activated BWP, and one BWP may be activated for one UE. In the resource grid, each element is referred to as a resource element (RE), and one complex symbol may be mapped to each individual element.

Figure 18:
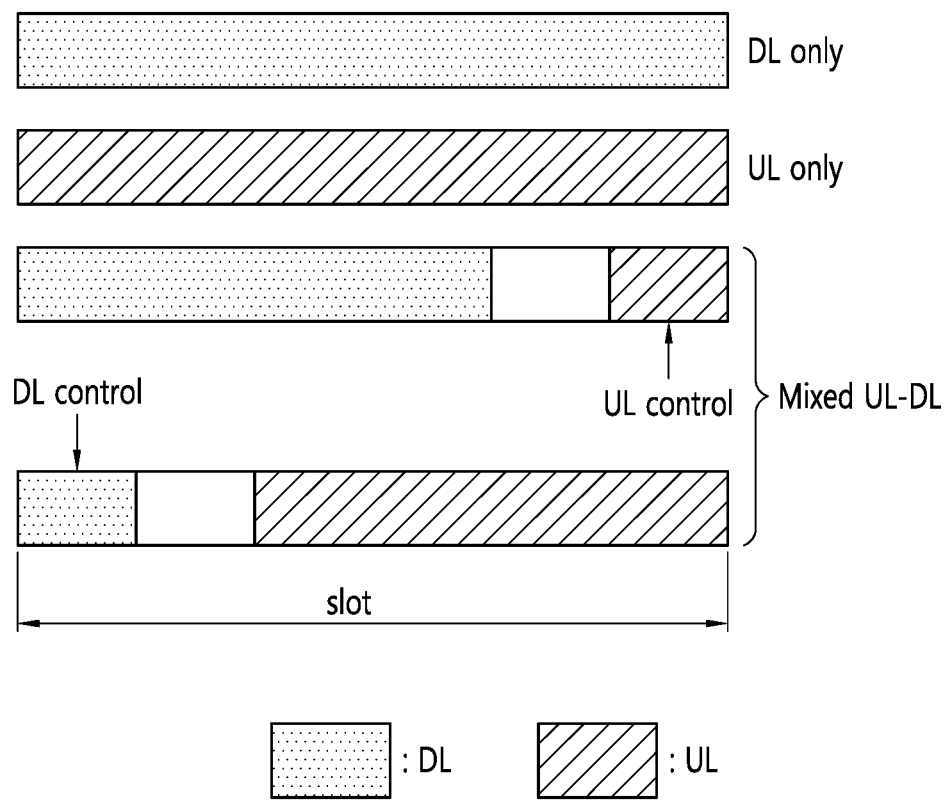
FIG. 18 illustrates a structure of self-contained slot.

FIG. 18 illustrates a structure of self-contained slot.

Referring to FIG. 18, a self-contained structure may be supported, in which one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data.

As one example, one slot may correspond to one of the following configurations. Each period is listed in the time order.

1. DL only configuration
2. UL only configuration
3. Mixed UL-DL configuration
DL region+Guard Period (GP)+UL control region
DL control region+GP+UL region Here, a DL region may correspond to (i) a DL data region or (ii) DL control region plus DL data region while a UL region may correspond to (i) an UL data region or (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling data may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

In what follows, a method for determining (configuring) a resource direction in the Integrated Access and Backhaul (IAB) system will be proposed.

First, abbreviations are defined.
IAB: Integrated Access and Backhaul
CSI-RS: Channel State Information Reference Signal
SFI: Slot Format related Information
CORESET: Control resource set
IAB: Integrated Access & Backhaul
DgNB: Donor gNB
RN: Relay node
D: downlink
U: uplink
F (or X): flexible
AC: Access
BH: Backhaul
DU: Distributed Unit
MT: Mobile terminal
CU: Centralized Unit In what follows, an IAB-node refers to a node capable of supporting wireless access of a UE and transferring access traffic to another node (for example, a gNB, relay, or other UE).

IAB-donor refers to a node that provides a UE with an interface to the core network and provides an IAB-node with a wireless backhaul function.

Technologies mentioned below may be used for various wireless access systems such as CDMA, FDMA, TDMA, OFDMA, and SC-FDMA. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as the IEEE 802.11 (Wi-Fi), IEEE 802.16 (WiMAX), IEEE 802-20, and E-UTRA (Evolved UTRA). UTRA is part of Universal Mobile Telecommunications System (UMTS). 3rd Generation Partnership Project (3GPP) Long Term Evolution (LTE) is part of Evolved UMTS (E-UMTS) that uses E-UTRA, and LTE-Advanced (LTE-A)/LTE-A pro is an evolved version of the 3GPP LTE. 3GPP New Radio or New Radio Access Technology (NR) is an evolved version of the 3GPP LTE/LTE-A/LTE-A pro.

To clarify descriptions, the present disclosure is described based on the 3GPP communication system (for example, LTE-A, NR), but the technical principles of the present disclosure are not limited to the specific system. LTE refers to the technology after the 3GPP TS 36.xxx Release 8. More specifically, the LTE technology after the 3GPP TS 36.xxx Release 10 is referred to as the LTE-A, and the LTE technology after the 3GPP TS 36.xxx Release 13 is referred to as the LTE-A pro. The 3GPP NR refers to the technology after the TS 38.xxx Release 15. LTE/NR may be referred to as the 3GPP system. "xxx" denotes a specific number of the standard document. LTE/NR may be collectively called the 3GPP system. The background technology, terminologies, and acronyms used in the description of the present disclosure may reference those specified in the standard documents published prior to the present disclosure.

In what follows, integrated access and backhaul (IAB) will be described.

One of potential technologies that enable cellular network disposition scenarios and applications in the future disposes NR cells flexibly and densely without causing congestion of transfer networks by supporting wireless backhaul and relay links.

NR may use/dispose a massive MIMO or multi-beam system by default, and the bandwidth expected to be used in the NR is larger than that for the LTE. Therefore, an integrated access and backhaul (IAB) link is needed, through which a plurality of control and data channels/procedures defined for providing access to UEs may be constructed.

In the IAB environment, to prevent interference among a plurality of nodes and UEs, collision in the resource direction has to be minimized. For example, suppose a resource allocated by a first UE to transmit an uplink signal to a first node at the same occasion and in the same frequency band is a resource for uplink (U) and a resource allocated by a second UE to receive a downlink signal from a second node is a resource for downlink (D). In this case, an uplink signal that the first UE transmits by using the allocated resource may act as interference on the resource allocated to the second UE.

There may be various factors causing interference in the IAB environment; however, if the resource direction may be at least defined to minimize interference between nodes/UEs, stability and performance of an IAB system will be further ensured.

Figure 19:
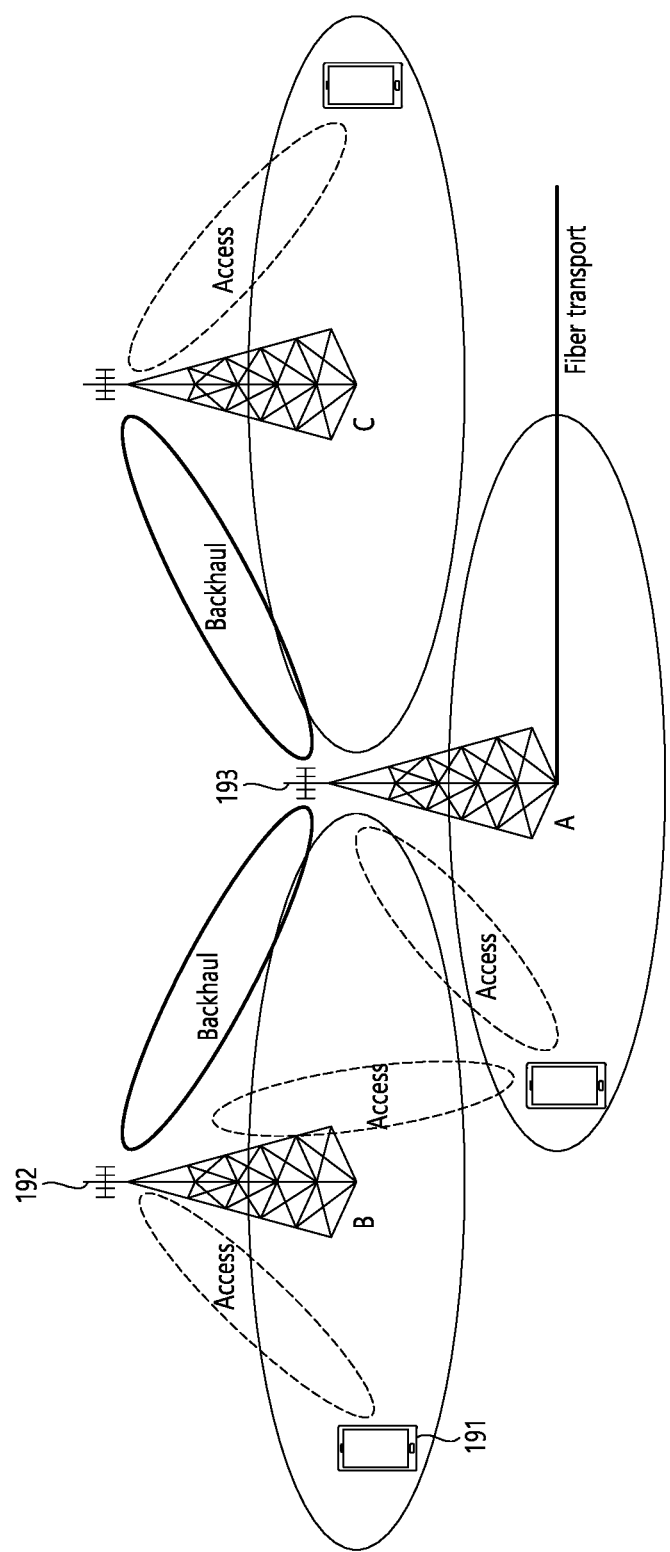
FIG. 19 illustrates one example of a network including integrated access and backhaul (IAB) links.

FIG. 19 illustrates one example of a network including integrated access and backhaul (IAB) links.

A wireless link between a UE 191 and a relay node or gNB node 192 may be referred to as an access link while a wireless link between the relay node or the gNB node 192 and other relay node or other gNB node 193 may be referred to as a backhaul link. At least one gNB node or relay node may be connected to the core network in a wired manner.

An access and backhaul links may use the same frequency band or different frequency bands.

Figure 20:
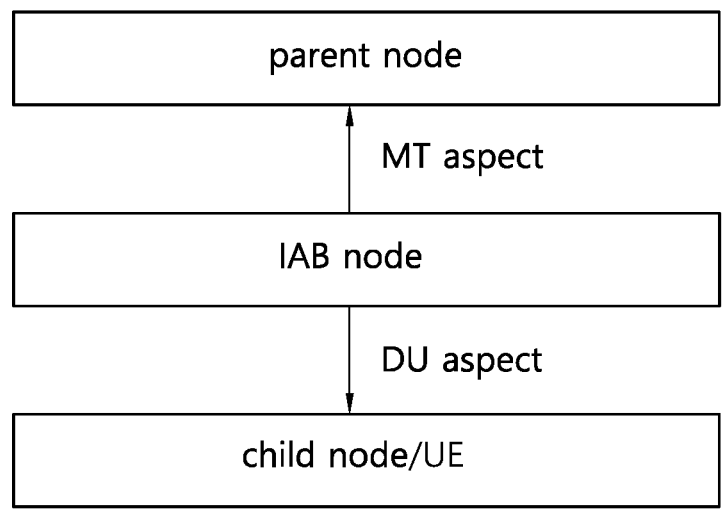
FIG. 20 exemplifies nodes in an IAB environment.

FIG. 20 exemplifies nodes in an IAB environment.

Referring to FIG. 20, an IAB node may be considered to be similar to a UE in relation to a parent node, and the IAB node may view the parent node from a mobile terminal (MT) aspect.

In addition, the IAB node may be considered to be similar to a distributed unit (DU) such as a BS or a repeater in relation to a child node, and the JAB node may view the child node from a DU aspect.

Figure 21:
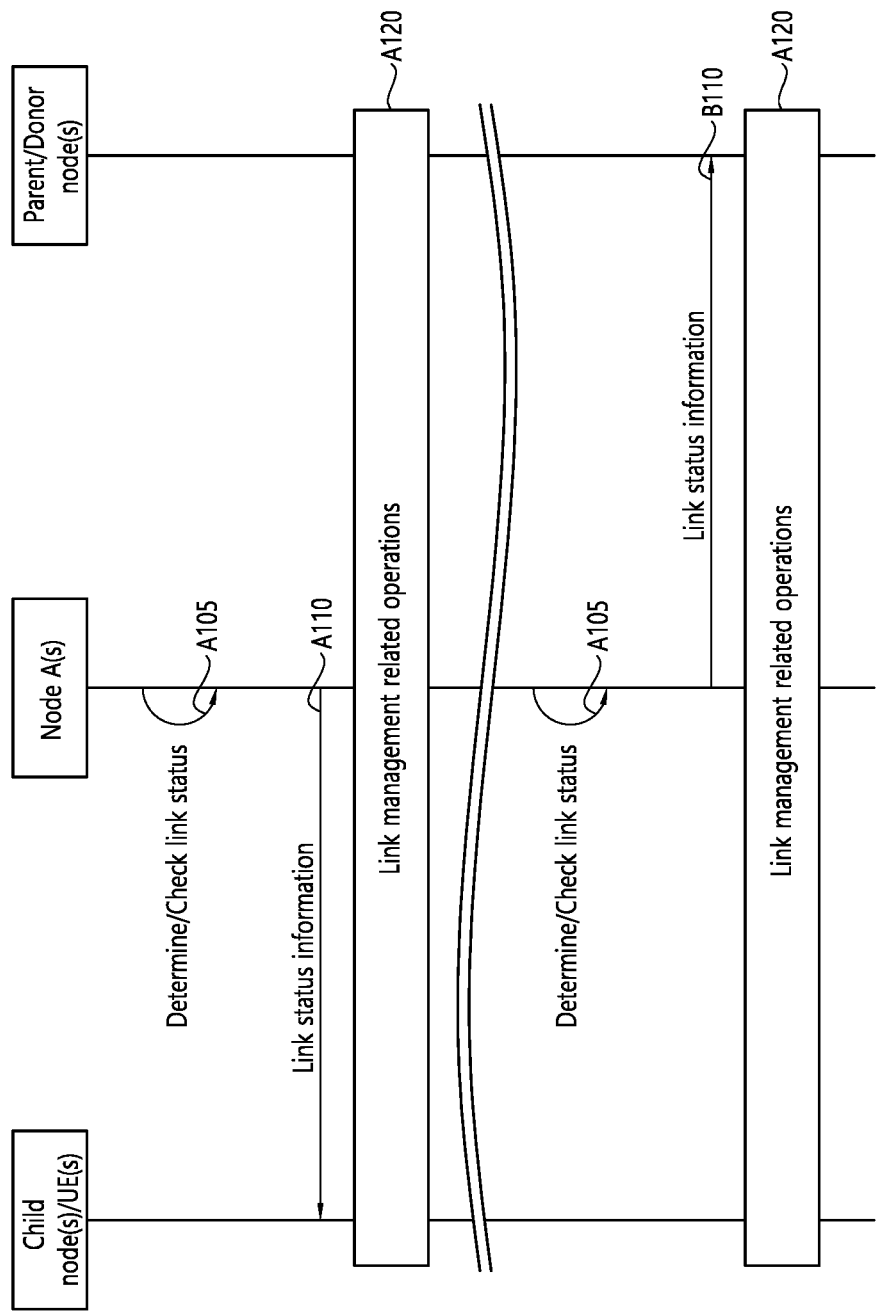
FIG. 21 shows operations of nodes according to an embodiment of the present disclosure.

FIG. 21 shows operations of nodes according to an embodiment of the present disclosure.

A term link may be used interchangeably with a term "connection".

Referring to FIG. 21, node A may check/determine a link status (A105, B105$_{[s1]}$). For example, node A may check a connection with a child node/UE. Node A may check a connection with a parent/donor node.

Node A may provide information on a link status of the parent/donor node to the child node/UE (A110) or node A provides information on the link status of the child node/UE to the parent/donor node (B110). The information on the link status may be, for example, information on link loss, information on link unstableness, or information on link unstableness resolution, but is not limited thereto.

Thereafter, the child node/UE, node A, and/or the parent/donor node may each perform procedures related to link management as described below (A120, B120). For example, if necessary, node A may perform a link restoration procedure. If necessary, the child node/UE may perform a link restoration procedure.

A case where a certain node A loses a connection with its parent node in a situation where node A has a connection with a lower child node or UE (UE) may be considered. Here, node A should quickly try to connect to another node (e.g., A120 of FIG. 21), and at the same time, node A may notify the lower child node and the UE of such connection loss (e.g., A110 of FIG. 21). However, the lower child node and the UE may also perform their own connection recovery operation (e.g., A120 of FIG. 21) and a trigger signal from node A may be required to perform a connection recovery operation between the child node and the terminal.

Alternatively, a case where node A loses its connection with the lower child node or UE may be considered. In this case, it is necessary to inform the parent node or a donor node of this fact (e.g., B110 of FIG. 21). When this indication is transmitted to the parent/donor node, the parent/donor node may allocate different resources of node A for the child node or UE (e.g., B120[s2] of FIG. 21).

Link loss may be determined based on criteria defined in Section 3.1.1 and Section 3.1.2 (e.g., A105 and B105 of FIG. 21). When node A determines that the link with the parent node is lost according to the criteria in Section 3.1.1, node A may provide link lost signaling to its child node and UE (e.g., A110 of FIG. 21). If node A determines that the link with the child node or the UE is lost according to the criteria in Section 3.1.2, node A may perform signaling to inform its parent node about the corresponding link loss (e.g., B110 of FIG. 21).

The processes of FIG. 21 may be applied to examples to be described later, but embodiments to be described later are not limited to FIG. 21.

Section 3.1.1. Losing Connection from Child Node Side

Node A may understand a case where a connection with its parent node is lost as following cases (e.g., A105 of FIG. 21).

Option 0: A case where the connection established with parent node is lost

Option 1: A case where node A may be connected with the parent node by a single beam and the connection using the corresponding beam is lost Option 2: A case where node A may be connected with the parent node by multiple beams and connection through a beam with the highest priority for connection is lost Option 3: A case where node A may be connected with the parent node by multiple beams and a connection for all beams is impossible Option 4: A case where node A may be connected with multiple parent nodes and the connection with the parent node with the highest priority is lost Option 5: A case where node A may be connected with multiple parent nodes and a connection with all parent nodes is impossible Option 6: A case where radio link failure (RLF) occurs Option 7: A case where beam failure is declared Option 8: A case where a beam failure is declared and beam recovery is not made based on contention-free beam failure recovery (BFR) and is switched to a contention-based RACH procedure Option 9: A case where an instance of beam failure occurs even once In these cases, Node A's behavior may vary according to each option.

Section 3.1.2. Losing Connection from Parent Node Side

Node A may understand a case where a connection with its child node/UE is lost as following cases (e.g., B105 of FIG. 21).

Option 0: A case where the connection established with the child node/UE is lost Option 1: A case where node A may be connected with the child node/UE by a single beam and the connection using the corresponding beam is lost Option 2: A case where node A may be connected with the child node/UE by multiple beams and a connection through a beam with the highest priority for connection is lost Option 3: A case where node A may be connected with the child node/UE by multiple beams, and a connection for all beams is not possible Option 4: A case where RLF occurs from child node/UE Option 5: A case where a BFR request is received from the child node/UE Option 6: A case where node A receives BLF between the child node/UE and node A from another parent node of a child node/UE Option 7: A case where node A receives beam failure between the child node/UE and node A from the other parent node of the child node/UE Option 8: A case where beam failure instance occurs even once and is reported from the child node/UE Option 9: A case where no ACK/NACK is received In these cases, Node A's behavior may vary according to each option.

Section 3.2. Link Unstableness Indication

Node A may notify a parent node, a child node, and a UE about a link disconnection (e.g., A110 and/or B110 of FIG. 21).

Node A may inform IAB/doner nodes and a UE associated with node A about a reason for unstableness for a certain link (e.g., a beam failure instance, low RSRP/RSRQ, a low CQI, low throughput, etc.).

Alternatively, if node A informs the parent node, child node, and UE of link unstableness as a link disconnection is expected (e.g., A110 and/or B110 of FIG. 21), the parent node, child node, and UE may use the information for link management. Operations (or actions) that the parent node, the child node, and the UE may perform (or take) when the link unstableness is indicated may be the same as or similar to operations when a link disconnection indication is received, and since the link is still maintained, a range in which the parent node, the child node, and the UE may operate may be expanded and stability may be improved.

Link unstableness may be determined according to the criteria defined in Sections 3.2.1 and 3.2.2 below (e.g., A105 and/or B105 of FIG. 21). If node A determines that the link with the parent node is unstable according to the criteria in section 3.2.1, node A may signal to its child nodes and UEs that the corresponding link is unstable (e.g. A110 of FIG. 21). If node A determines that the link with the child node or the UE is unstable according to the criteria in Section 3.2.2, node A may provide link unstableness signaling to its parent node (e.g., B110 of FIG. 21).

Section 3.2.1. Unstableness Between Parent Node and Node A (e.g., A105 of FIG. 21)

The criteria for determining unstableness may be based on at least one of the following options.

Option 1: When BF(beam failure) instance occurs 1 to M times

M<N (N: number of instances of declaring BF)

The value M may be determined according to the specification or may be configured by RRC/higher layer signaling.

Option 1-1: When the case of Option 1 occurs within a certain due time

The due time here may be determined according to the standard specification or may be configured by RRC/higher layer signaling.

Option 2: In a case where SINR falls below a certain threshold

The threshold may be determined according to the specification or may be configured by RRC/higher layer signaling.

Option 2-1: When the case of Option 2 is maintained for a certain due time

The due time may be determined according to the specification or may be configured by RRC/higher layer signaling.

Option 3: In a case where RSRP falls below a certain threshold

RSRP for CSI-RS/SSB may be included. The threshold may be determined according to the specification or may be configured by RRC/higher layer signaling.

Option 3-1: When the case of Option 3 is maintained for a due time

The due time here may be determined according to the specification or may be configured by RRC/higher layer signaling.

Option 4: In a case where RSRQ falls below a certain threshold

RSRQ for CSI-RS/SSB may be included. The threshold may be determined according to the specification or may be configured by RRC/higher layer signaling.

Option 4-1: In a case where Option 4 is maintained for a due time

The due time here may be determined according to the specification or may be configured by RRC/higher layer signaling.

Option 5: In a case where CQI is below a certain index

A reference CQI index may be determined according to the specification or may be configured by RRC/higher layer signaling.

Option 5-1: In a case where Option 5 is maintained for a due time

The due time here may be determined according to the specification or may be configured by RRC/higher layer signaling.

Option 6: In a case where random access response (RAR) does not come properly

If there is no response to N RACHs, it may be determined as unstable. N may be determined according to the specification or may be configured by RRC/higher layer signaling.

Option 6-1: In a case where Option 6 occurs for a due time

The due time here may be determined according to the standard specification or may be configured by RRC/higher layer signaling.

Option 7: In a case where N "out-of-sync" indications occur

N may be determined according to the specification or may be configured by RRC/higher layer signaling. The "out of sync" indication may refer to an indication used when T310 is triggered.

When "out-of-sync" indications consecutive as much as N310 occur, T310 is triggered. Even if "out-of-sync" indications consecutive as much as N310 do not occur, the fact that N "out-of-sync" indications have occurred may indicate unstableness of the link.

The corresponding unstableness may be transmitted from node A to node A's child/UE.

Section 3.2.2. Unstableness Between Node a and Child Node/UE (e.g., B105 of FIG. 21)

The corresponding unstableness may be delivered to a parent of node A. The parent node of node A may send a command indicating that the child node/UE of node A should be transmitted to another location.

Criteria for determining unstableness may be as follows.

Option 1: When ACK/NACK is not received

Section 3.2.3. Unstableness Release Condition

When a link unstableness condition declared by the parent node is released, the parent node may need to notify its child node/UE again accordingly. Since the child node/UE is waiting for an indication on whether to change a link path after receiving a signal indicating link unstableness (hereinafter, link unstableness signal) from the parent node, if the unstableness release signal is not sent, the child node/UE is of uncertainty in operation. When a condition for releasing link unstableness is satisfied, a link restoration signal may be sent to the child node/UE. Alternatively, it may be defined such that the link restoration signal is sent to the child node/UE only when link unstableness is released within a link restoration timer.

The following options may be considered as conditions for releasing link unstableness.

Option 1: In a case where a beam failure instance does not occur for a due time (or when N or less beam failure instances occur for the due time)

The due time and N may be determined according to the specification or may be configured by RRC/higher layer signaling.

Option 2-1: In a case where instance at which SINR or RSRP or RSRQ exceeds a threshold occurs The threshold may be determined according to the specification or may be configured by RRC/higher layer signaling.

Option 2-2: In a case where SINR or RSRP or RSRQ exceeds the threshold for a due time The due time and threshold may be determined according to the specification or may be configured by RRC/higher layer signaling.

Option 3-1: In a case where an instance at which a CQI index is higher than a certain index occurs A reference CQI index may be determined according to the specification or may be configured by RRC/higher layer signaling.

Option 3-2: In a case where the CQI index is higher than the certain index for a due time The due time and the reference CQI index may be determined according to the specification or may be configured by RRC/higher layer signaling.

Option 4-1: In a case where RAR is properly received

Option 4-2: In a case where RAR is received normally for a due time or in a case where RAR is continuously received for N RAs The due time and N may be determined according to the specification or may be configured by RRC/higher layer signaling.

Option 5: In a case where unstable condition recovers before a link restoration timer expires The "due time" mentioned in each option may be replaced with a timer, and each timer corresponding to the event/reason may be used as it is or a timer for unstableness may be separately designated.

Section 3.3. Node A Behaviors for Child Node/UE

When node A transmits information indicating that the connection with its parent/donor node is lost or that the connection with the parent/donor node is unstable to the child node/UE, a rule in which node A operates may be defined as follows.

Section 3.3.1. To Child Node (e.g., A110 of FIG. 21)

Option 1: No information may be given to child node.

Option 2: Node A may immediately inform the child node that the connection with the parent node is lost.

Option 2-1: Node A may immediately notify the child node that the connection with the parent node is unstable.

Option 3: Node A may transmit a signal that triggers to find another parent node (a parent node detection trigger or an aperiodic discovery procedure trigger).

Option 3-1: After sending the parent node detection trigger signal, if the connection with the parent node is not restored within a due time for connection recovery, node A may send a handover trigger signal to another parent node. The due time may be determined according to the specification or may be configured by RRC/higher layer signaling.

Option 3-2: After sending the parent node detection trigger signal, if the unstableness with the parent node is not recovered within a due time for connection recovery, node A may transmit a handover trigger signal to another parent node. The due time may be determined according to the specification or may be configured by RRC/higher layer signaling.

Option 4: Node A may send a handover trigger signal to another parent node.

Option 5: If the connection to the parent node is not restored within the due time for connection recovery, node A may inform the child node that the connection is lost. The due time may be determined according to the specification or may be configured by RRC/higher layer signaling.

Option 5-1: If the link unstableness with the parent node is not recovered within a due time for connection recovery, node A may inform the child node about the link unstableness. The due time may be determined according to the specification or may be configured by RRC/higher layer signaling.

Option 6: If the connection is not restored within the due time for connection recovery, node A may send a signal that triggers to find another parent node to the child node. The due time may be determined according to the specification or may be configured by RRC/higher layer signaling.

Option 6-1: If the link unstableness is not recovered within the due time for connection recovery, node A may send a signal that triggers to find another parent node (parent node detection trigger) to the child node. The due time may be determined according to the specification or may be configured by RRC/higher layer signaling.

Option 7: If the connection is not recovered within the due time for connection recovery, node A may send a signal that triggers handover to another parent node to the child node. The due time may be determined according to the specification or may be configured by RRC/higher layer signaling.

Option 7-1: If the link unstableness is not recovered within the due time for connection recovery, node A may send a signal that triggers handover to another parent node to the child node. The due time may be determined according to the specification or may be configured by RRC/higher layer signaling.

Option 8: Only when connectivity is affected by an unstable link in a current IAB topology (e.g., the current node is activated and connected to two parent nodes and PDCP is duplicated and comes down from the two parent nodes, losing one path does not affect the overall connectivity), node A informs the child/UE about its unstableness. Or, if node A indicates the donor/core network that its link is unstable, the donor/core network may perform PDCP duplication or dual connectivity setup for the node/UE corresponding to the child node of the corresponding node or may activate a plurality of paths for the child node.

Alternatively, node A may notify a parent node of the parent thereof so that the grandparent node may activate a multi-path to a node where the corresponding event occurred. To this end, the node where the corresponding event occurred should report RRM results with neighboring IAB nodes that it may attach to. This is a way to localize an impact to itself if the link is broken. The methods described before this method may be said to be a distributed method that informs the child and allows them to solve it. Or, when an unstable event occurs, a connection for a multi-path may be triggered. A detailed operation will be described below. It may also be considered to proceed only if an event is not recovered within a due time.

Figure 22:
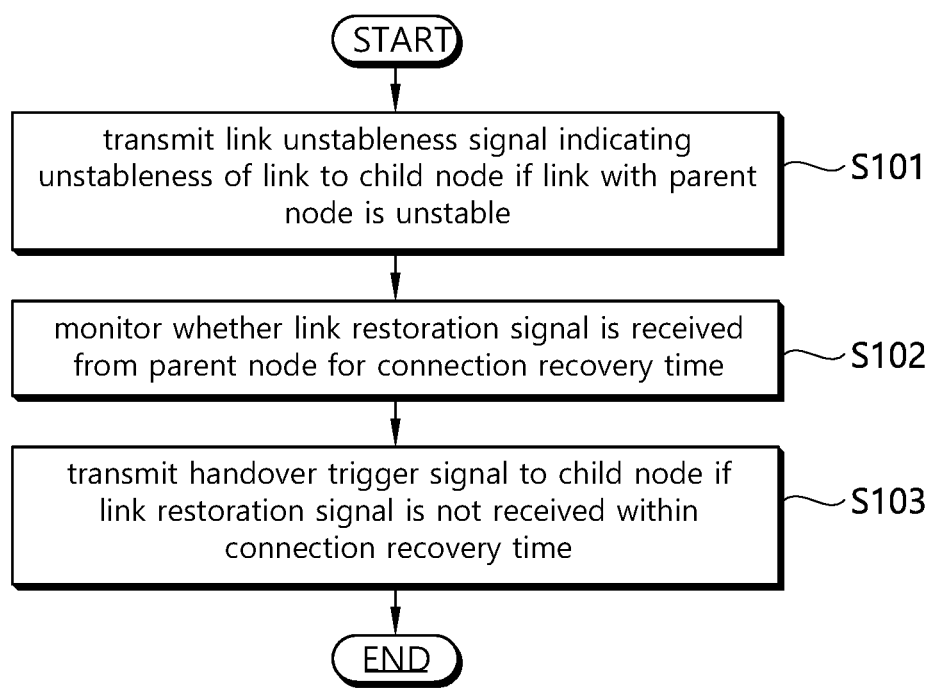
FIG. 22 shows an operation method of a node (IAB node) according to an embodiment of the present disclosure.

FIG. 22 shows an operation method of a node (IAB node) according to an embodiment of the present disclosure.

Referring to FIG. 22, when a link with a parent node is unstable, a node transmits a link unstableness signal indicating unstableness of the link to a child node (S101). That is, in the relationship with the parent node, the node monitors/detects whether the link status becomes unstable before the occurrence of radio link failure (RLF), and if it is determined that the link status becomes unstable, the node transmits a link unstableness signal to the child node before the RLF occurs. Through this, the child node may perform a necessary operation in preparation for link disconnection in advance.

As described in detail in Section 3.2.1, whether the link with the parent node is unstable may be based on at least one of various options. For example, when a beam failure occurs in the link one to M times (M is an integer of 2 or greater), the link may be determined to be unstable. Alternatively, when a reference signal received power (RSRP) or a reference signal received quality (RSRQ) measured in the link is less than or equal to a threshold, the link may be determined to be unstable. Alternatively, when out-of-sync occurs N times in the relationship with the parent node (N is an integer greater than or equal to 1), the link may be determined to be unstable. N may be previously determined or may be set by the parent node. The method of determining whether the link with the parent node is unstable is not limited to the above example and may be based on at least one of various options described in Section 3.2.1.

The node may transmit information indicating the reason why the link with the parent node is unstable together with the link unstableness signal. The information indicating the unstableness reason may indicate at least one of the number of beam failures, a low RSRP/RSRQ, a low channel quality indicator (CQI), and a low throughput. The child node may perform an appropriate operation according to the unstableness reason.

During a connection recovery time, the node monitors whether or not a link restoration signal is received from the parent node (S102). If the link restoration signal is not received within the connection recovery time, the node transmits a handover trigger signal to the child node (S103). The connection recovery time may be previously determined or may be set by the parent node. If the link restoration signal is received within the connection recovery time, the node may deliver the link restoration signal to the child node.

The node may further receive, from the parent node, a downlink signal including at least one of the lowest block error rate (BLER) in a higher path of the node, the number of hops of the higher path, the amount of data of the path including the parent node, the number of nodes supported by the parent node.

Figure 23:
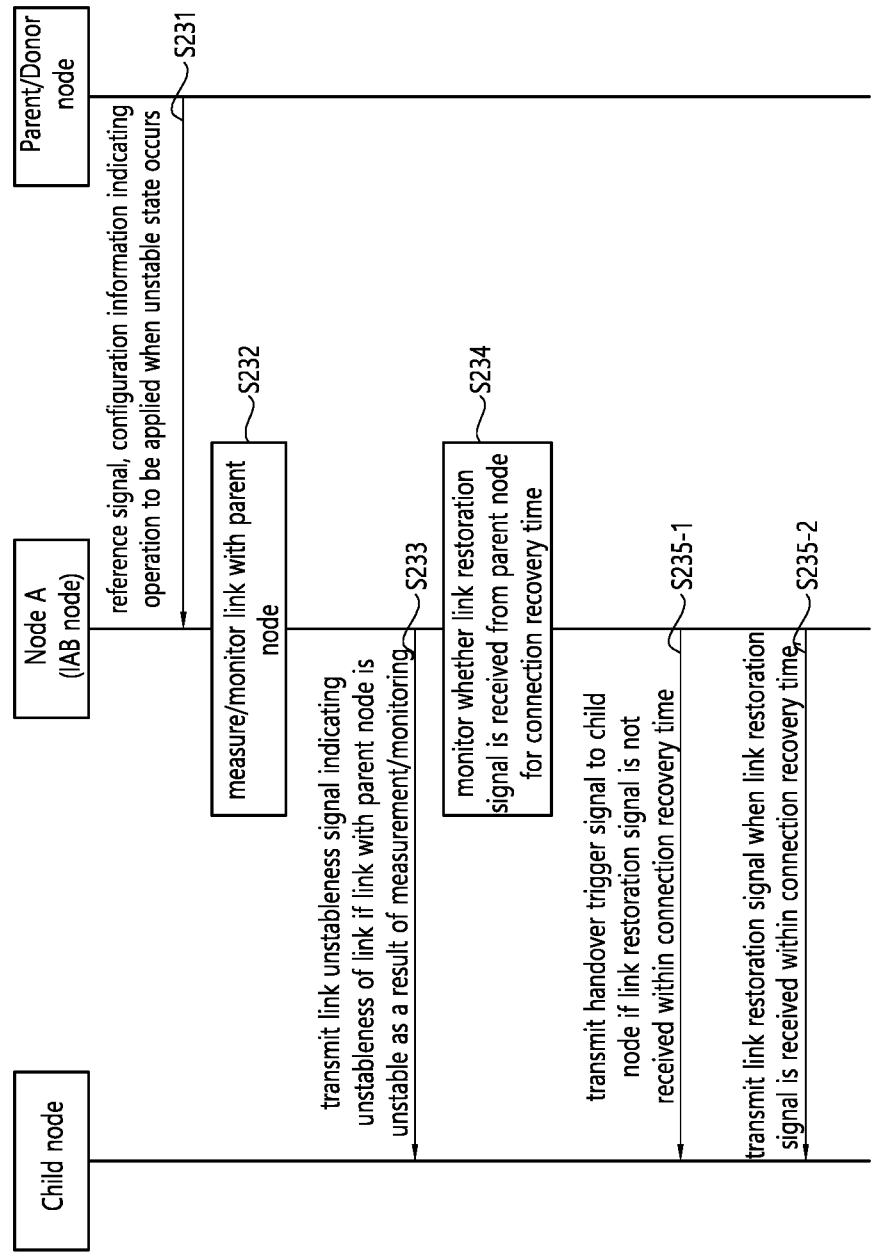
FIG. 23 shows a specific example of applying the method of FIG. 22 to a wireless communication system.

FIG. 23 shows a specific example of applying the method of FIG. 22 to a wireless communication system.

Referring to FIG. 23, node A (IAB node) may receive a reference signal, configuration information indicating an operation to be applied when an unstable state occurs, and the like from a parent (donor) node (S231). The configuration information may include information indicating an operation node A should perform when link unstableness occurs in a link between node A and the parent node. A reference signal (e.g., CSI-RS) may be used to measure a link status between node A and the parent node.

Node A measures/monitors the link with the parent node (S232). If the link with the parent node is unstable as a result of the measurement/monitoring, node A may transmit a link unstableness signal indicating unstableness of the link to the child node (S233).

During the connection recovery time, node A monitors whether or not a link restoration signal is received from the parent node (S234). If the link restoration signal is not received within the connection recovery time, node A transmits a handover trigger signal to the child node (S235-1). Meanwhile, if the link restoration signal is received within the connection recovery time, node A transfers a link restoration signal to the child node (S235-2). A specific operation of the child node is described in detail in Section 3.6 below.

Section 3.3.2. To UE Node (e.g., A110 of FIG. 21)

The operation and signaling of the child IAB node is equally applicable to the UE.

Section 3.3.3. Self-Operation (e.g., A120 of FIG. 21)

Apart from notifying the child IAB node of link unstableness with its parent node, node A may perform an operation to restore the link. Here, at least one of the following options may be performed.

Option 1: Node A may immediately attempt to find another parent node and establish a connection.

Option 2: Node A may wait to recover from unstableness for a certain due time, and then may attempt to find another node and establish a connection if unstableness is not recovered until the due time. It may also be considered that node A turns a connection change timer. The due time may be determined according to the specification or may be configured by RRC/higher layer signaling.

Option 3: Node A first looks for a node that may connect among other nodes and waits. Thereafter, node A may perform handover when handover from the current parent node to another parent node is signaled.

Option 3-1: Node A first looks for a node that may be connectable among other nodes and waits. If the unstableness does is not recovered until the due time, node A may perform handover to another node. It may also be considered that node A turns a connection change timer. The due time may be determined according to the specification or may be configured by RRC/higher layer signaling.

Section 3.4. Node A Behaviors for Parent Node (e.g., B110 of FIG. 21)

The operation and signaling of the child IAB node is also applicable to the parent node. It is necessary to inform the parent node or the donor node of information indicating that a connection of the node A with the lower child node or UE is lost or that the connection is unstable. Since node A's parent/donor node should perform scheduling for node A's lower child node/UE, if node A does not report that the connection with the lower child node or UE is lost or unstable, the parent/donor node performs scheduling on the child node/UE that does not exist.

When node A transmits connection status information with the parent/donor node to the child node/UE, a rule in which node A operates may be defined as at least one of the following options.

Option 1: Node A may not give any information to the parent node.

Option 2: Node A may immediately notify the parent/donor node that connection of node A with the child node/UE is lost or unstable.

Option 3: If connection/unstableness with the child node/UE is not recovered within a certain due time, node A may inform the parent node of the disconnection or unstableness. The due time may be determined according to the specification or may be configured by RRC/higher layer signaling.

Option 4: When RLF occurs from the child node/UE, node A may notify the parent node that the connection is lost or unstable.

Option 5: When a BFR is requested from the child node/UE, node A may notify the parent node that the connection is lost or unstable.

Option 6: When node A receives RLF between the child node and node A from another parent node or donor node of the child node, node A may notify the parent node that the connection is lost or unstable.

Option 7: When node A receives beam failure between the child node and node A from another parent node or donor node of the child node, node A may notify the parent node that the connection is lost or unstable.

Option 8: If a beam failure instance occurs even once and reported from the child node, node A may notify the parent node that the connection is lost or unstable.

Meanwhile, node A may notify its parent node that node A and the parent node are unstable. If the parent node is aware of this unstableness, the parent node may be able to perform a necessary operation to resolve the link unstableness.

Option 1: Node A may not give any information to the parent node.

Option 2: Node A may immediately notify the parent node that the connection between node A and the parent node is unstable.

Section 3.5. Parent Node Behaviors (e.g., B120 of FIG. 21)

A case where the parent node cannot receive a scheduling request and/or HARQ-ACK and/or uplink transmission/feedback for a lower child node or UE from node A may occur.

Option 1: If the parent node does not receive a scheduling request and/or HARQ-ACK transmission and/or UL transmission for the child node/UE of node A from node A within a certain due time, the parent node may understand that the connection between the corresponding child node/UE and node A is lost or unstable, and exclude the corresponding child node/UE from scheduling. Before this operation, a RACH may be triggered through a PDCCH command, and if the RACH operation is not successful, it may be assumed that the path is not alive. Alternatively, the child node may be switched to an RRC_Inactive (RRC_INACTIVE) or RRC_Idle (RRC_IDLE) state. In this operation, a timer starts after the parent node performs transmission on the corresponding IAB node/UE, and when UL transmission is received, the timer may be reset or halted. The due time may be previously determined according to the specification or may be configured by RRC/higher layer signaling.

Option 2: When the parent node receives, from node A, a signal indicating that the connection with the child node/UE of node A is lost or unstable, the parent node may deliver the corresponding fact to its higher node. The higher node may forward such information even to a doner along a path. The donor transmits this information to a core network as necessary to reset the path for the corresponding child node or UE as necessary or activates the child node or UE using paging or the like to reset the path. More characteristically, if there is no path currently available for the child node or the UE, a discovery procedure may be triggered so that the child node may discover the path.

Option 3: When the parent node receives, from node A, a signal indicating that the connection with the child node/UE of node A is lost or unstable, the parent node does not schedule the corresponding information although the parent node has control channel ad data channel information for the corresponding child node/UE. One or more of these options may be applied at the same time. Also, this operation may be performed by the parent node on the child/UE of node A.

The parent node may receive, from node A, a signal indicating that the link between the parent node itself and node A is unstable. In this case, the following may be considered as an operation of the parent node.

Option 1: The parent node may not perform any operation. Option 2: The parent node may give node A an instruction to perform handover to another node. Option 3: The parent node may transmit a link unstableness signal for donors to receive. Option 4: The parent node may transmit a signal to the donor so that multiple paths are allocated to node A.

Section 3.6. Child Node and UE Behaviors when the Connection with Node A is Lost or Unstable) (e.g., A120 of FIG. 21)

An operation of a child node or UE which receives corresponding signals when node A delivers a link loss signal or link unstableness signal to the child node or UE of node A needs to be defined according to the criteria defined in Section 3.1 and Section 3.2, and this will be described below. When the connection is lost, the child node may transmit a discovery signal until a new path is set up according to a preset discovery signal configuration or may start connection setup again based on a discovery/measurement signal of an access link.

Section 3.6.1. Behaviors for Option 1 of Section 3.3.1 and Section 3.3.2

Even if the child node or UE does not receive any information from node A, the child node or UE may not receive scheduling from node A.

Option 1: The child node or UE may attempt to fine another node to establish a connection if a scheduling signal is not received for a certain due time.

Option 2: The child node or UE may transmit a scheduling request (SR) if a scheduling signal is not received for a certain due time, and if there is no response to the SR, the child node or UE may attempt to find another node to establish a connection.

Option 3: If an RLM result assuming periodically configured RLM-RS transmission is not good, it may be determined that the connection with the parent is lost due to the RLF. A required procedure may be triggered to recover a path or fine another path immediately when "out-of-sync" occurs.

Section 3.6.2. Behaviors for Option 2 of Section 3.3.1 and Section 3.3.2

When a child node or UE receives, from node A, a signal indicating that the connection with the parent node is lost or unstable:

Option 1: The child node or UE may immediately attempt to find another node and establish a connection.

Option 2: The child node or UE may wait for node A to recover the connection/unstableness for a certain due time, and if the connection/unstableness of node A is not recovered up to the due time, the child node or UE may attempt to find another node and establish a connection. It may also be considered that the child node or UE turns a connection change timer. The due time may be determined according to the specification or may be configured by RRC/higher layer signaling.

Section 3.6.3. Behaviors for Options 3/6, 6-1 of Section 3.3.1 and Section 3.3.2

When a child node or UE receives, from node A, a signal that triggers to find another parent node:

Option 1: The child node or UE immediately finds a connectable node among other nodes and waits.

Option 2: The child node or UE immediately finds a connectable node among other nodes and establishes a connection to the corresponding node.

Section 3.6.4. Behaviors for Options 3-1 and 3-2 of Section 3.3.1 and Section 3.3.2

When the child node or UE receives from node A, a signal that triggers to find another parent node, the child node or UE may immediately find a connectable node among other nodes and waits. Thereafter, when a handover from node A to another parent node is signaled, handover may be performed.

Section 3.6.5. Behaviors for Options 4/7 and 7-1 of Section 3.3.1 and Section 3.3.2

Handover may be performed when the child node or UE is signaled to perform handover from node A to another parent node.

Section 3.6.6. Behaviors for Options 5 and 5-1 of Section 3.3.1 and Section 3.3.2

When the child node or UE receives, from node A, a signal indicating that the connection with the parent node is lost or unstable (Node A sends a signal after a due time to recover its own connection):

Option 1: The child node or UE may immediately attempt to find another node and establish a connection.

Option 2: The child node or UE may wait for node A to recover connection/unstableness for the due time, and if the connection of node A is not recovered up to the due time, the child node or UE may attempt to fine another node and establish a connection. It may also be considered that the child node or UE turns a connection change timer. The due time may be determined according to the specification or may be configured by RRC/higher layer signaling.

Section 3.7. Timers of the Child Node and UE (e.g., A120 of FIG. 21)

In Section 3.3, various options were proposed in which node A notifies the child node or UE that the connection with its parent node is lost or the link is unstable. Here, when the child node/UE receives such signaling from node A, it may operate a timer by itself and perform a separate operation after the timer.

When the child node or UE receives, from node A which is a parent node thereof, a signal indicating that the connection between node A and the parent node of node A is lost or the link is unstable, the connection recovery timer may be activated. After operating the timer, the child node or UE may perform the following operations.

When the timer is triggered, the child node/UE may start searching for another node that may be connected.

When a signal indicating that the connection between node A and the parent node of node A has been recovered, a signal indicating that unstableness has been recovered, or a signal such as scheduling DCI, RAR, or the like is received from node A before the corresponding timer expires, the connection with node A may be maintained.

When the timer expires, the child node/UE may perform handover to another connectable node that has been searched while the timer was running, or may continuously attempt to search if a new node is not searched during the timer. The timer may be determined according to the specification or may be configured by RRC/higher layer signaling.

An RRC parameter for the timer may be newly defined. The corresponding timer may be shared by the parent node and the child node/UE. When the timer starts, the corresponding IAB child node may perform different operations before and after the timer starts.

Some or all of the operations described below are applicable when the timer starts.

1) A measurement period may be applied differently. Since it is necessary to quickly find another node when the timer starts, the measurement period may be applied differently. This period may be set by the donor or parent node, or the child node may apply differently.

2) A discovery procedure may start (based on an access link signal or a discovery signal through a backhaul).

3) The event configuration of a RRM measurement report or a threshold of the event may be applied differently.

4) A beam recovery procedure or a beam management procedure may be performed differently. For example, beam management may be extended to perform beam management for multiple paths bound to RRC_inactive/idle with a serving cell when the timer starts. More characteristically, it is possible to fall back to SSB-based beam management.

Section 3.7.1. Timer Trigger

As a signal for triggering a timer, a SINR/RSRP/RSRQ value (numerical value) and a clear timer start indication may be assumed.

For example, the SINR/RSRP/RSRQ value may be a value which is greater than a minimum value for maintaining the connection but insufficient for stably maintaining the connection, and such a value may be defined as a signal for triggering the timer.

The SINR/RRSP/RSRQ value for triggering the timer may be determined according to the specification or may be configured by RRC/higher layer signaling. Alternatively, the child node/UE may trigger the timer when the SINR/RSRP/RSRQ value reaches the value defined according to the above rule N times within a due time. The due time and N may be determined according to the specification or may be configured by RRC/higher layer signaling.

Section 3.8. Node and UE Behaviors According to the Threshold

Apart from the connection failure and connection failure signaling, behaviors based on thresholds may be defined by setting the thresholds for each backhaul (BH) link and access (AC) link. The child node and UE may periodically/aperiodically monitor reception performance (e.g. RSRP, RSRQ, SINR, or BLER) for the parent node to which the connection may be established, and continuously determine whether or not the reception performance reaches a threshold.

The threshold may be determined according to the specification or may be configured by RRC/higher layer signaling. In addition, as for the threshold value, the BH link and the AC link may be defined identically or differently.

A node and UE may operate as follows using such reception performance and threshold values.

Option 1: The node and UE may establish connection only for a parent node that satisfies the threshold.

Option 2: The node and UE may have two thresholds (normal threshold and backup threshold) and may establish a connection if the backup threshold is satisfied even if the normal threshold is not satisfied.

The normal threshold and backup threshold may be determined according to the specification or may be configured by RRC/higher layer signaling. The normal threshold may be defined as a level at which normal communication is possible, and the backup threshold may be defined as a level at which only the presence of a child node or UE may be recognized and only basic RRC signaling or control channel signaling is possible.

Or, multiple threshold values and event setting/configuration/RRM configuration may be provided and it may be consider to apply different threshold values to a case where the timer operates, a case before the timer starts, and a case where the timer expires according to the occurrence of each event or when the event occurs. Typically, an SSB-based RRM may be triggered when the path to its parent is broken or unstable, and to this end, two configurations of CSI-RS-based RRM and SSB-based RRM are received and performed at different times. Also, in this case, criteria for determining the event of RRM reporting may be different. For example, when the path with the parent is stable, one event is usually followed, but when the path to its parent is unstable, an event may be triggered when a predetermined threshold is exceeded for all neighboring cells. Also, a triggering action of such an event may be different. For example, if the path is stable for a neighboring cell that shows better RSRP/RSRQ than a serving cell by a predetermined level, the RRM is reported, but if the path is unstable, the RRC connection procedure to an RRC_inactive state may be performed on the corresponding cell.

Section 3.9. Beam Separation for BH and AC Links

When a node having a child node and UE may be able to use multiple beams, a beam for the BH link and a beam for the AC link may be used separately. The parent node may provide QCL information for each beam to the child node and UE, and when each child node and UE recognizes the QCL information on the beam of a counterpart, the corresponding beam may not be received.

Section 3.10. Signaling Contents

Section 3.10.1. Basic Signaling Contents to Down (Contents Transmitted by Node that can be Parent Node)

For stability of the BH link, the parent node may periodically/aperiodically deliver necessary information to the lower child node. In this case, the necessary information may include at least one of the following contents.

1) The lowest BLER in a higher path may always be broadcast to the child. The BLER between the corresponding node and the child may be calculated by the child node.

2) Number of hops in the higher path

3) A data load of the path including itself or a remaining available data load of the path including itself 4) The number of IAB nodes and UEs supported by itself: The number of UEs may include UEs connected to its child node.

Section 3.10.2. Basic Signaling Contents to Up (Contents Transmitted by Child Node to Parent Node)

For the stability of the BH link, the child node may periodically/aperiodically deliver necessary information to the higher parent node. In this case, the necessary information may include at least one of the following contents.

1) A data load required for its child node and UE. This may help the donor/parent allocate resources smoothly. SR may replace this.

2) Transmission/reception performance with lower child node. It may be used to trigger a discovery signal.

Section 3.11. Information of Other Nodes Sharing

The parent node may periodically/aperiodically deliver information on parent node candidates that may be connected to the child node/UE to the child node/UE. Or, the information may be sent together when a link loss signal/link unstableness signal is sent. The transmitted information may be SSB information, TCI, CSI-RS information, or the like of the corresponding node.

The child node/UE may periodically/aperiodically deliver information on parent nodes and candidates that may be connected or are connected to the child node to the parent node.

Section 3.12. Node Behaviors in Multiple Paths

Assuming that node A may have two or more parent nodes, each parent may form one path, and thus, node A may be considered to have multiple paths. When the connection loss/connection unstableness signaling, etc. proposed in Section 3.1 to Section 3.11 above is transmitted to the parent or child node of node A, it is necessary to define the behavior of each parent and child node.

Section 3.12.1. Parent Node Behaviors

When node A has multiple paths, it may be assumed that there is parent B of a main path (first path) and parent C of a second path. Or, node A may have more paths, such as a third or fourth path.

Here, the RRC connected may be made only for the main path and the RRC_inactive may be made from the second path. Alternatively, an environment in which an RRC connected is made for the main path, an RRC inactive is made for the second path, and an RRC idle state is maintained for the third path and a subsequent path may be considered.

The order of the paths may be defined in consideration of the number of hops forming the path, a minimum RSRP/SINR/RSRQ of the entire path, a data rate of the path, and the amount of data of the path.

As such, having multiple paths and maintaining the connection through the main path, node A (hereinafter, simply abbreviated as A) may transmit connection loss/unstableness with the main path to other paths. When a second path parent node C (hereinafter, simply abbreviated as C) of node A receives this signal, C may perform the following operation.

Option 1-1: When a connection loss signal for parent B (hereinafter simply abbreviated as B) is received from node A, C is the main path and may establish an RRC connection. Here, A may pass to the main path C through the same operation as RRC reconfiguration. This path switching procedure may be triggered at C or may be at A.

Option 1-2: When receiving a connection loss signal for parent B from node A, C starts a timer on its own. If a signal indicating that the connection with B has been recovered is not received from A within the corresponding timer, C becomes the main path and may establish an RRC connection with A. Here, A may pass to the main path C through the same operation as RRC reconfiguration. This path switching procedure may be triggered at C or may be at A.

Option 2-1: When receiving a connection unstableness signal for parent B is received from node A, C starts a timer on its own, and if there is no signal indicating that connection with B is smooth from A, C becomes the main path and RRC connection with A may be established. Here, A may pass to the main path C through the same operation as RRC reconfiguration. This path switching procedure may be triggered at C or may be at A.

The timer operated by C may be determined according to the specification or may be configured by RRC/higher layer signaling.

As criteria and options that may be considered when node A provides a signal about connection loss/unstableness with parent node B, the criteria and options proposed in Section 3.1 to Section 3.11 may be considered.

This major path change may be triggered from node B.

Based on the criteria for determining connection loss/unstableness with the child node from the perspective of the parent node proposed in Section 3.1 to Section 3.11, node B may declare connection loss/unstableness with node A and report this to a higher path so that the donor who received this may instruct the node C to directly change the path.

Section 3.12.2. Node Behaviors

When an unstableness event is triggered in a specific IAB node, i.e., 1) when link unstableness occurs between the node itself and its parent node or 2) link unstableness between its parent node and grandparent node occurs, the node may maintain a single or multiple paths from the node itself to the doner. When maintaining multiple paths, RRC_connected (RRC_CONNECTED), inactive, and idle states may be used (described in Section 3.12.1), but an "RRC_Semi-CONNECTED" state may be newly introduced in another way. When configured, the RRC_semi-CONNECTED state may refer to a temporary RRC_connected state which is automatically changed to RRC_connected (or RRC_inactive) state when a certain timer expires.

For example, when the IAB node that detects unstableness requests RRC_Semi-CONNECTED and a timer value when requesting a connection to establish multi-connection to another parent, the corresponding parent node transmits data actively to the corresponding IAB node during a timer, and if there is no request for switching to an RRC connection mode until the timer expires, the corresponding parent node may deactivate the corresponding IAB node or switch the IAB node to an idle state. A timer value of the corresponding RRC_Semi-CONNECTED may be determined by the IAB node in consideration of a UE and an IAB node connected to the IAB node itself or may be determined according to mobility thereof. A metric/threshold for determining unstableness may be determined in consideration of its own mobility or related IAB node. When a connection request is received due to such a request to RRC_semi-CONNECTED or unstableness, the corresponding parent node may operate on the assumption that data is transmitted to the child node through to a primary path and a path to which it belongs through PDCP duplication. That is, it may be assumed that a PDCP duplication trigger is performed or that PDCP duplication is automatically "enabled". This assumes that the primary path of the IAB node disappears (and thus its own path becomes primary) or becomes "disable" when it is changed to inactive.

Section 3.13. Link Management Procedure

In this section, a link management procedure is described based on the node behaviors proposed in Section 3.1 to Section 3.12. The operations described below are possible when the parent node gives a signal about link unstableness to a certain child node as a link between the parent node of the child node and the grandparent node are unstable based on the child node.

Section 3.13.1. Single Path to Single Path (when an IAB Topology Allows Only One Path Per IAB Node)

In a state where the child node/UE is connected to a single path,

Step 1-1: A link unstableness signal with the grandparent node may be received from the parent node.

Step 1-2: The child node/UE may detect a need to search for a new node whether there is a node superior to the current parent node, or may receive a new node discovery search signaling from the parent node.

Step 2-1 (from all steps 1): A discovery operation may be performed on other neighboring parent node candidates.

Step 2-2 (from step 1-1): The parent node and the child node/UE, or the child node/UE switch a link restoration timer to activation and perform a discovery operation for other neighboring parent node candidates.

Step 3-1 (from all steps 2): After performing the discovery operation, the child node/UE may store connectable parent node candidate information.

Step 3-2 (from all steps 2): After performing the discovery operation, the child node/UE may store the connectable parent node candidate information and report whether there are parent node candidates connectable to the current parent node or the number of connectable candidate node candidates. A criterion for selecting a connectable parent node candidate may follow the criterion defined in step 4-1.

Step 3-3 (from all steps 2): The child node/UE may report cell power, reception performance (RSRP, RSRQ, SINR), CSI, etc. for new nodes discovered during the discovery operation to the parent node.

Step 3-4 (from all steps 2): When another parent node is found, an RRC connection may be established and an RRC inactive state may be entered. Here, criteria for selecting a node for establishing the RRC connection may follow the criteria defined in step 4-1. Trigger to enter an RRC inactive mode may be that 1) an existing parent node may perform signaling to the corresponding nodes to switch to an RRC inactive state through a donor, 2) the child node/UE may perform signaling to the corresponding nodes to switch to The RRC inactive state, and 3) the child node/UE may inform the nodes that need to maintain the RRC inactive state that there is another node in the RRC activated state so that the corresponding nodes may consider a method to enter the RRC inactive state by themselves. The child node/UE may inform the current parent node that the child node/UE is connected to another node and is in the RRC inactive state. At the same time, the child node/UE may also inform about to which it is connected.

Step 4-1 (from steps 3-1, 2, and 3): When the child node/UE receives a signal indicating that the child node/UE should perform handover to another node from the existing parent node, the child node/UE performs handover to the instructed node. Here, the criteria for determining a target node are:

Option 1: A node with the best values of cell power, reception performance (RSRP, RSRQ, SINR), CSI, etc.

Option 2: A node with the shortest number of hops among nodes whose values of cell power, reception performance (RSRP, RSRQ, SINR), CSI, etc. are equal to or greater than a certain threshold. The threshold may be determined according to the specification or may be configured by RRC/higher layer signaling.

Option 3: A node with the shortest number of hops among nodes whose values of cell power, reception performance (RSRP, RSRQ, SINR), CSI, etc. are equal to or greater than the current parent node.

Option 4: A node having cell power, reception performance (RSRP, RSRQ, SINR), and CSI value exceeding a certain threshold and having the highest efficiency when the cell power, reception performance (RSRP, RSRQ, SINR), the CSI value and the number of path hops are combined. As for good efficiency, although the cell power, reception performance (RSRP, RSRQ, SINR), and CSI performance are not the best, if delay is short due to the short number of hops, there is a corresponding gain, and thus, the efficiency of the corresponding node is considered to be good.

Option 5: Or, priority may be determined by combining the information from options 1 to 4.

Measurement values of the cell power, reception performance (RSRP, RSRQ, SINR), and CSI, may be based on an instance or a value measured for a due time may be used as a reference. In this case, the due time may be determined according to the specification or may be configured by RRC/higher layer signaling.

Step 4-2 (from steps 2-2 and 3-1, 2, and 3): If a link is not restored within a link restoration timer, the parent node may give a signal to the child node/UE to perform handover to another node, and the child node/UE may perform handover to the instructed node. Here, criteria for determining a target node is the same as the criteria in step 4-1.

Step 4-3 (from steps 2-2 and 3-1, 2, and 3): If the link is not restored within the link restoration timer, the child node/UE may arbitrarily perform handover to a node selected according to the criteria for determining a target node in step 4-1. Here, the child node/UE may transmit the fact that handover is performed to another node to the existing parent node.

Step 4-4 (from all steps 3): The parent node may succeed in link restoration again and transmit a link restoration signal to the child node/UE to maintain the connection with itself.

Step 4-5 (from step 3-4): When the parent node receives a signal from the child node/UE that the child node/UE is in an RRC inactive state with another node, the parent node may instruct the child node/UE to switch to an RRC activation mode with the node in the currently RRC inactive state.

Step 4-6 (from step 2-2 and step 3-4): If the link is not restored within the link restoration timer, the child node/UE may send a trigger signal to a new node so that the node in the currently RRC inactive state is switched to the RRC activation mode.

Step 4-7 (from step 2-2 and step 3-4): If the link is not restored within the link restoration timer, the existing parent node may instruct the child node/UE to switch to the RRC activation mode with the node currently in the RRC inactive state.

Section 3.13.2. Single Path to Single Active Path and Multiple Inactive Paths

In a state where the child node/UE is connected to a single path,

Step 1-1: A link unstableness signal with the grandparent node may be received from the parent node. Step 1-2: From the perspective of the child node/UE, a new node or a backup node may be required to ensure a smooth service and performance in addition to the current parent node.

Step 2-1 (from all steps 1): A discovery operation may be performed on other neighboring parent node candidates.

Step 2-2 (from Step 1-1): The parent node and the child node/UE, or the child node/UE switch the link restoration timer to activation and perform a discovery operation for other neighboring parent node candidates.

Step 3-1 (from all steps 2): After performing the discovery operation, the child node/UE may store connectable parent node candidate information.

Step 3-2 (from all steps 2): After performing the discovery operation, the child node/UE may store the connectable parent node candidate information and report the existence or number of parent node candidates that may be connected to the current parent node. Here, criteria for determining the connectable parent node candidate may be 1) Option 1: A node with the best values of cell power, reception performance (RSRP, RSRQ, SINR), CSI, etc., 2) Option 2: A node with the shortest number of hops among nodes whose values of cell power, reception performance (RSRP, RSRQ, SINR), CSI, etc. are equal to or greater than a certain threshold. The threshold may be determined according to the specification or may be configured by RRC/higher layer signaling. 3) Option 3: A node with the shortest number of hops among nodes whose values of cell power, reception performance (RSRP, RSRQ, SINR), CSI, etc. are equal to or greater than the current parent node, and 4) Option 4: A node having cell power, reception performance (RSRP, RSRQ, SINR), and CSI value exceeding a certain threshold and having the highest efficiency when the cell power, reception performance (RSRP, RSRQ, SINR), the CSI value and the number of path hops are combined. Here, as for good efficiency, although the cell power, reception performance (RSRP, RSRQ, SINR), and CSI performance are not the best, if delay is short due to the short number of hops, there is a corresponding gain, and thus, the efficiency of the corresponding node is considered to be good. 5) Option 5: Or, priority may be determined by combining the information from options 1 to 4. Measurement values of the cell power, reception performance (RSRP, RSRQ, SINR), and CSI may be based on an instance or a value measured for a due time may be used as a reference. In this case, the due time may be determined according to the specification or RRC/higher layer signaling.

Step 3-3 (from all steps 2): The child node/UE may report cell power, reception performance (RSRP, RSRQ, SINR), CSI, etc. for new nodes discovered during the discovery operation to the parent node.

Step 3-4 (from all step 2) Step 3-4: When another parent node is found, an RRC connection may be established and The RRC inactive state may be entered. All connectable nodes may be connected and enter the RRC inactive state, or the RRC inactive state may be maintained for only K nodes.

K may be determined according to the specification and may be determined by RRC/higher layer signaling. Here, criteria for selecting a node for establishing an RRC connection may follow the criteria defined in step 3-2.

Trigger to enter The RRC inactive state mode may be that 1) an existing parent node may perform signaling to the corresponding nodes to switch to an RRC inactive state through a donor, 2) the child node/UE may perform signaling to the corresponding nodes to switch to The RRC inactive state, and 3) the child node/UE may inform the nodes that need to maintain the RRC inactive state that there is another node in the RRC activated state so that the corresponding nodes may consider a method to enter the RRC inactive state by themselves.

Step 3-5 (from all steps 2): An RRC connection may be made to the best target node and enter the RRC active state according to the criteria defined in Step 3-2. By notifying the existing parent node of this fact, the existing parent node may switch to the RRC inactive state. All other connectable nodes may be connected and enter the RRC inactive state, or the RRC inactive state may be maintained for only K nodes.

K may be determined according to the specification and may be determined by RRC/higher layer signaling. As K, the top K of parent node candidates may be selected.

The child node/UE may inform the current parent node that the child node/UE is connected to another node and is in the RRC inactive state. At the same time, the child node/UE may also inform about to which it is connected.

As a method for the child node/UE to enter the RRC inactive state with the nodes which should maintain the RRC inactive state, the following method may be considered: 1) the existing parent node may signal to the corresponding nodes through a donor to switch to the RRC inactive state, 2) the child node/UE may signal to the corresponding nodes to switch to The RRC inactive state, and 3) the child node/UE may inform the nodes which need to maintain the RRC inactive state that there is another node in the RRC active state, so that the corresponding nodes themselves become RRC inactive.

Step 4-1 (from steps 3-1, 2, 3): When the child node/UE receives a signal to perform handover from the existing parent node to another node, the child node/UE may perform handover to the instructed node and may switch to RRC activation with the corresponding node and the existing parent node may switch to The RRC inactive state. In addition, the parent node may instruct the child node/UE to establish a connection to all or some K of the remaining connectable nodes and to enter the RRC inactive state.

K may be determined according to the specification and may be determined by RRC/higher layer signaling. As K, the top K of parent node candidates may be selected.

As a method for the child node/UE to enter the RRC inactive state with the nodes which should maintain the RRC inactive state, the following method may be considered: 1) the existing parent node may signal to the corresponding nodes through a donor to switch to the RRC inactive state, 2) the child node/UE may inform the nodes which need to maintain the RRC inactive state that there is another node in the RRC active state, so that the corresponding nodes themselves become RRC inactive.

Step 4-2 (from steps 2-2 and 3-1, 2, and 3): If the link is not restored within the link restoration timer, the parent node may give a signal to the child node/UE to perform handover to another node. The child node/UE may perform handover to the instructed node and switch to RRC activation with the corresponding node, and the existing parent node may switch to The RRC inactive state. In addition, the parent node may instruct the child node/UE to establish a connection to all or some K of the remaining connectable nodes and to enter RRC inactive state.

K may be determined according to the specification and may be determined by RRC/higher layer signaling. As K, the top K of parent node candidates may be selected.

As a method for the child node/UE to enter the RRC inactive state with the nodes which should maintain the RRC inactive state, the following method may be considered: 1) the existing parent node may signal to the corresponding nodes through a donor to switch to the RRC inactive state, 2) the child node/UE may inform the nodes which need to maintain the RRC inactive state that there is another node in the RRC active state, so that the corresponding nodes themselves become RRC inactive.

Step 4-3 (from steps 2-2 and 3-1, 2, and 3): If the link is not restored within the link restoration timer, the child node/UE may arbitrarily perform handover to a node selected according to the criteria for determining a target node in step 3-2. The child node/UE may switch to RRC activation with the corresponding node and the existing parent node may switch to The RRC inactive state. In addition, the child node/UE may operate to establish connection with all or some K of the remaining connectable nodes and enter RRC inactive state.

K may be determined according to the specification and may be determined by RRC/higher layer signaling. As K, the top K of parent node candidates may be selected.

As a method for the child node/UE to enter the RRC inactive state with the nodes which should maintain the RRC inactive state, the following method may be considered: 1) the existing parent node may signal to the corresponding nodes through a donor to switch to the RRC inactive state, 2) the child node/UE may inform the nodes which need to maintain the RRC inactive state that there is another node in the RRC active state, so that the corresponding nodes themselves become RRC inactive.

Step 4-4 (from all steps 3): The parent node may succeed in link restoration again and transmit a link restoration signal to the child node/UE to maintain the connection with itself. Here, the parent node may instruct the child node/UE to establish a connection for all or some K of other nodes which were found and enter an RRC inactive state. K may be determined according to the specification and may be determined by RRC/higher layer signaling. As K, the top K of parent node candidates may be selected.

Step 4-5 (from all steps 3): Even if the parent node succeeds in link restoration again in Step 4-4, if the condition suggested in Step 3-2 is insufficient compared to other discovered nodes, the node switches to The RRC inactive state with the existing parent, establishes a connection with the node with the best conditions, and enters an RRC active state. At this time, the parent node may instruct the child node/UE to establish a connection with all or part of K with other nodes that it discovered and to enter an RRC inactive state. K may be determined according to the specification and may be determined by RRC/higher layer signaling. As K, the top K of parent node candidates may be selected.

Step 4-6 (from step 3-4): When the parent node receives a signal from the child node/UE that the child node/UE is in an RRC inactive state with another node, the parent node may instruct the child node/UE to switch to an RRC activation mode in a node with the best environment by comparing the node(s) in the currently RRC inactive state with the parent node itself. When another node is activated, the parent node switches to The RRC inactive state.

Step 4-7 (from step 2-2 and step 3-4): If the link is not restored within the link restoration timer, the child node/UE may send a trigger signal to a new node to switch to the RRC activation mode in the node with the best environment among the nodes in the currently RRC inactive state.

Step 4-8 (from step 2-2 and step 3-4): If the link is not restored within the link restoration timer, the existing parent node may instruct the child node/UE to switch to the RRC activation mode with the node with the best environment among the nodes in the currently RRC inactive state. Thereafter, the parent node itself may switch to The RRC inactive state.

Section 3.13.3. Single Active Path and Multiple Inactive Paths to Multiple Active Paths and Multiple Inactive Paths In a state where the child node/UE is in an RRC active state with a single parent node and in an RRC inactive state with one or more nodes, Step 1-1: A link unstableness signal with the grandparent node may be received from the active parent node.

Step 1-2: From the perspective of the child node/UE, multiple active parent nodes may be required to ensure a smooth service and performance in addition to the current parent node. This may fall to a case where an increase in the amount of required data or improvement of reception performance.

Step 2-1 (from all steps 1): When n additional active nodes are needed, top n nodes with good environment, among parent nodes in an RRC inactive state may be requested for RRC activation based on the criteria for comparing the environments of the nodes. N may be defined from the currently active parent and may be determined and defined by the child node/UE.

The following options may be considered as criteria for determining the environment of a node.

1) option 1: A node with the best values of cell power, reception performance (RSRP, RSRQ, SINR), CSI, etc., and 2) option 2: A node with the shortest number of hops among nodes whose values of cell power, reception performance (RSRP, RSRQ, SINR), CSI, etc. are equal to or greater than a certain threshold. The threshold may be determined according to the specification or may be configured by RRC/higher layer signaling.

3) option 3: A node with the shortest number of hops among nodes whose values of cell power, reception performance (RSRP, RSRQ, SINR), CSI, etc. are equal to or greater than the current parent node, and 4) option 4: A node having cell power, reception performance (RSRP, RSRQ, SINR), and CSI value exceeding a certain threshold and having the highest efficiency when the cell power, reception performance (RSRP, RSRQ, SINR), the CSI value and the number of path hops are combined. As for good efficiency, although the cell power, reception performance (RSRP, RSRQ, SINR), and CSI performance are not the best, if delay is short due to the short number of hops, there is a corresponding gain, and thus, the efficiency of the corresponding node is considered to be good. 5) option 5: Or, priority may be determined by combining the information from options 1 to 4. Measurement values of the cell power, reception performance (RSRP, RSRQ, SINR), and CSI, may be based on an instance or a value measured for a due time may be used as a reference. In this case, the due time may be determined according to the specification or may be configured by RRC/higher layer signaling.

Step 2-2 (from all steps 1): The process of step 2-1 is the same, but when comparing the environments of the nodes, the environment of the current parent node may be added and operated as a comparison target.

Step 2-3 (from step 1-1): The currently active parent node and child node/UE, or the child node/UE may switch the link restoration timer to activation and the child node/UE may calculate with which nodes RRC activation is performed.

In step 2, a discovery operation is performed on another new parent node candidate may be performed, and a determination as an RRC connection or an RRC inactive node may also be performed.

Step 3-1 (from step 2-3): If the link is not restored within the link restoration timer, the child node/terminal performs step 2-1 or step 2-2.

Step 3-2 (from step 2-3): If the link is not restored within the link restoration timer, the parent node may give a trigger signal to cause the child node/UE to perform step 2-1 or step 2-2.

The above operation may be similarly applied using RRC_semi-connected.

Section 3.14. Link Management Procedure of Parent Node in Link Loss

In this section, a link management procedure is described based on the node behaviors proposed in Section 3.1 to Section 3.12. Operations described below may be operations that are possibly performed when a link between a parent node of a child node and a grandparent node of the child node is lost based on the child node and the parent node gives a signal for the loss of the link to the child node.

When the parent node sends a signal indicating that the connection with the grandparent node is lost to the child node/UE, the child node/UE may perform a cell reselection operation on nodes other than the corresponding parent node.

The above contents may be summarized as follows.

(1) Definition of unstableness: In addition to the existing RLF, beam failure, and RRM events, an event indicating a poor status by measuring quality of a link with a parent (let's call it an unstableness event) is newly proposed. Such an unstableness event may be determined by applying a different threshold using an existing measurement (e.g., unstableness event is triggered when the beam failure instance occurs M times), or create a new event (e.g., when a CQI falls below a certain level), or may consider a new measurement and event (e.g., based on RS-SINR based on TRS).

(2) When the unstableness occurs, the operation of the IAB node may consider the followings:

A. Passive recovery: When the corresponding event occurs, the IAB node forwards to its parent(s) and/or grandparent(s) and/or donor node that unstableness has occurred and waits for a recovery procedure. This refers to waiting for a handover command, etc. Here, RRM results may be reported together for a potential path.

B. Active recovery: When the corresponding event occurs, the IAB node may be a subject of recovery by establishing a connection from a single path to multiple paths as described above, requesting to change an RRC state connected to another path, moving a connection by finding a new path, and the like.

C. When the corresponding event occurs, the corresponding information may be transmitted to the child node(s)/UE. This method may be used simultaneously with A or B.

(3) When the corresponding event occurs, each IAB node may perform the following operation differently to perform measurement, etc.

A. One or more measurement objects may be set or configured for the IAB node, and application of different measurements may be considered before/after occurrence of an event. For example, SSB-based and CSI-RS-based RRM measurements may be used after or before the occurrence of an event.

B. Measurement threshold, event threshold, measurement period, etc. may be set differently for each node and applied differently.

C. Difference in number of connections/paths: It is possible to have a different number of connections or paths before and after the occurrence of an event.

Section 3.15. Report on Link Quality with Child Node

Node A may transmit an indication that a link between itself and the parent node P is unstable or a metric (e.g., the value of each option in Section 3.2.1) which is the basis for determining the unstableness to the parent node P. Basically, node A may report the link measurement result to its parent node P through a resource indicated by the parent node P. However, when node A determines that the link quality falls below a certain threshold, it promptly reports it to the parent node P to serve to trigger the parent node P (or higher parent node or a donor node, if P reports it to the higher node) to perform link management for node A.

In order for node A to transmit the indication to the parent node P that the P-A link is unstable or the metric which is the basis for determining the unstableness, the following methods may be considered as the transmission method. Here, the metric to be transmitted may be considered as an option itself to determine unstableness in Section 3.2.1.

Option 1-1: A scheduling request (SR) may be sent. An uplink resource for link unstableness indication or metric transmission is required, and since node A cannot freely determine a resource for this, an SR for the required resource may be sent to the parent node P. When an uplink grant for transmission of corresponding information is received, the link unstableness indication or the metric may be transmitted in the granted resource in the form of a PUCCH/PUSCH.

Option 1-2: When transmitting the SR, a link unstableness bit (1 when the link is unstable and 0 when the link is not unstable) may be included and transmitted therein. The number of transmission bits used for the SR may be increased, or one bit used for the SR may be used as it is.

Option 1-3: When transmitting the SR, the SR may be transmitted using a sequence for indicating link unstableness (or a separate RNTI). The sequence for the use of link unstableness may be defined according to a standard specification or may be configured by RRC/higher layer signaling. The reason why the link unstableness is sent using the SR itself is because it is possible to quickly notify the parent node about link unstableness without exchanging additional information.

Option 2-1: One of preambles that may be used for PRACH purposes may be defined as a link unstableness indication purpose, and node A may transmit the preamble to node P. In this case, the preamble for the purpose of indicating link unstableness may be defined according to the standard specification or may be configured by RRC/higher layer signaling.

Option 2-2: A general RACH may be transmitted, and here, a specific sequence (or a separate RNTI) for indicating link unstableness may be applied to a preamble and transmitted. In this case, the specific sequence for the purpose of indicating link unstableness may be defined according to the standard specification or may be configured by RRC/higher layer signaling. The reason for sending link unstableness using the RACH itself is because it is possible to quickly notify the parent node about link unstableness without exchanging additional information.

Option 3: The link unstableness indication or the metric may be transmitted in a grant-free (configured grant) uplink resource. A grant-free resource is a resource that may be used without a separate grant of a parent node, and thus the link unstableness indication or the metric may be transmitted in the corresponding resource. It may be transmitted in the corresponding resource in the form of a PUSCH.

Option 4: When a resource for transmitting the link unstableness indication or metric exists and node A needs to transmit such information, a corresponding resource is used for transmission. Resources for such information transmission may be predefined according to the standard specification or may be set by a parent node/donor node higher than the node P/P.

Using the information transmitted from node A to node P by the method proposed above, node P may trigger a process to recover the link.

Section 3.16. Parent Node Behavior Using Reported Link Quality

As proposed in Section 3.15, when node A transmits the link unstableness for the P-A link or link quality related metric to the parent node P, node P may perform an operation to improve link quality of node A using the corresponding information.

Option 1: Node P may trigger a handover procedure for Node A to another node. In this case, the handover procedure may follow the handover procedure defined in the standard specification.

Option 2: Node P may trigger a multiple routing procedure for node A to have multiple paths. In this case, the multi-routing procedure may follow the multi-routing procedure defined in the standard specification.

Option 3: Node P may perform RRC reconfiguration to improve link quality with node A. Here, the RRC reconfiguration may follow the RRC reconfiguration procedure defined in the standard specification.

Option 4: Node P may trigger a beam recovery procedure of node A or perform it by itself. Here, the beam recovery procedure may follow the beam recovery procedure defined in the standard specification.

Figure 24:
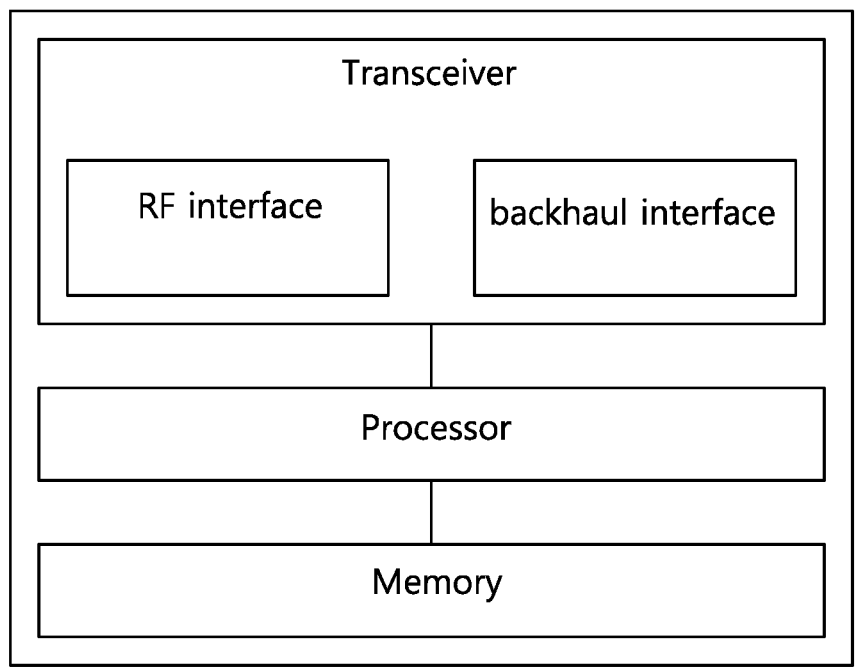
FIG. 24 illustrates a node device.

FIG. 24 illustrates a node device.

Referring to FIG. 24, the node device may be a child node, a node A, a parent node, or a donor node, but is not limited thereto.

The node device may include at least one of a transceiver, a processor, and a memory. The transceiver may include a radio frequency (RF) interface for wireless communication, and the processor may control/use the RF interface for communication with a UE. The transceiver may include a (wired/wireless) backhaul interface, and the processor may control/use the backhaul interface for communication with other nodes.

Figure 25:
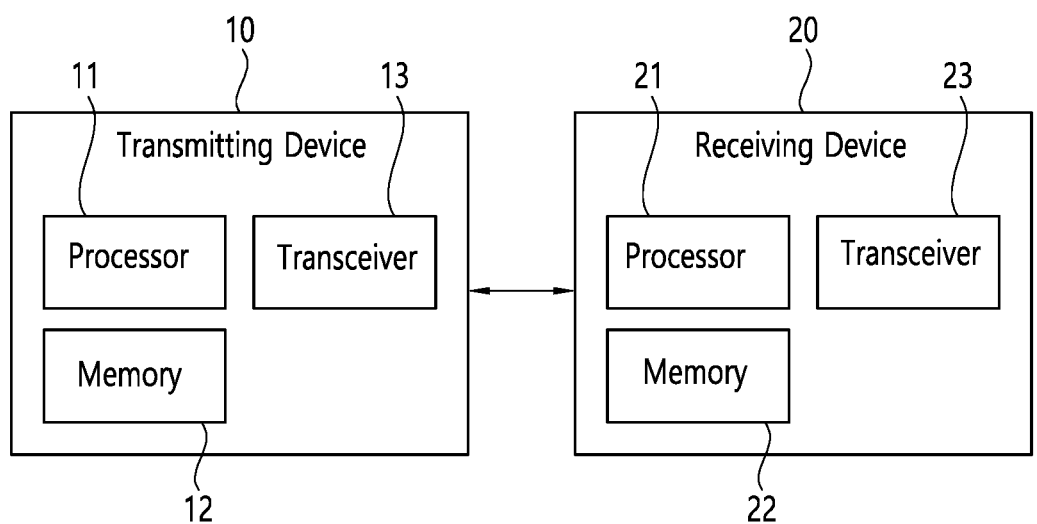
FIG. 25 is a block diagram showing components of a transmitting device 10 and a receiving device 20 for implementing the present disclosure.

FIG. 25 is a block diagram showing components of a transmitting device 10 and a receiving device 20 for implementing the present disclosure. Here, the transmitting device and the receiving device may be a base station and a terminal.

The transmitting device 10 and the receiving device 20 may respectively include transceivers 13 and 23 capable of transmitting or receiving radio frequency (RF) signals carrying information, data, signals and messages, memories 12 and 22 for storing various types of information regarding communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of embodiments of the present disclosure.

The memories 12 and 22 can store programs for processing and control of the processors 11 and 21 and temporarily store input/output information. The memories 12 and 22 may be used as buffers.

The processors 11 and 21 generally control overall operations of various modules in the transmitting device and the receiving device. Particularly, the processors 11 and 21 can execute various control functions for implementing the present disclosure. The processors 11 and 21 may be referred to as controllers, microcontrollers, microprocessors, microcomputers, etc. The processors 11 and 21 can be realized by hardware, firmware, software or a combination thereof. When the present disclosure is realized using hardware, the processors 11 and 21 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 11 and 21 or stored in the memories 12 and 22 and executed by the processors 11 and 21.

The processor 11 of the transmitting device 10 can perform predetermined coding and modulation on a signal and/or data to be transmitted to the outside and then transmit the signal and/or data to the transceiver 13. For example, the processor 11 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 13 may include an oscillator for frequency up-conversion. The transceiver 13 may include one or multiple transmission antennas.

The signal processing procedure of the receiving device 20 may be reverse to the signal processing procedure of the transmitting device 10. The transceiver 23 of the receiving device 20 can receive RF signals transmitted from the transmitting device 10 under the control of the processor 21.

The transceiver 23 may include one or multiple reception antennas. The transceiver 23 can frequency-down-convert signals received through the reception antennas to restore baseband signals. The transceiver 23 may include an oscillator for frequency down conversion. The processor 21 can perform decoding and demodulation on RF signals received through the reception antennas to restore data that is intended to be transmitted by the transmitting device 10.

The transceivers 13 and 23 may include one or multiple antennas. The antennas can transmit signals processed by the transceivers 13 and 23 to the outside or receive RF signals from the outside and deliver the RF signal to the transceivers 13 and 23 under the control of the processors 11 and 21 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 20. A reference signal (RS) transmitted corresponding to an antenna defines an antenna from the viewpoint of the receiving device 20 and can allow the receiving device 20 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 26:
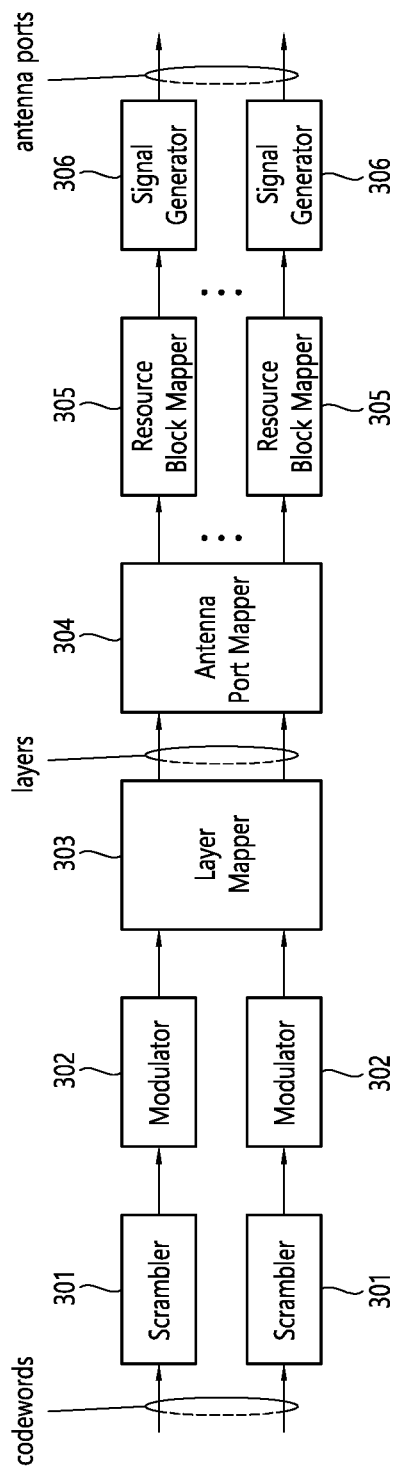
FIG. 26 illustrates an example of a signal processing module structure in the transmitting device 10.

FIG. 26 illustrates an example of a signal processing module structure in the transmitting device 10. Here, signal processing can be performed by a processor of a base station/terminal, such as the processor 11 of FIG. 25.

Referring to FIG. 26, the transmitting device 10 included in a terminal or a base station may include scramblers 301, modulators 302, a layer mapper 303, an antenna port mapper 304, resource block mappers 305 and signal generators 306.

The transmitting device 10 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 27:
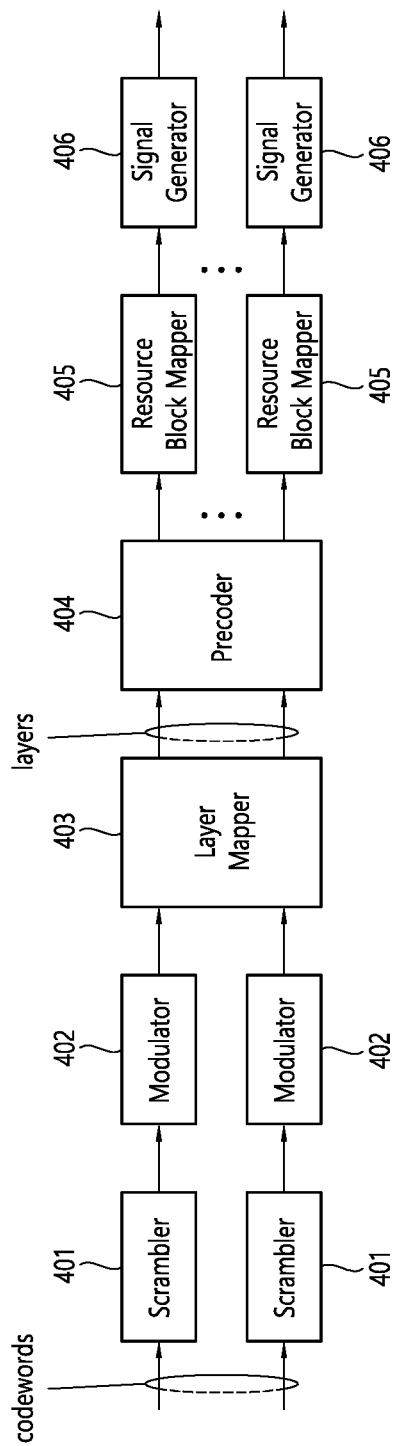
FIG. 27 illustrates another example of the signal processing module structure in the transmitting device 10.

FIG. 27 illustrates another example of the signal processing module structure in the transmitting device 10. Here, signal processing can be performed by a processor of a terminal/base station, such as the processor 11 of FIG. 25.

Referring to FIG. 27, the transmitting device 10 included in a terminal or a base station may include scramblers 401, modulators 402, a layer mapper 403, a precoder 404, resource block mappers 405 and signal generators 406.

The transmitting device 10 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter. The signal processing procedure of the receiving device 20 may be reverse to the signal processing procedure of the transmitting device. Specifically, the processor 21 of the transmitting device 10 decodes and demodulates RF signals received through antenna ports of the transceiver 23. The receiving device 20 may include a plurality of reception antennas, and signals received through the reception antennas are restored to baseband signals, and then multiplexed and demodulated according to MIMO to be restored to a data string intended to be transmitted by the transmitting device 10.

The receiving device 20 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 28:
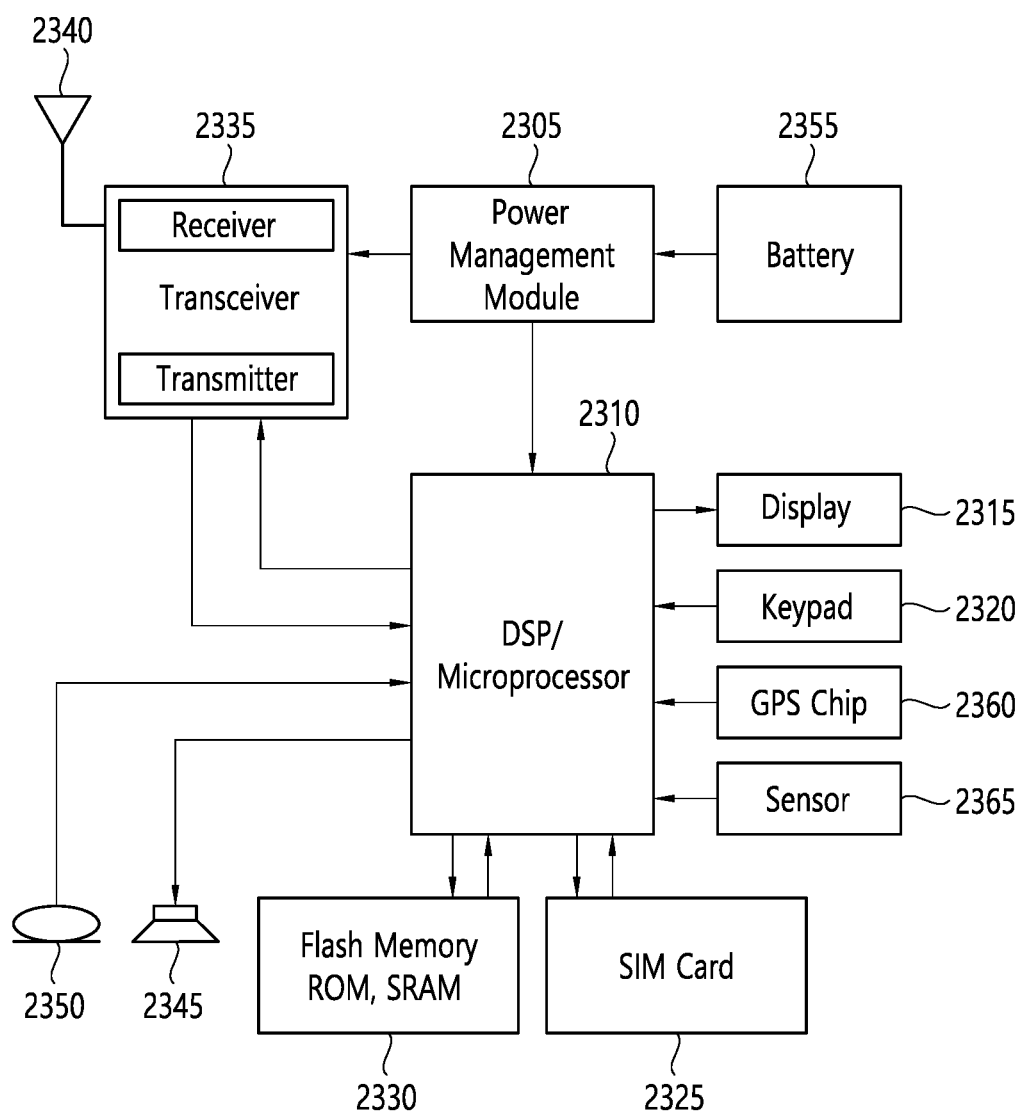
FIG. 28 illustrates an example of a wireless communication device according to an implementation example of the present disclosure.

FIG. 28 illustrates an example of a wireless communication device according to an implementation example of the present disclosure.

Referring to FIG. 28, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 28 may be the processors 11 and 21 in FIG. 25.

The memory 2330 is connected to the processor 231 and stores information related to operations of the processor. The memory may be located inside or outside the processor and connected to the processor through various techniques such as wired connection and wireless connection. The memory 2330 in FIG. 28 may be the memories 12 and 22 in FIG. 25.

A user can input various types of information such as telephone numbers using various techniques such as pressing buttons of the keypad 2320 or activating sound using the microphone 250. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 28 may be the transceivers 13 and 23 in FIG. 25.

Although not shown n FIG. 28, various components such as a camera and a universal serial bus (USB) port may be additionally included in the terminal. For example, the camera may be connected to the processor 2310.

FIG. 28 is an example of implementation with respect to the terminal and implementation examples of the present disclosure are not limited thereto. The terminal need not essentially include all the components shown in FIG. 28. That is, some of the components, for example, the keypad 2320, the GPS chip 2360, the sensor 2365 and the SIM card 2325 may not be essential components. In this case, they may not be included in the terminal.

Figure 29:
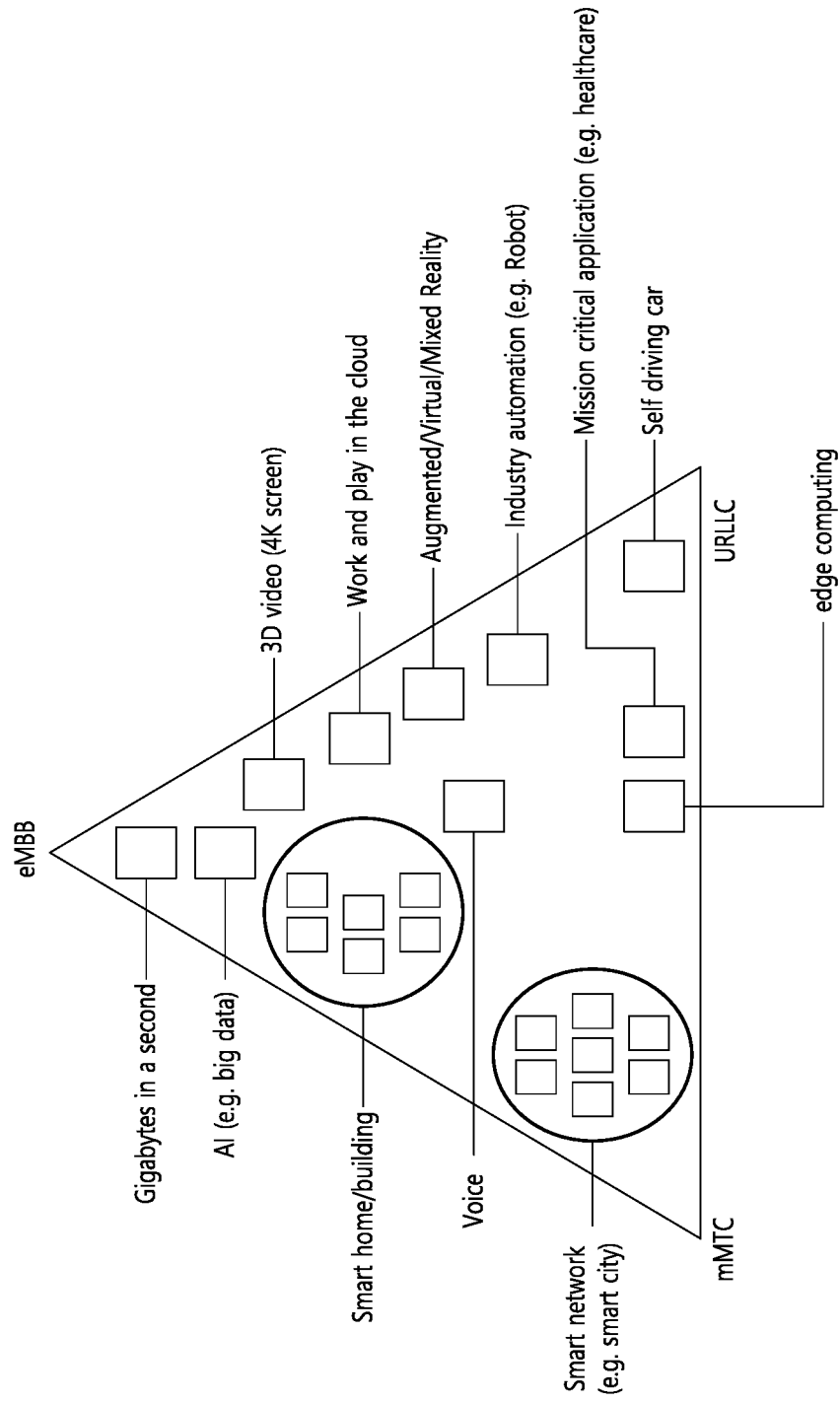
FIG. 29 shows examples of 5G usage scenarios to which the technical features of the present disclosure can be applied.

FIG. 29 shows examples of 5G usage scenarios to which the technical features of the present disclosure can be applied.

The 5G usage scenarios shown in FIG. 29 are only exemplary, and the technical features of the present disclosure can be applied to other 5G usage scenarios which are not shown in FIG. 29.

Referring to FIG. 29, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used.

In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 29 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 30:
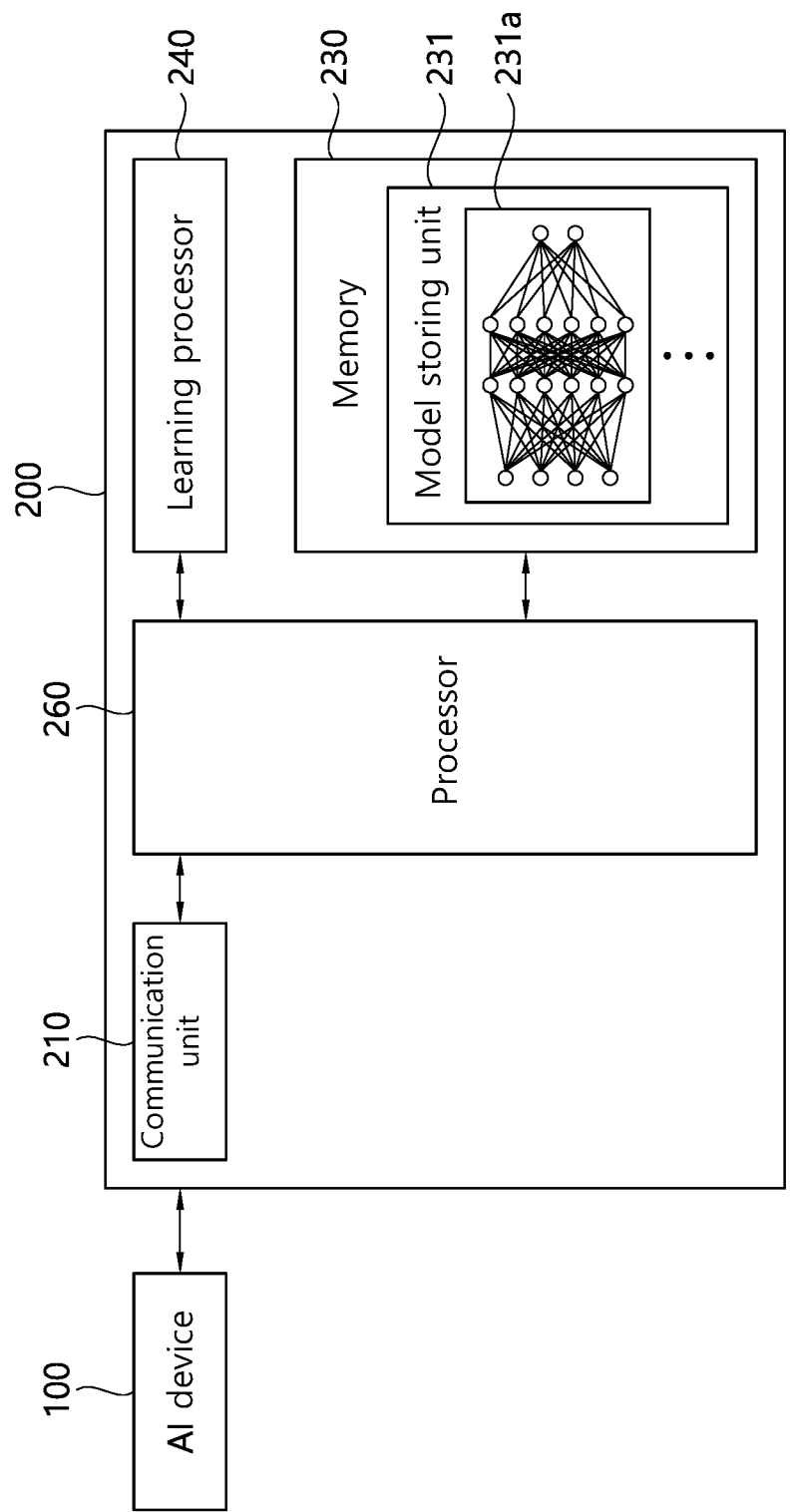
FIG. 30 illustrates an AI server 200 according to one embodiment of the present disclosure.

FIG. 30 illustrates an AI server 200 according to one embodiment of the present disclosure.

Referring to FIG. 30, the AI server 200 may refer to a device that trains an artificial neural network using a machine learning algorithm or using the trained artificial neural network. Here, the AI server 200 may be composed of a plurality of servers to perform distributed processing and defined as a 5G network. At this time, the AI server 200, being included as part of the AI device 100, may perform at least part of AI processing together.

The AI server 200 may include a communication unit 210, a memory 230, a learning processor 240, and a processor 260.

The communication unit 210 may transmit and receive data to and from an external device such as the AI device 100.

The memory 230 may include a model storing unit 231. The model storing unit 231 may store a model being trained through the learning processor 240 or a trained model (or an artificial neural network 231*a*).

The learning processor 240 may train the artificial neural network 231*a* using training data. A learning model may be used while being mounted on the AI server 200 of an artificial neural network or may be used by being mounted on an external device such as the AI device 100.

The learning model may be implemented by hardware, software or a combination of hardware and software. When the whole or part of the learning model is implemented by software, one or more instructions constituting the learning model may be stored in the memory 230.

The processor 260 may infer a resultant value with respect to new input data by using the learning model and generate a response or a control instruction based on the inferred resultant value.

Figure 31:
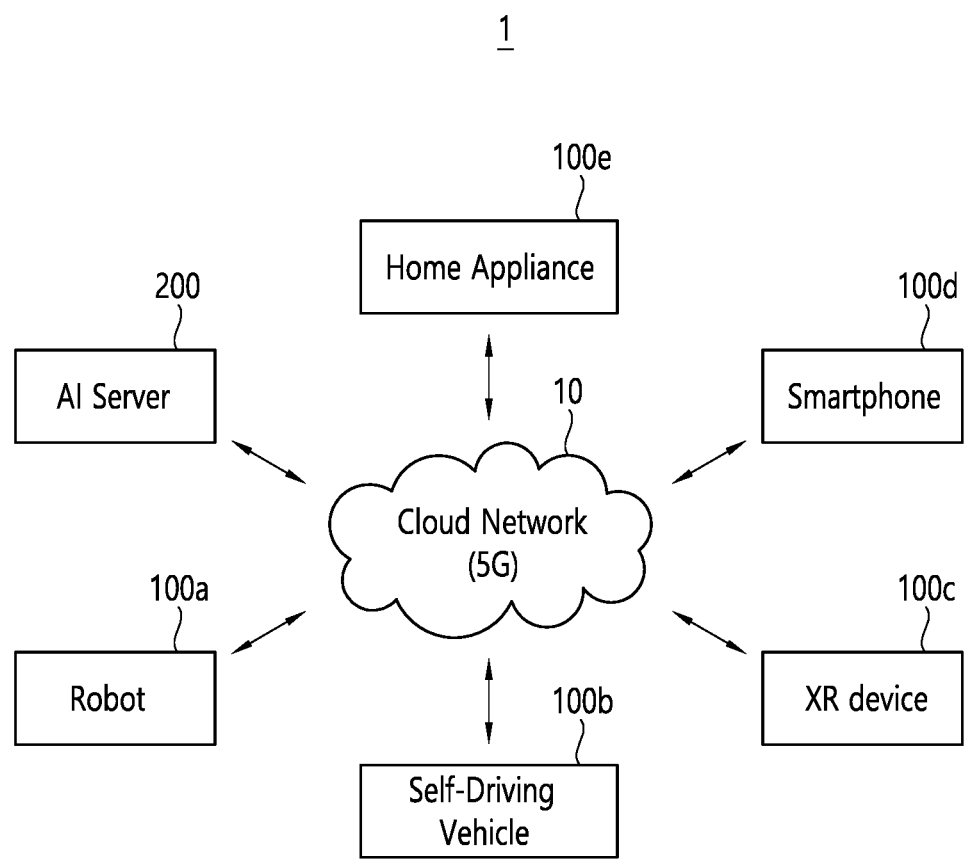
FIG. 31 shows an example of an AI system 1 to which the technical features of the present disclosure can be applied.

FIG. 31 shows an example of an AI system 1 to which the technical features of the present disclosure can be applied.

Referring to FIG. 31, in the AI system 1, at least one of an AI server 200, a robot 100*a*, an autonomous vehicle 100*b*, an XR device 100*c*, a smartphone 100*d* and/or a home appliance 100*e* is connected to a cloud network 10. The robot 100*a*, the autonomous vehicle 100*b*, the XR device 100*c*, the smartphone 100*d*, and/or the home appliance 100*e* to which the AI technology is applied may be referred to as AI devices 100*a* to 100*e*.

The cloud network 10 may refer to a network that forms part of a cloud computing infrastructure and/or resides in a cloud computing infrastructure. The cloud network 10 may be configured using a 3G network, a 4G or LTE network, and/or a 5G network.

That is, each of the devices 100*a* to 100*e* and 200 consisting the AI system 1 may be connected to each other through the cloud network 10. In particular, each of the devices 100*a* to 100*e* and 200 may communicate with each other through a base station, but may directly communicate with each other without using a base station.

The AI server 200 may include a server for performing AI processing and a server for performing operations on big data.

The AI server 200 is connected to at least one or more of AI devices constituting the AI system 1, i.e. the robot 100*a*, the autonomous vehicle 100*b*, the XR device 100*c*, the smartphone 100*d* and/or the home appliance 100*e* through the cloud network 10, and may assist at least some AI processing of the connected AI devices 100*a* to 100*e*.

The AI server 200 can learn the ANN according to the machine learning algorithm on behalf of the AI devices 100*a* to 100*e*, and can directly store the learning models and/or transmit them to the AI devices 100*a* to 100*e*.

The AI server 200 may receive the input data from the AI devices 100*a* to 100*e*, infer the result value with respect to the received input data using the learning model, generate a response and/or a control command based on the inferred result value, and transmit the generated data to the AI devices 100*a* to 100*e*.

Alternatively, the AI devices 100*a* to 100*e* may directly infer a result value for the input data using a learning model, and generate a response and/or a control command based on the inferred result value.

Various embodiments of the AI devices 100*a* to 100*e* to which the technical features of the present disclosure can be applied will be described. The AI devices 100*a* to 100*e* shown in FIG. 27 can be seen as specific embodiments of the AI device 100 shown in FIG. 25.

<AI+Robot>

The robot 100*a* may be implemented as a guide robot, a carrying robot, a cleaning robot, a wearable robot, an entertainment robot, a pet robot, an unmanned flying robot, etc., to which AI technology is applied.

The robot 100*a* may include a robot control module for controlling the operation, and the robot control module may refer to a software module and/or a chip implementing the software module.

The robot 100*a* may acquire the state information of the robot 100*a* using the sensor information acquired from various kinds of sensors and/or detect (recognize) the surrounding environment and/or the object, and/or generate map data, and/or determine a travel route and/or a travel plan, and/or determine a response to user interaction, and/or determine an operation.

The robot 100*a* can use the sensor information acquired from at least one sensor among the LIDAR, the radar, and/or the camera to determine the travel route and/or the travel plan.

The robot 100*a* can perform the above-described operations using a learning model composed of at least one ANN. For example, the robot 100*a* can recognize the surrounding environment and/or the object using the learning model, and can determine the operation using the recognized surrounding information and/or the object information. The learning model may be learned directly from the robot 100*a* and/or learned from an external device such as the AI server 200.

The robot 100*a* can directly generate a result using the learning model and perform an operation. The robot 100*a* may transmit sensor information to an external device such as the AI server 200 and may receive the generated result and perform an operation.

The robot 100*a* may determine the travel route and/or the travel plan using at least one of the map data, the object information detected from the sensor information and/or the object information acquired from the external device, and drive the robot 100*a* according to the determined travel route and/or travel plan by controlling the driving unit.

The map data may include object identification information on various objects arranged in a space in which the robot 100*a* moves. For example, the map data may include object identification information on fixed objects such as walls and doors, and/or on movable objects such as pots and desks. The object identification information may include a name, a type, a distance, and/or a position, etc.

The robot 100*a* can perform the operation and/or run by controlling the driving unit based on the control/interaction of the user. The robot 100*a* may acquire the intention information of the interaction due to the user's operation and/or voice utterance, determine the response based on the acquired intention information, and perform the operation.

<AI+Autonomous-Driving/Self-Driving>

The autonomous vehicle 100*b* may be implemented as a mobile robot, a vehicle, an unmanned aerial vehicle, etc., to which AI technology is applied.

The autonomous vehicle 100*b* may include an autonomous driving control module for controlling the autonomous driving function, and the autonomous driving control module may refer to a software module and/or a chip implementing the software module. The autonomous driving control module may be included in the autonomous vehicle 100*b* as a component of the autonomous vehicle 100*b*, but may be connected to the outside of the autonomous vehicle 100*b* with separate hardware.

The autonomous vehicle 100*b* may acquire the state information of the autonomous vehicle 100*b* using the sensor information acquired from various kinds of sensors and/or detect (recognize) the surrounding environment and/or the object, and/or generate map data, and/or determine a travel route and/or a travel plan, and/or determine an operation.

Like the robot 100*a*, the autonomous vehicle 100*b* can use the sensor information acquired from at least one sensor among the LIDAR, the radar, and/or the camera to determine the travel route and/or the travel plan.

In particular, the autonomous vehicle 100*b* can recognize an environment and/or an object for an area in which the field of view is obscured and/or over a certain distance by receiving sensor information from external devices, and/or receive the recognized information directly from external devices.

The autonomous vehicle 100*b* can perform the above-described operations using a learning model composed of at least one ANN. For example, the autonomous vehicle 100*b* can recognize the surrounding environment and/or the object using the learning model, and can determine the travel route using the recognized surrounding information and/or the object information. The learning model may be learned directly from the autonomous vehicle 100*b* and/or learned from an external device such as the AI server 200.

The autonomous vehicle 100*b* can directly generate a result using the learning model and perform an operation. The autonomous vehicle 100*b* may transmit sensor information to an external device such as the AI server 200 and may receive the generated result and perform an operation.

The autonomous vehicle 100*b* may determine the travel route and/or the travel plan using at least one of the map data, the object information detected from the sensor information and/or the object information acquired from the external device, and drive the autonomous vehicle 100*b* according to the determined travel route and/or travel plan by controlling the driving unit.

The map data may include object identification information on various objects arranged in a space (e.g. road) in which the autonomous vehicle 100*b* moves. For example, the map data may include object identification information on fixed objects such as street lamps, rocks, and buildings, and/or on movable objects such as vehicles and pedestrians. The object identification information may include a name, a type, a distance, and/or a position, etc.

The autonomous vehicle 100*b* can perform the operation and/or run by controlling the driving unit based on the control/interaction of the user. The autonomous vehicle 100*b* may acquire the intention information of the interaction due to the user's operation and/or voice utterance, determine the response based on the acquired intention information, and perform the operation.

<AI+XR>

The XR device 100*c* may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100*c* analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100*c* may output an XR object, which includes the additional information about the recognized object, by corresponding to the recognized object.

The XR device 100*c* can perform the above-described operations using a learning model composed of at least one ANN. For example, the XR device 100*c* can recognize a real object from three-dimensional point cloud data and/or image data using the learning model, and can provide information corresponding to the recognized real object. The learning model may be learned directly from the XR device 100*c* and/or learned from an external device such as the AI server 200.

The XR device 100*c* can directly generate a result using the learning model and perform an operation. The XR device 100*c* may transmit sensor information to an external device such as the AI server 200 and may receive the generated result and perform an operation.

<AI+Robot+Autonomous-Driving/Self-Driving>

The robot 100*a* may be implemented as a guide robot, a carrying robot, a cleaning robot, a wearable robot, an entertainment robot, a pet robot, an unmanned flying robot, etc., to which AI technology and autonomous-driving technology are applied.

The robot 100*a* to which the AI technology and the autonomous-driving technology are applied may mean the robot 100*a* having the autonomous-driving function itself and/or the robot 100*a* interacting with the autonomous vehicle 100*b*.

The robot 100*a* having an autonomous-driving function can collectively refer to devices that move by themselves in accordance with a given travel route and/or move by determining the traveling route by themselves without user's control.

The robot 100*a* having the autonomous-driving function and the autonomous vehicle 100*b* can use a common sensing method to determine at least one of the travel route and/or the travel plan. For example, the robot 100*a* having the autonomous-driving function and the autonomous vehicle 100*b* can determine at least one of the travel route and/or the travel plan using the information sensed through the LIDAR, the radar, and/or the camera.

The robot 100*a* interacting with the autonomous vehicle 100*b* may exist separately from the autonomous vehicle 100*b*. The robot 100*a* interacting with the autonomous vehicle 100*b* may be associated with the autonomous-driving function inside and/or outside the autonomous vehicle 100*b*, and/or may perform an operation associated with the user aboard the autonomous vehicle 100*b*.

The robot 100*a* interacting with the autonomous vehicle 100*b* may acquire the sensor information on behalf of the autonomous vehicle 100*b* and provide it to the autonomous vehicle 100*b*. The robot 100*a* interacting with the autonomous vehicle 100*b* may obtain the sensor information and generate the environment information and/or the object information to provide the autonomous vehicle 100*b*, thereby controlling and/or assisting the autonomous-driving function of the autonomous vehicle 100*b*.

The robot 100*a* interacting with the autonomous vehicle 100*b* may monitor the user boarding the autonomous vehicle 100*b* and/or may control the functions of the autonomous vehicle 100b through interaction with the user. For example, when it is determined that the driver is in a drowsy state, the robot 100a may activate the autonomous-driving function of the autonomous vehicle 100b and/or assist the control of the driving unit of the autonomous vehicle 100b. The function of the autonomous vehicle 100b controlled by the robot 100a may include not only an autonomous-driving function but also a function provided by a navigation system and/or an audio system provided in the autonomous vehicle 100b.

The robot 100a interacting with the autonomous vehicle 100b may provide information and/or assist the function to the autonomous vehicle 100b outside the autonomous vehicle 100b. For example, the robot 100a, such as a smart traffic light, may provide traffic information including signal information, etc., to the autonomous vehicle 100b. The robot 100a, such as an automatic electric charger of an electric vehicle, may interact with the autonomous vehicle 100b to connect the electric charger to the charging hole automatically.

<AI+Robot+XR>

The robot 100a may be implemented as a guide robot, a carrying robot, a cleaning robot, a wearable robot, an entertainment robot, a pet robot, an unmanned flying robot, a drone, etc., to which AI technology and XR technology are applied.

The robot 100a to which the XR technology is applied may refer to a robot that is subject to control/interaction in the XR image. In this case, the robot 100a may be separated from the XR device 100c and can be associated with each other.

When the robot 100a that is the subject to control/interaction in the XR image acquires the sensor information from the sensors including the camera, the robot 100a and/or the XR device 100c may generate an XR image based on the sensor information and the XR device 100c can output the generated XR image. The robot 100a can operate based on a control signal and/or a user's interaction input through the XR device 100c.

For example, the user can acknowledge the XR image corresponding to the viewpoint of the robot 100a remotely linked through the external device such as the XR device 100c, and can adjust the autonomous travel path of the robot 100a, control operation and/or driving, or check the information of neighboring objects, through interaction.

<AI+Autonomous-Driving/Self-Driving+XR>

The autonomous vehicle 100b may be implemented as a mobile robot, a vehicle, an unmanned aerial vehicle, etc., to which AI technology and XR technology are applied.

The autonomous driving vehicle 100b to which the XR technology is applied may mean an autonomous vehicle having means for providing an XR image and/or an autonomous vehicle that is subject to control/interaction in the XR image. Particularly, the autonomous vehicle 100b that is subject to control/interaction in the XR image may be separated from the XR device 100c and can be associated with each other.

The autonomous vehicle 100b having the means for providing the XR image can acquire the sensor information from the sensors including the camera and output the generated XR image based on the acquired sensor information. For example, the autonomous vehicle 100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to.

On the other hand, when the XR object is output to the display provided in the autonomous vehicle 100b, at least a part of the XR object may be output so as to overlap with the object in the screen. For example, the autonomous vehicle 100b can output XR objects corresponding to objects such as a lane, another vehicle, a traffic light, a traffic sign, a two-wheeled vehicle, a pedestrian, a building, etc.

When the autonomous vehicle 100b that is the subject to control/interaction in the XR image acquires the sensor information from the sensors including the camera, the autonomous vehicle 100b and/or the XR device 100c may generate an XR image based on the sensor information and the XR device 100c can output the generated XR image. The autonomous vehicle 100b can operate based on a control signal and/or a user's interaction input through the XR device 100c.

What is claimed is:

1. An operation method of a node in a wireless communication system, the operation method comprising:
   allocating resources to a child node using one of a plurality of resource allocation types; wherein the plurality of resource allocation types comprise i) a first resource allocation type and ii) a second resource allocation type,
   wherein, in the first resource allocation type, a bitmap indicates Resource Block Groups (RBGs) that are allocated to the child node,
   wherein, in the second resource allocation type, a resource allocation field informs of a starting resource block and a length in terms of contiguously allocated resource blocks that are allocated to the child node;
   receiving a radio resource control (RRC) signal configuring a due time;
   transmitting, to the child node, a link unstableness signal informing unstableness of a link, based on the link with a parent node being unstable;
   monitoring whether a link restoration signal is received from the parent node within a connection recovery time; and
   transmitting a handover trigger signal to the child node based on the link restoration signal being not received within the connection recovery time,
   wherein the link is determined to be unstable based on a situation, in which reference signal received power (RSRP) or reference signal received quality (RSRQ) measured in the link is equal to or smaller than a threshold, being maintained for the due time, and
   wherein information for a reason with a cause value to support the child node in taking subsequent actions is transmitted together with the link unstableness signal.

2. The operation method of claim 1, wherein the reason represents at least one of the number of beam failures, a low RSRP/RSRQ, a low channel quality indicator (CQI), and low throughput.

3. The operation method of claim 1, wherein the connection recovery time is previously determined or is set by the parent node.

4. The operation method of claim 1, wherein the link restoration signal is transmitted to the child node based on the link restoration signal being received within the connection recovery time.

5. The operation method of claim 1, wherein a downlink signal including at least one of a lowest block error rate (BLER) in a higher path of the node, the number of hops of the higher path, a data load of a path including the parent node, and the number of nodes supported by the parent node is further received from the parent node.

6. A node comprising:
a transceiver configured to transmit or receive a wireless signal; and
a processor operatively coupled with the transceiver,
wherein the processor is configured to:
allocate resources to a child node using one of a plurality of resource allocation types; wherein the plurality of resource allocation types comprise i) a first resource allocation type and ii) a second resource allocation type,
wherein, in the first resource allocation type, a bitmap indicates Resource Block Groups (RBGs) that are allocated to the child node,
wherein, in the second resource allocation type, a resource allocation field informs of a starting resource block and a length in terms of contiguously allocated resource blocks that are allocated to the child node,
receive a radio resource control (RRC) signal configuring a due time,
transmit, to the child node, a link unstableness signal informing unstableness of a link based on the link with a parent node being unstable,
monitor whether a link restoration signal is received from the parent node within a connection recovery time, and
transmit a handover trigger signal to the child node based on the link restoration signal being not received within the connection recovery time,
wherein the link is determined to be unstable based on a situation, in which reference signal received power (RSRP) or reference signal received quality (RSRQ) measured in the link is equal to or smaller than a threshold, being maintained for the due time, and
wherein information for a reason with a cause value to support the child node in taking subsequent actions is transmitted together with the link unstableness signal.

7. The node of claim 6, wherein the link restoration signal is transmitted to the child node based on the link restoration signal being received within the connection recovery time.

8. A processor for a wireless communication device in a wireless communication system,
wherein the processor is configured to control the wireless communication device to
allocate resources to a child node using one of a plurality of resource allocation types; wherein the plurality of resource allocation types comprise i) a first resource allocation type and ii) a second resource allocation type,
wherein, in the first resource allocation type, a bitmap indicates Resource Block Groups (RBGs) that are allocated to the child node,
wherein, in the second resource allocation type, a resource allocation field informs of a starting resource block and a length in terms of contiguously allocated resource blocks that are allocated to the child node,
receive a radio resource control (RRC) signal configuring a due time,
transmit, to the child node, a link unstableness signal informing unstableness of a link based on the link with a parent node being unstable,
monitor whether a link restoration signal is received from the parent node within a connection recovery time, and
transmit a handover trigger signal to the child node based on the link restoration signal being not received within the connection recovery time,
wherein the link is determined to be unstable based on a situation, in which reference signal received power (RSRP) or reference signal received quality (RSRQ) measured in the link is equal to or smaller than a threshold, being maintained for the due time, and
wherein information for a reason with a cause value to support the child node in taking subsequent actions is transmitted together with the link unstableness signal.

\* \* \* \* \*